US012719838B2

(12) United States Patent
Badrinarayanan et al.

(10) Patent No.: US 12,719,838 B2
(45) Date of Patent: Aug. 25, 2026

(54) STATISTICALLY PRIVATE OBLIVIOUS TRANSFER FROM CDH

(71) Applicant: Visa International Service Association, San Francisco, CA (US)

(72) Inventors: Saikrishna Badrinarayanan, Fremont, CA (US); Sikhar Patranabis, San Francisco, CA (US); Pratik Sarkar, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 182 days.

(21) Appl. No.: 18/698,519

(22) PCT Filed: Sep. 29, 2022

(86) PCT No.: PCT/US2022/045252

§ 371 (c)(1),
(2) Date: Apr. 4, 2024

(87) PCT Pub. No.: WO2023/059501

PCT Pub. Date: Apr. 13, 2023

(65) Prior Publication Data

US 2024/0333492 A1 Oct. 3, 2024

Related U.S. Application Data

(60) Provisional application No. 63/310,540, filed on Feb. 15, 2022, provisional application No. 63/253,919, filed on Oct. 8, 2021.

(51) Int. Cl.
*H04L 9/40* (2022.01)
*G06F 21/60* (2013.01)
(Continued)

(52) U.S. Cl.
CPC ........ *H04L 63/0421* (2013.01); *G06F 21/606* (2013.01); *H04L 9/0841* (2013.01);
(Continued)

(58) Field of Classification Search
CPC ......... H04L 9/08; H04L 9/869; H04L 9/0841; H04L 9/30; H04L 9/3013; H04L 2209/50;
(Continued)

(56) References Cited

U.S. PATENT DOCUMENTS 11,328,087 B1 * 5/2022 Allen .................... G06F 21/602
12,010,221 B2 * 6/2024 Wright .................... H04L 9/085
(Continued)

OTHER PUBLICATIONS

Kiyoshima et al., Efficient Concurrent Oblivious Transfer in Super Polynomial Simulation Security, 2012, pp. 216-232 (Year: 2012).*
(Continued)

*Primary Examiner* — Shaqueal D Wade-Wright
(74) *Attorney, Agent, or Firm* — Kilpatrick Townsend & Stockton LLP

(57) ABSTRACT

Methods for performing oblivious transfer are disclosed. These methods include a method for performing random single bit oblivious transfer (a "first method"), a method for performing random string oblivious transfer (a "second method"), and a method for performing non-random string oblivious transfer (a "third method"). In the first method, a sender computer can use a hardcore predicate function to obfuscate either a first message or a second message, generating an obfuscated message. The receiver computer can de-obfuscate this obfuscated message to randomly receive either the first message or the second message. The second method and third method can be implemented, with some modification, by repeatedly performing the first method, once for each "message bit" of the sender's messages. In the second and third methods, the receiver computer can send "indicator bits" to the sender computer, enabling the sender
(Continued)

computer to transmit a random or non-random message strings to the receiver.

18 Claims, 14 Drawing Sheets

(51) Int. Cl.
*H04L 9/08* (2006.01)
*H04L 9/30* (2006.01)

(52) U.S. Cl.
CPC .......... *H04L 9/0869* (2013.01); *H04L 9/3013* (2013.01); *H04L 63/061* (2013.01); *G06F 21/602* (2013.01)

(58) Field of Classification Search
CPC ..... H04L 63/04; H04L 63/0421; H04L 63/06; H04L 63/061; H04L 9/0869; G06F 21/602; G06F 21/606
See application file for complete search history.

(56) References Cited

U.S. PATENT DOCUMENTS

2001/0055388 A1* 12/2001 Kaliski, Jr. ............. H04L 9/085 713/155
2005/0259817 A1 11/2005 Ramzan et al.
2011/0145589 A1 6/2011 Camenisch et al.
2013/0159696 A1 6/2013 Tateishi et al.
2014/0093077 A1* 4/2014 Jawurek ................ H04L 63/123 380/268
2020/0259800 A1* 8/2020 Masny ................ H04L 63/0428
2020/0279045 A1* 9/2020 Tueno ................... H04L 9/0841
2021/0211274 A1 7/2021 Wright
2021/0312078 A1* 10/2021 Jayachandran ....... H04L 63/123
2022/0278845 A1* 9/2022 Manevich ............. H04L 9/0894
2024/0070310 A1* 2/2024 Son ....................... G06F 21/606

OTHER PUBLICATIONS

U.S. Appl. No. 18/698,724, "Non-Final Office Action", Sep. 11, 2025, 20 pages.
Naor et al., "Efficient Oblivious Transfer Protocols", Proceedings of the Twelfth Annual Symposium on Discrete Algorithms, Jan. 2001, pp. 448-457.
Chou et al., "The Simplest Protocol for Oblivious Transfer", IACR, International Association For Cryptologic Research, vol. 20150416:100701, Apr. 16, 2015, pp. 1-17.
Döttling et al., "Two-Round Oblivious Transfer from CDH or LPN", May 10, 2020, Advances in Cryptology—EUROCRYPT 2020 (pp. 768-797), 45 pages.
Kiyoshima et al., "Efficient Concurrent Oblivious Transfer in Super-Polynomial-Simulation Security", Advances in Information and Computer Security, Springer Berlin Heidelberg, Berlin, Heidelberg, Nov. 7, 2012, 18 pages.
PCT/US2022/045096 , "International Search Report and Written Opinion", Jan. 13, 2023, 12 pages.
PCT/US2022/045252 , "International Search Report and Written Opinion", Jan. 17, 2023, 12 pages.
Sun et al., "An Efficient Secure Oblivious Transfer", IACR, International Association For Cryptologic Research, Oct. 10, 2009, pp. 1-17.
Tzeng , "Efficient 1-Out-N Oblivious Transfer Schemes", Springer-Verlag Berlin Heidelberg, vol. 2274, Available Online at :https://link.springer.com/content/pdf/10.1007/3-540-45664-3_11.pdf, Jan. 1, 2002, pp. 159-171.
Vitse , "Simple Oblivious Transfer Protocols Compatible with Kummer and Supersingular Isogenies", IACR, International Association for Cryptologic Research, Jul. 27, 2018, 31 pages.

* cited by examiner

STATISTICALLY PRIVATE OBLIVIOUS TRANSFER FROM CDH

CROSS-REFERENCE TO RELATED APPLICATIONS

This application is a National Stage of International Application No. PCT/US2022/045252, filed on Sep. 29, 2022, which claims the benefit of the filing date of U.S. Patent Application No. 63/253,919, filed Oct. 8, 2021, and U.S. Patent Application No. 63/310,540, filed Feb. 15, 2022, which are herein incorporated by reference in its entirety for all purposes.

BACKGROUND

Oblivious Transfer (OT) refers to techniques used to transmit one or more messages between senders and receivers. These techniques are subject to certain conditions that differentiate them from a "normal" transfer. In an oblivious transfer, the sender transfers one or more messages to a receiver without knowing specifically which messages are transferred. Additionally, the receiver can't learn or otherwise determine the contents of the messages they did not receive.

Oblivious transfer typically derives its usefulness as a "cryptographic primitive." Using oblivious transfer, a cryptographer can build more sophisticated cryptographic systems that may serve some purpose. For example, oblivious transfer can be used to build secure multiparty computation systems, such as those described in [Yao86], [GMW87], [IPS08], [IKO+11], [BL18] and [GS18]. Such systems allow multiple entities (e.g., people, organizations, computer systems, etc.), to perform computations on their collective data without sharing that data with one another. Oblivious transfer is both necessary and complete (according to [Kil88]) for performing general secure multiparty computation. Multiparty computation has a variety of practical applications, including secure machine learning, private set intersection (e.g., [KKRT16], [PRTY19]), etc.

One practical example of multiparty computation is contact discovery. A social network service may want to discover who among a user's phone contacts use that service, in order to inform the user and provide them with an opportunity to extend their social network. However, it would be an invasion of privacy for that social network service to directly access the user's contacts. Instead, the user's phone and a social network server can perform a secure multiparty computation in order to detect which contacts are members of the social network, without having to share the contact list or member list with each other.

Another practical example of multiparty computation is secure biometric comparison. A user may possess a digital representation of a biometric (e.g., a thumb print) on their phone. The user may want to use this biometric in order to authenticate the user and access some resource (e.g., a secure building, a financial account, etc.). However, the user may not want to transmit this biometric to a server (e.g., a building access control server, a credit-card company server, etc.), as there is a risk of the biometric being intercepted and stolen. Instead, the user's phone and the server can perform a multiparty computation in order to determine if the biometric matches a biometric stored on the server, without requiring either computing device to transmit their respective biometrics to each other.

Research and development in the field of oblivious transfer is on-going, and new oblivious transfer techniques, methods, and protocols are still being developed. While many of these techniques serve the same general purpose (i.e., obliviously transferring messages), they vary based on a variety of metrics, including their computational complexity (e.g., generally how many operations the sender and receiver perform), their communication complexity (e.g., generally how much communication is needed between the sender and receiver to complete the oblivious transfer), bandwidth (e.g., how much data needs to be sent in each communication), as well as the specific series of steps or operations that are performed to complete such methods.

Due to these variations, different cryptographic products (e.g., biometric comparison, contact discovery, etc.) may benefit more or less from different oblivious transfer techniques. Consequently, developing new oblivious transfer methods has the potential to improve the speed, security, memory efficiency, and communication efficiency of said cryptographic products, or enable the development of new cryptographic products that were previously unfeasible.

Of some particular interest is the development of random oblivious transfer protocols. Unlike traditional oblivious transfer, in which the receiver can control which message or messages it receives during the oblivious transfer process, in random oblivious transfer, the receiver receives either a message chosen randomly, or a message that is itself random (e.g., a random series of bits). Random oblivious transfer protocols often require less message communication than traditional oblivious transfer protocols, are often faster than traditional oblivious transfer protocols as a result.

Embodiments of the present disclosure provide novel and useful oblivious transfer techniques and methods, including random oblivious transfer methods.

SUMMARY

Embodiments of the present disclosure include at least three oblivious transfer methods. The first oblivious transfer method (described below with reference to FIGS. 5A-5B) comprises a two-round one-out-of-two statistically sender private random single bit oblivious transfer method based on the computational Diffie-Hellman assumption. The second oblivious transfer method (described below with reference to FIG. 6 and FIGS. 7A-7C) comprises a three-round one-out-of-two statistically sender private random string oblivious transfer method based on the computational Diffie-Hellman assumption. The third oblivious transfer method (described below with reference to FIG. 8 and FIGS. 9A-9C) comprises a three-round one-out-of-two statistically sender private non-random string oblivious transfer method based on the computational Diffie-Hellman assumption. Concepts like "statistical sender privacy" and the "computational Diffie-Hellman assumption" are described in more detail below, and are not necessary to understand this summary.

Prior works on statistically sender private or statistically receiver private oblivious transfer protocols are based on cryptographic assumptions such as the decisional Diffie-Hellman assumption, the Quadratic Residuosity assumption, and the Learning with Errors assumption. By contrast, embodiments of the present disclosure relate to statistically sender private oblivious transfer protocols based on the computational Diffie-Hellman assumption. While it is difficult to compare the relative security of different cryptographic assumptions, as described below in the detailed description, the computational Diffie-Hellman assumption is stronger than the conventional decisional Diffie-Hellman assumption. As such, methods of performing oblivious transfer according to embodiments are more secure than oblivious transfer methods based on the decisional Diffie-Hellman assumption.

During a general one-out-of-two oblivious transfer protocol, a sender computer transfers either a first message $m_0$ or a second message $m_1$ to a receiver computer. Such oblivious transfer protocols usually comprise some number of "oblivious transfer routines," sequences of steps in the oblivious transfer protocol. These oblivious transfer routines can include "oblivious transfer rounds, which can involve the sender computer transmitting an "oblivious transfer message" to the receiver computer, or vis versa. Such oblivious transfer messages are typically not the same as the first message $m_0$ or the second message mi, instead they can contain information which eventually enables the receiver computer to receive one of these two messages.

For example, in the first oblivious transfer method according to embodiments, the receiver computer can send a first oblivious transfer message to the sender computer, then the sender computer can send a second oblivious transfer message to the receiver computer. The receiver computer can use the contents of the second oblivious transfer message to determine an "output message" $m_{b'}$ (which can be equivalent to either the first message $m_0$ or the second message $m_1$), completing the oblivious transfer method.

In more detail, in the first oblivious transfer method (according to embodiments of the present disclosure) generally allows a sender computer to randomly obliviously transfer either a first message $m_0$ or a second message $m_1$ to a receiver computer. The first message $m_0$ and the second message $m_1$ can comprise single bits, which can take on Boolean values of 0 (false) or 1 (true). The message the receiver computer receives is effectively random. Consistent with the conditions of oblivious transfer, the sender computer does not learn which message the receiver computer received, and the receiver computer does not learn anything about the other message possessed by the sender computer. As a brief aside, the first oblivious transfer method implies the existence of a new statistical hash commitment scheme based on the computational Diffie-Hellman assumption, which may be of interest to some cryptographers.

The second oblivious transfer method (according to embodiments of the present disclosure) also allows a sender computer to randomly oblivious transfer either a first message $m_0$ or a second message $m_1$ to a receiver computer. However, in the second oblivious transfer method, the first message $m_0$ and the second message $m_1$ can comprise random strings of bits, rather than single bits. These random strings of bits can be effectively generated during the second oblivious transfer method itself. Consistent with the conditions of oblivious transfer, the sender computer does not learn which of the two random messages the receiver computer received, and the receiver computer does not learn anything about the random message that it did not receive.

Generally, the third oblivious transfer method (according to embodiments of the present disclosure) allows a sender computer to obliviously transfer either a first message $m_0$ or a second message $m_1$ to a receiver computer. The first message $m_0$ and the second message $m_1$ can comprise strings of bits. This third oblivious transfer method is non-random, unlike the first oblivious transfer method and the second oblivious transfer method. The receiver computer can express a choice via a receiver choice bit b, and receive either the first message $m_0$ or the second message $m_1$ based on the receiver choice bit b. Consistent with the conditions of oblivious transfer, the sender computer does not learn which message the receiver computer received or the value of the receiver choice bit b. Likewise, the receiver computer does not learn anything about the message that it did not receive.

The first oblivious transfer method described above (the random single bit oblivious transfer method) can be used as "building block" to implement the second oblivious transfer method (the random string oblivious transfer method) and the third oblivious transfer method (the non-random string oblivious transfer method). To implement either the second oblivious transfer method or the third oblivious transfer method for a message string comprising n bits, the sender computer and the receiver computer can perform the first oblivious transfer method n times (once for each message bit), as well as perform some additional steps to achieve the characteristics of the particular method (e.g., for the third oblivious transfer method, some additional steps can be performed in order to insure that the result is non-random). These additional steps may be different depending on whether the sender computer and the receiver computer are implementing the second oblivious transfer method or the third oblivious transfer method, and are described in more detail below.

As another aside, the methods described herein can be extended to the setting of plausibly post-quantum secure isogeny-based assumptions, notably the Supersingular Isogeny Diffie-Hellman assumption. This yields novel statistically sender private and statistically receiver private oblivious transfer methods from the Supersingular Isogeny Diffie-Hellman assumption.

In more detail, one embodiment of the present disclosure is directed to a method for obliviously transferring either a first message $m_0$ or a second message $m_1$ to a receiver computer. The receiver computer can determine one or more first random numbers $r_{0,j}$ and one or more second random numbers $r_{1,j}$. The receiver computer can also determine one or more group elements $Q_j$. The receiver computer can determine one or more first random group elements $R_{0,j}$ based on the one or more first random numbers $r_{0,j}$. Likewise, the receiver computer can determine one or more second random group elements $R_{1,j}$ based on the one or more second random numbers $r_{1,j}$. The receiver computer can transmit a first oblivious transfer message $ot_1$ comprising the one or more group elements $Q_j$, the one or more first random group elements $R_{0,j}$ and the one or more second random group elements $R_{1,j}$ to the sender computer. The sender computer can use the one or more group elements $Q_j$, the one or more first random group elements $R_{0,j}$ and the one or more second random group elements $R_{1,j}$ to determine a second oblivious transfer message $ot_2$ comprising one or more sets of first public keys $pk_{0,i,j}$, and one or more or more obfuscation messages $\sigma_j$. Each set of first public keys $pk_{0,i,j}$, can comprise one or more first public keys $pk_{0,i,j}$.

The receiver computer can receive the second oblivious transfer message $ot_2$ from the sender computer. The receiver computer can determine one or more first message computation values $t_{0,j}$ using the one or more sets of first public keys $pk_{0,i,j}$, the one or more first random numbers $r_{0,j}$, and a hardcore predicate function H. The receiver computer can then de-obfuscate the one or more obfuscated messages $\sigma_j$ using the one or more first message computation values $t_{0,j}$, thereby determining an output message $m_{b''}$. The output message $m_{b'}$ can comprise either the first message $m_0$ or the second message $m_1$.

Another embodiment is directed to a method for obliviously transferring either a first message $m_0$ or a second message $m_1$ to a receiver computer. The receiver computer can receive a first oblivious transfer message $ot_1$ from a sender computer. The first oblivious transfer message $ot_1$ can comprise one or more group elements $Q_j$ and one or more sets of first public keys $pk_{0,i,j}$. Each set of first public keys $pk_{0,i,j}$ can comprise one or more first public keys. The receiver computer can determine one or more first message computation values $t_{0,j}$ using the one or more sets of first public keys $pk_{0,i,j}$, one or more first random numbers $r_{0,j}$, and a hardcore predicate function H. The receiver computer can determine one or more first random group elements $R_{0,j}$ using the one or more first random numbers $r_{0,j}$ and a generator g. The receiver computer can additionally determine one or more second random group elements $R_{1,j}$ using one or more second random numbers $r_{1,j}$ and a generator g. The receiver computer can generate one or more indicator bits $z_j$. The receiver computer can transmit a second oblivious transfer message $ot_2$ to the sender computer. The second oblivious transfer message $ot_2$ can comprise the one or more first random group elements $R_{0,j}$, the one or more second random group elements $R_{1,j}$, and the one or more indicator bits $z_j$. The sender computer can use the one or more first random group elements $R_{0,j}$, the one or more second random group elements $R_{1,j}$, and the one or more indicator bits $z_j$ to determine one or more obfuscated messages $\sigma_j$.

The receiver computer can receive a third oblivious transfer message $ot_3$ from the sender computer. The third oblivious transfer message $ot_3$ can comprise one or more obfuscated messages $\sigma_j$. The receiver computer can de-obfuscate the one or more obfuscated messages $\sigma_j$ using the one or more first message computation values $t_{0,j}$, thereby determining an output message $m_b$. The output message can comprise either the first message $m_0$ or the second message $m_1$.

Yet another embodiment is directed to a receiver computer comprising a processor and a non-transitory computer readable medium coupled to the processor. The non-transitory computer readable medium can comprise code, executable by the processor, for performing a method for obliviously transferring either a first message $m_0$ or a second message $m_1$ to the receiver computer. The receiver computer can determine one or more first random numbers $r_{0,j}$ and one or more second random numbers $r_{1,j}$. The receiver computer can additionally determine one or more group elements $Q_j$. The receiver computer can determine one or more first random group elements $R_{0,j}$ based on the one or more first random numbers $r_{0,j}$. Likewise, the receiver computer can determine one or more second random group elements $R_{1,j}$ based on the one or more second random numbers $r_{1,j}$. The receiver computer can transmit a first oblivious transfer message $ot_1$ comprising the one or more group elements $Q_j$, the one or more first random group elements $R_{0,j}$ and the one or more second random group elements $R_{1,j}$ to the sender computer. The sender computer can use the one or more group elements $Q_j$, the one or more first random group elements $R_{0,j}$ and the one or more second random group elements $R_{1,j}$ to determine a second oblivious transfer message $ot_2$ comprising one or more sets of first public keys $pk_{0,i,j}$, and one or more obfuscated messages $\sigma_j$.

The receiver computer can receive the second oblivious transfer message $ot_2$ from the sender computer. The receiver computer can determine one or more first message computation values $t_{0,j}$ using the one or more sets of first public keys $pk_{0,i,j}$, the one or more first random numbers $r_{0,j}$, and a hardcore predicate function H. The receiver computer can then de-obfuscate the one or more obfuscated messages $\sigma_j$ using the one or more first message computation values $t_{0,j}$, thereby determining an output message $m_{b'}$. The output message $m_{b'}$ can comprise either the first message $m_0$ or the second message $m_1$.

Prior to describing embodiments of the present disclosure in more detail, it may be helpful to describe some terms that may be used through this disclosure.

Terms

A "server computer" may refer to computer or cluster of computers. A server computer may be a powerful computing system, such as a large mainframe. Server computers can also include minicomputer clusters or a group of servers functioning as a unit. In one example, a server computer can include a database server coupled to a web server. A server computer may comprise one or more computational apparatuses and may use any of a variety of computing structures, arrangements, and compilations for servicing requests from one or more client computers.

A "memory" may refer to any suitable device or devices that may store electronic data. A suitable memory may comprise a non-transitory computer readable medium that stores instructions that can be executed by a processor to implement a desired method. Examples of memories include one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xenon, and or Xscale; and/or the like processor(s).

A "message" may refer to any information that may be communicated between entities. A message may be communicated by a "sender" to a "receiver." A sender may refer to any originator of a message and a receiver may refer to any recipient of a message. A message may be communicated via oblivious transfer techniques, as described herein. Digital messages may comprise strings of one or more "bits," or "message bits," Boolean values that can take on the value of one (true) or zero (false). Most digital data is stored in the form of collections of bits, including bit strings. Consequently, most forms of digital data (including e.g., text files, video files, cryptographic keys, etc.) can be represented as messages.

"Obfuscation" may refer to a process by which the nature or content of something is hidden. An "Obfuscated message" may refer to a message in which the content of the message has been hidden such that one cannot determine or interpret the content of the message based on the obfuscated message. Obfuscated messages can be "de-obfuscated" to recover a message. Encryption can be a form of obfuscation, and decryption can be a form of de-obfuscation. A message can be obfuscated to produce an obfuscated message using "obfuscation values" or "obfuscation bits."

"Plaintext" may refer to data that is presented in unencrypted form, which can be interpreted by human or machine interpreters. "Ciphertext" may refer to data that is presented in encrypted form, which may need to be decrypted before it can be interpreted by human or machine interpreters.

A "multiparty computation" or "secure multiparty computation" may refer to a computation, executed by multiple parties, which does not reveal the inputs to the computation, which usually comprise private data held by the parties. For example, a multiparty computation can be used to determine which of two individuals or organizations possesses more assets, without requiring the individuals or organizations to reveal their assets to one another.

A "cyclic group" may refer to a group of elements (sometimes referred to as "group elements") that that can be generated by a single element, which may be referred to as a "generator." Cyclic groups are typically comprised of numbers, such as integers, and group elements therefore typically comprise numbers. The numbers on a clock are a basic example of a cyclic group, as by beginning at 12 and advancing through the numbers eventually returns to 12. There are a number of unsolved problems in mathematics that relate to cyclic groups, and such problems often form the underlying assumptions used to prove the security of cryptosystems.

An "oblivious transfer" or "oblivious transfer process" may refer to a series of steps used to obliviously transfer one or more messages from a sender to a receiver, which may be subject to the condition that the sender does not know which message(s) the receiver received, and the receiver doesn't learn the message(s) it did not receive.

An "oblivious transfer routine" may refer to a discrete series of steps corresponding to an oblivious transfer process. An "oblivious transfer round" may refer to an oblivious transfer routine that involve the transmission of an "oblivious transfer message," usually either at the beginning or end of an oblivious transfer round. By performing multiple oblivious transfer rounds and transmitting multiple oblivious transfer messages, a sender computer can obliviously transfer a message (which is not the same as an oblivious transfer message) to a receiver computer. Efficient oblivious transfer protocols typically comprise either two or three oblivious transfer rounds.

DETAILED DESCRIPTION

Figure 1A:
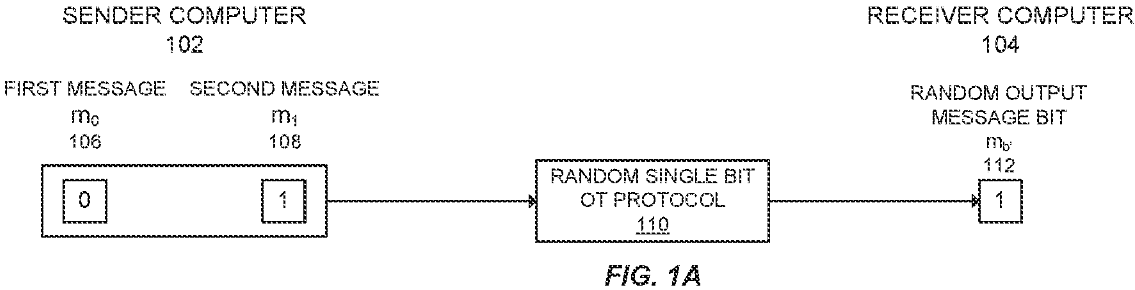
FIG. 1A shows a diagram summarizing a random single bit oblivious transfer protocol according to some embodiments of the present disclosure.

Prior to describing embodiments of the present disclosure in more detail, it may be useful to provide an overview of one-out-of-two oblivious transfer and random oblivious transfer.

One-out-of-two oblivious transfer can comprise transfer processes subject to a few conditions. The sender computer can possesses two messages, which can be referred to as a first message $m_0$ and a second message m. The sender computer can transfer exactly one of these messages to the receiver computer, without knowing which message it transferred. Further, the receiver computer cannot determine or learn anything about the message it did not receive in the oblivious transfer.

Oblivious transfer can be generalized to k-out-of-n oblivious transfer, in which the sender computer transfers k messages out of a total of n messages to a receiver computer, such that the sender computer does not know which k messages were transferred and such that the receiver computer does not learn the contents of the other n-k messages. However, embodiments of the present disclosure are directed to one-out-of-two oblivious transfer methods, and as such, k-out-of-n oblivious transfer protocols are not described in detail herein. k-out-of-n oblivious transfer protocols can be developed using one-out-of-two oblivious transfer protocols (i.e., achieving k-out-of-n oblivious transfer by preforming some combination of multiple one-out-of-two oblivious transfers) and as such, a skilled practitioner in the art of cryptography could use embodiments of the present disclosure to implement k-out-of-n oblivious transfer.

Conceptually, most or all processes that comply with the conditions described above (i.e., that the receiver computer only receives one message and the sender computer does not learn which message the receiver computer received) qualify as one-out-of-two oblivious transfer, so these conditions are generally sufficient to define oblivious transfer. However, there are some additional concepts and characteristics that can be used to design and understand oblivious transfer methods. Understanding these concepts may be useful for understanding the oblivious transfer as a whole, as well as particular embodiments of the present disclosure.

One such concept is the use of a receiver choice bit b. A receiver choice bit b can take a Boolean value of 0 (false) or 1 (true), and can reflect the message that the receiver computer or its operator wants to receive. As an example, if the receiver choice bit b=0, the desired message may be the first message $m_0$, whereas if the receiver choice bit b=1, the desired message may be the second message $m_1$. Because the receiver choice bit b communicates which message the receiver computer receives, in order to adhere to the conditions of oblivious transfer, the receiver choice bit b typically remains hidden or unknown to the sender computer.

Another concept is the use of obfuscated messages σ. An obfuscated message σ can contain an "obfuscated" version of the information contained in either the first message $m_0$, or the second message $m_1$. Some oblivious transfer protocols can be implemented using obfuscated messages. Sender computers can generate obfuscated messages and transmit them to receiver computers, and receiver computers can de-obfuscate these messages in order to produce their desired output message $m_b$, thereby completing the oblivious transfer protocol.

As one example, a sender computer can generate a first obfuscated message $\sigma_0$ that obfuscates a first message $m_0$ and a second obfuscated message $\sigma_1$ that obfuscates a second message $m_1$. The sender computer can transmit both the first obfuscated message $\sigma_0$ and the second obfuscated message $\sigma_1$ to the receiver computer. The receiver computer can then de-obfuscate one of these obfuscated messages to produce the output message $m_b$. In order to adhere to the conditions of oblivious transfer, the receiver computer should be able to de-obfuscate one of the obfuscated messages (corresponding to their desired message) and not the other obfuscated message. Additionally, the sender computer should not be able to determine which obfuscated message the receiver computer de-obfuscated.

As another example, a sender computer could generate a single obfuscated message $\sigma$ and send it to the receiver computer, and the receiver computer can de-obfuscate this message to produce the output message $m_b$. This approach requires that the sender computer obfuscate a message without knowing which message it obfuscated, which can be more difficult to achieve in practice.

These two examples are overviews on how oblivious transfer processes can use obfuscated messages to implement oblivious transfer, and lack many particular implementation details associated practical oblivious transfer methods (e.g., oblivious transfer methods according to embodiments of the present disclosure). Still, embodiments of the present disclosure are generally more similar to the second example presented than the first. That is, if the sender computer is obliviously transferring one message bit to the receiver computer, it may generate a single obfuscated message $\sigma$ (rather than two obfuscated messages $\sigma_0$ and $\sigma_1$) and transfer it to the receiver computer. The receiver computer may de-obfuscate the obfuscated message $\sigma$ to produce an output message $m_b$ that is consistent with a receiver choice bit b (in the case of non-random oblivious transfer, e.g., in the third oblivious transfer method) or is random (in the case of random oblivious transfer, e.g., in the first oblivious transfer method or the second oblivious transfer method).

The conditions of random one-out-of-two oblivious transfer are mostly consistent with the conditions of non-random one-out-of-two oblivious transfer, except that the receiver computer receives one of the two messages randomly rather than based on a receiver choice bit b. In some of the oblivious transfer methods described below, the receiver computer may possess or generate a "random receiver choice bit" b'. In random oblivious transfer protocols, the output message $m_{b'}$ may possess a b' subscript, indicating that the output message $m_{b'}$ was produced randomly in a manner consistent with the random receiver choice bit b'.

A random receiver choice bit b' may be similar to a receiver choice bit b, in that a random receiver choice bit b' can take on a Boolean value of 0 (false) or 1 (true), and it's value may relate to the message that the receiver computer receives. As an example, if the random receiver choice bit b'=0, the receiver computer may receive the first message $m_0$, whereas if the random receiver choice bit b'=1, the receiver computer may receive the second message $m_1$. Additionally, the random receiver choice bit b' may be kept secret from the sender computer, in order to prevent the sender computer from determining which message the receiver computer received. However, unlike a receiver choice bit b, the random receiver choice bit b' may be random generated or determined, rather than intentionally selected by the receiver computer or its operator.

As summarized above, some embodiments of the present disclosure are directed to both random and non-random one-out-of-two statistically sender private oblivious transfer methods based on the computational Diffie-Hellman assumption. Before describing methods according to embodiments in more detail (e.g., with reference to specific method steps) it may be helpful to describe some of these concepts (e.g., statistical sender privacy) in more detail, in order to illustrate useful applications and advantages of embodiments of the present disclosure, as well as contrast embodiments with "conventional" oblivious transfer techniques.

A use for oblivious transfer protocols is as a cryptographic primitive, used to build useful cryptographic protocols. Designing faster, more efficient, more secure oblivious transfer protocols is valuable because it improves the speed, efficiency, and security of cryptographic protocols built using those oblivious transfer protocols.

An example of such a cryptographic protocol is a private set intersection protocol. A private set intersection protocol enables two parties (each possessing their own private set of data) to determine if there are any elements common to both of their sets of data, without revealing their data to one another. Private set intersection protocols can be used in a number of real-world applications. For example, an epidemiologist can use private set intersection to automate contract tracing for a disease such as COVID, without unduly invading the privacy of patients. Two patients may each have location datasets (e.g., collected by their respective smartphones), however, the two patients may not want to freely disclose this location data. A private set intersection protocol can be used to determine any locations where both patients were present (e.g., an airport) without revealing all of their location data. Using this information, the epidemiologist can research the spread of the disease without learning every (irrelevant and private) location that the patients visited.

Another, more direct example of a use for oblivious transfer is as follows. A government agent working for a revenue service agency, and a tax preparation firm can use oblivious transfer to enable the government agent to unobtrusively and secretly investigate an accountant of the firm, in order to verify that they are conforming to acceptable accounting and tax preparation practices. The government agent does not want to inform the firm of exactly which accountant the agent is investigating, in order to prevent the firm from discriminating against the accountant (e.g., restricting the accountant's access to files, prevent the accountant from being part of meetings, etc.)

To solve this problem, the tax preparation firm (which is presumably complying with the investigation) can obliviously transfer the accountant's files to the government agent. Because an oblivious transfer was used, the tax preparation firm does not know which of their accountant's files were sent to the government agent, and hence cannot discriminate against the accountant.

These two examples (e.g., using oblivious transfer to implement private set intersection and to facilitate an investigation) both illustrate the usefulness of non-random oblivious transfer, but may not necessarily illustrate the usefulness of random oblivious transfer. Random oblivious transfer can be used in many of the same applications as random oblivious transfer. It is possible, for example, for a cryptographer to produce a private set intersection protocol using random oblivious transfer instead of non-random oblivious transfer.

Further, as described below, the "investigation protocol" described above can be modified to enable the government agent to perform an investigation using a random oblivious transfer.

Instead of obliviously transferring accounting files themselves to the government agent, the tax preparation firm can obliviously transfer a random string of bits to the government agent. If this oblivious transfer process is a one-out-of-two oblivious transfer, the tax preparation firm can possess two random strings of bits, one of which matches the government agent's received string of bits, and the other being a similarly random string of bits. The tax preparation firm can then encrypt a first accountant's files (e.g., "Alice") using one random string of bits, and encrypt a second accountant's files (e.g., "Bob") using the other random string of bits.

The tax preparation firm can then send both sets of encrypted files to the government agent. The government agent can use the random string of bits received during the random oblivious transfer to decrypt one of these sets of files. However, because the government agent does not know the random bit string used to encrypt the other set of accounting files, the government agent will not be able to decrypt those files. Such a random oblivious transfer process can be useful if the government agency is not targeting any specific individual for investigation, but is instead conducting a random audit or another other similar investigation.

It may be helpful to briefly describe some advantages of random oblivious transfer, as it may be unclear why, for example, a cryptographer may choose to use a random oblivious transfer protocol rather than a non-random oblivious transfer protocol (excluding the random audit example provided above). In general, random oblivious transfer can be accomplished more quickly than non-random oblivious transfer. For cryptographic processes that may require large numbers of oblivious transfer operations (e.g., multiparty computation applications such as garbled circuits), there is an advantage in using oblivious transfer protocols (e.g., random oblivious transfer protocols) that have faster performance.

Generally, due to improvements in computer technology and oblivious transfer protocols, the "bottleneck" of the speed of oblivious transfer relates to the transmission of oblivious transfer messages sent between the sender computer and the receiver computer. Oblivious transfer protocols that require less oblivious transfer messages and smaller (e.g., in terms of data content) oblivious transfer messages generally perform faster than oblivious transfer protocols that require the opposite. In crude terms, in a non-random oblivious transfer, the receiver computer typically has to transmit a message that in some way "expresses" that receiver computer's message choice or receiver choice bit b (without inadvertently revealing it to the sender computer). However, in a random oblivious transfer, because the receiver computer does not possess a real choice in which message they receive, this step is unnecessary. Hence random oblivious transfer are typically faster than non-random oblivious transfers. Because (as stated above) many cryptographic protocols (such as private set intersection) can be built using random oblivious transfer instead of non-random oblivious transfer, it is sometimes preferable to build such protocols using random oblivious transfer due to this speed difference.

As stated above, embodiments of the present disclosure are directed to novel oblivious transfer methods, particularly statistically sender private oblivious transfer based on the computational Diffie-Hellman assumption. Prior to describing embodiments in more detail, it may be useful to describe statistical (and computational) privacy as well as the computational Diffie-Hellman assumption.

Oblivious transfer protocols generally have a property where if one party has one form of privacy (e.g., statistical privacy), then the other party will have the other form of privacy (e.g., computation privacy). In embodiments of the present disclosure, the sender computer may possess statistical privacy, and the receiver computer may possess computational privacy.

Statistical privacy means that no more about the private data can be determined than what is apparent based on statistical analysis, regardless of how much computational power is available to the "determining" party. For example, if Alice flips a fair coin (and hides the result), Bob can determine from statistics that there is a 50% chance the coin landed on heads, and a 50% chance the coin landed on tails, and therefore Bob has a 50% chance of correctly guessing the result of the coin flip. Alice has statistical privacy if Bob cannot in any way improve his chance at guessing or determining the result (e.g., by peeking at the coin). In the context of one-out-of-two oblivious transfer, statistical sender privacy means that the receiver cannot determine the "unreceived" message any better than by random guess.

Computational privacy means that, while it may be possible to do so, it is computationally infeasible to determine private data. Many cryptographic systems are based on problems which are computationally infeasible to solve, and thus provide computational privacy. As an example, Alice can know two large prime numbers, which can serve as a private key in an asymmetric cryptosystem. Alice can determine the product of those prime numbers and send it to Bob. Bob can use this product as a public key in the asymmetric cryptosystem. In theory, the public key contains enough information to allow Bob to determine the private key, as there is only one (non-trivial) pair of numbers that can be multiplied together to produce the public key. However, given the size of the prime numbers and the public key, it may take decades of computer time in order for Bob to factor the public key and break the cryptosystem. Hence Alice has computational privacy because while it is possible, it is computationally infeasible for Bob to determine her private key.

In a technical sense, statistical privacy is stronger than computational privacy, as statistical privacy cannot be "defeated" even if one party has access to unbounded computational resources. Generally, statistical sender privacy (as in embodiments) is not inherently superior to statistical receiver privacy. However, in some cryptographic contexts one form of privacy may be preferable over the other. As such, it is useful for cryptographers to have access to a variety of oblivious transfer methods with a variety of "privacy configurations," which may be useful in different use cases.

For example, embodiments of the present disclosure may be more useful in contexts where there is a computational "power" imbalance that favors the receiver. For example, some large, well-funded government agencies may have access to sufficient computing resources such that they can break computational privacy. However, regardless of their computing resources, they cannot break statistical privacy. Hence if a smaller, less powerful organization (e.g., a company, a smaller government) is performing a multi-party computation or oblivious transfer with the government agency, it may be preferable to use oblivious transfer protocols that provide statistical sender privacy (as described herein) as such protocols may protect the rights and privileges of the less powerful organization. In the example provided above, in which a tax preparation firm is obliviously transferring accountant files to a government revenue service agency, statistically sender private oblivious transfer methods, such as those disclosed herein, may preserve the rights and privacy of the tax preparation firm, as the government revenue service agency cannot break statistical privacy, even with access to large amounts of computer resources.

Before describing methods according to embodiments in more detail, it may be useful to describe cryptographic assumptions. Embodiments of the present disclosure include novel statistically sender private oblivious transfer methods based on the computational Diffie-Hellman assumption. This is different from conventional oblivious transfer methods, which are often based on assumptions such as the decisional Diffie-Hellman assumption.

Generally, the logic is that a particular cryptographic protocol (e.g., an oblivious transfer) is secure provided that the mathematical assumptions that form the basis of the protocol appear to remain true. These mathematical assumptions are typically related to mathematical problems that have not yet been solved. But even if two mathematical problems both remain unsolved, those mathematical problems are not necessarily equally difficult. Consequently, cryptosystems based on assumptions corresponding to those mathematical problems are not necessarily equally secure.

The decisional Diffie-Hellman assumption is frequently used to design and prove the security of oblivious transfer protocols. However, the decisional Diffie-Hellman assumption is weaker than the computational Diffie-Hellman assumption. As such, although both the decisional Diffie-Hellman problem and the computational Diffie-Hellman problem remain unsolved, oblivious transfer protocols based on the computational Diffie-Hellman assumption (i.e., those described herein) are more secure than oblivious transfer protocols based on the decisional Diffie-Hellman assumption (i.e., as in conventional oblivious transfer).

In brief, the reason for the difference is that if someone solves the computational Diffie-Hellman problem, they have necessarily also solved the decisional Diffie-Hellman problem. However, if someone solves the decisional Diffie-Hellman problem, they have not necessarily solved the computational Diffie-Hellman problem. In some cases, the decisional Diffie-Hellman problem relates to identifying whether a group element is a random group element $g^c$ or satisfies the expression $g^{ab}$. Provided that an attacker cannot distinguish a group element $g^{ab}$ from a random group element $g^c$, even with access to group elements $g^a$ and $g^b$, the decisional Diffie-Hellman assumption holds. By contrast, the computational Diffie-Hellman problem relates to actually computing $g^{ab}$ from $g^a$ and $g^b$. Provided that an attacker cannot compute $g^{ab}$ from $g^a$ and $g^b$, the computational Diffie-Hellman assumption holds.

If an attacker could compute $g^{ab}$ from $g^a$ and $g^b$ (violating the computational Diffie-Hellman assumption, then it would trivial for the attacker to distinguish between $g^c$ and $g^{ab}$ (as the attacker knows the value of $g^{ab}$), violating the decisional Diffie-Hellman assumption. However, the opposite is not true. Just because an attacker can distinguish between $g^c$ and $g^{ab}$ (violating the decisional Diffie-Hellman assumption), they can not necessarily calculate $g^{ab}$ and violate the computational Diffie-Hellman assumption. Hence it is more probable that the decisional Diffie-Hellman problem is solved before the computational Diffie-Hellman problem, and thus the computational Diffie-Hellman assumption (and oblivious transfer protocols based thereon) are more secure. This improved security is one advantage of methods according to embodiments over conventional oblivious transfer methods.

Prior to describing embodiments of the present disclosure in more detail, it may be useful to describe some mathematical and descriptive conventions that are used throughout embodiments of the present disclosure.

As described above, the sender computer can possess a first message $m_0$ and a second message $m_1$. The first message $m_0$ and second message $m_1$ can comprise single bits or strings of bits. For ease of description, it is assumed that the first message $m_0$ and the second message $m_1$ are of equal length. However, this is not a requirement. If the messages are of unequal length (e.g., $m_0$=1011 and $m_1$=111111), the sender computer can pad the shorter message with zeros or ones, such that it's length equals the longer message (e.g., $m_0$=101100 and $m_1$=111111), or perform any other appropriate method to equalize the lengths. The expression n can be used to indicate the length (e.g., the number of bits contained in a message) of both messages (e.g., after the message lengths are equalized). An index j can be used to indicate a particular bit of a message. For example, an expression $m_{0,j}$ can indicate the $j^{th}$ message bit of the first message $m_0$, and an expression $m_{0,5}$ can indicate the $5^{th}$ bit of the first message m.

The expression κ may refer to a security parameter. In a sense, the security parameter κ relates to the security of the oblivious transfer method being performed by the sender computer and the receiver computer. The higher the value of κ, the more secure the oblivious transfer protocol. In some oblivious transfer protocols according to embodiments, steps may be performed multiple times based on the value of κ. For example, a sender computer can determine a single secret key sk, which can be used to perform oblivious transfer methods according to embodiments. Alternatively, the sender computer can determine κ secret keys $sk_i$, which can be used to perform the oblivious transfer methods. Generally, a hacker or malicious user can theoretically defeat the oblivious transfer system by determining the secret key sk. Hence, by determining multiple (e.g., κ) secret keys $sk_i$, the system is more secure, as a hacker or malicious user needs to determine multiple secret keys $sk_i$ (rather than one) in order to defeat the oblivious transfer system.

An index i can be used to refer to a particular secret key $sk_i$, public key $pk_i$, etc. For example, an expression $sk_i$ can indicate an $i^{th}$ secret key, and an expression $sk_5$ can indicate a fifth secret key. Although they may often be K elements (e.g., secret keys) of a particular set of elements, it should not be assumed that when referring to the $i^{th}$ element of a set of elements (e.g., secret keys $sk_i$) that there are always K total elements in that set. In embodiments of the present disclosure, the index i can be used regardless of the exact total number of elements.

Throughout this disclosure, collections of elements may be referenced. For example, an expression $\{sk_i\}_{i\in\kappa}$ may refer to all κ secret keys, and an equation $m_0=\{m_{0,j}\}_{j\in n}$ may be understood to mean "the first message $m_0$ comprises all n individual message bits $m_0$." However, to avoid long mathematical expressions, some shorthand is occasionally used through embodiments of the present disclosure. Rather than, e.g., $\{sk_i\}_{i\in\kappa}\leftarrow\mathbb{Z}_q$, an expression such as $sk_i<\leftarrow\mathbb{Z}_q$ may be used. While such an expression is somewhat ambiguous (e.g., it can be interpreted as "the $i^{th}$ secret key $sk_i$ can be sampled from an interval of integers $\mathbb{Z}_q$ based on (e.g., modulo) a prime number q" or "multiple secret keys $sk_i$, differentiated by their respective indices i can be sampled from an interval of integers $\mathbb{Z}_q$ based on (e.g., modulo) a prime number q"), usually the meaning of such expressions may be clear based on context, e.g., with reference to the written description that accompanies such mathematical expressions or equations.

In some cases, particularly with regard to string oblivious transfer, an expression may be indexed with both an i and a j, e.g., $sk_{i,j}$. This may be applicable when the sender computer or receiver computer determines one or more sets of "elements," where each set of elements can comprise multiple elements. For example, a sender computer can determine one or more sets of secret keys $sk_{i,j}$. The expression $sk_{i,j}$ can (in some contexts) be understood to mean "the $i^{th}$ (of κ) secret key from the $j^{th}$ (of n) sets of secret keys." With regard to sets of elements, shorthand may be used. For example, based on context, an expression such as $sk_{i,j} \leftarrow \mathbb{Z}_q$ may be understood mean that "j sets of secret keys, each comprising some number of secret keys (e.g., K) indexed by i can be sampled from an interval of integers $\mathbb{Z}_q$ based on (e.g., modulo) a prime number q."

During the course of single bit oblivious transfer methods, a sender computer can generate one or more first public keys $pk_{0,i}$ and one or more second public keys $pk_{1,i}$. During a string oblivious transfer method, the sender computer could instead generate one or more sets of first public keys $pk_{0,i,j}$ and one or more sets of second public keys $pk_{1L}$. An expression such as $pk_{0,i,j}$ can be interpreted to mean either, e.g., "the $i^{th}$ first public key from the $j^{th}$ set of first public keys" or "all first public keys from all j sets of first public keys," depending on context.

For example, during a random string oblivious transfer method, a sender computer can transmit a second oblivious transfer message $ot_2=(pk_{0,i,j}, \sigma_j)$ to a receiver computer. The second oblivious transfer message can comprise j sets of first public keys $pk_0$ and j obfuscated messages $\sigma_j$. From context, it is clear that in the equation $ot_2=(pk_{0,i,j}, \sigma_j)$, $pk_{0,i,j}$ refers to "all first public keys from all j sets of first public keys $pk_0$," and $\sigma_j$ refers to "all j obfuscated messages σ."

An equation or expression that uses ellipses (" . . . "), such as $$t_0 = H(pk_{0,i}^{r_0}, \ldots),$$

may indicate that such an equation or expression may have multiple suitable inputs or terms. For example the equation $$t_0 = H(pk_{0,i}^{r_0}, \ldots)$$

relates to how a receiver computer can generate a first message computation value $t_0$, using a hardcore predicate function H, and one or more exponentiated first public keys $$pk_{0,i}^{r_0}.$$

For example, if there are three exponentiated first public keys, $$pk_{0,1}^{r_0}, pk_{0,2}^{r_0}, pk_{0,3}^{r_0},$$

the equation $$t_0 = H(pk_{0,i}^{r_0}, \ldots)$$

could be interpreted as $$t_0 = H(pk_{0,1}^{r_0}, pk_{0,2}^{r_0}, pk_{0,3}^{r_0}).$$

Alternatively if there are κ exponentiated first public keys, the equation $$t_0 = H(pk_{0,i}^{r_0}, \ldots)$$

could be interpreted as $$t_0 = H(pk_{0,1}^{r_0}, pk_{0,2}^{r_0}, \ldots, pk_{0,\kappa}^{r_0}).$$

As in other cases, such equations or expressions are usually paired with textual descriptions that may make the meaning of such equations or expressions clear.

In some cases, a sender computer or a receiver computer can repeatedly perform an operation that can be described using a mathematical expression or operation. For example, a sender computer can generate one or more obfuscated messages $\sigma_1=m_{0,j} \oplus a_1$ by calculating one or more exclusive ors (XOR) of one or more first message bits $m_{0,j}$ and one or more obfuscation bits $a_j$. Although a more literal interpretation of $\sigma_j=m_{0,j} \oplus a_j$, may be "the $j^{th}$ obfuscated message can be generated by calculating an exclusive or (XOR) of the $j^{th}$ first message bit $m_{0,j}$ and the $j^{th}$ obfuscation bit $a_j$," it may be clear based on context that this operation is performed for all j obfuscated messages $\sigma_j$ first message bits $m_{0,j}$, and obfuscation bits $a_j$. As described above, short handing expressions such as $\sigma_j=m_{0,j} \oplus a_j$ avoids the use of cumbersome (but less ambiguous) expressions such as $$\{\sigma_j\}_{j \in n} = \{m_{0,j} \oplus a_j\}_{j \in n}.$$

As stated above, expressions i and j can correspond to indices, which may relate to a security parameter κ and a message length n respectively. As described above an expression such as $m_j$ can be interpreted as the $j^{th}$ bit of the first message $m_1$, or may be interpreted differently based on context.

Prior to describing embodiments of the present disclosure in more detail, it may be helpful to distinguish between "oblivious transfer methods," "oblivious transfer routines," and "oblivious transfer rounds." An oblivious transfer method usually refers to a complete method or process used to obliviously transfer a message from a sender computer to a receiver computer. An "oblivious transfer routine" usually refers to some (often sequential) series of steps that are part of an oblivious transfer method. Oblivious transfer routines can often be completed probabilistically in polynomial time. An "oblivious transfer round" usually refers to some (often sequential) series of steps that are part of an oblivious transfer method and involve the generation and transmission of an "oblivious transfer message" from the sender computer to the receiver computer, or vis versa. Typically, oblivious transfer methods are characterized by their round count (e.g., a "three round random string oblivious transfer method").

In some contexts, an oblivious transfer method can be referred to as a "tuple" (i.e., a list) of probabilistic polynomial time oblivious transfer routines, some of which may be oblivious transfer rounds. For example the first oblivious transfer method (described below with reference to FIGS. 5A-5B), can be represented by the tuple $$OT^{(1)}_{R \to S},\ OT^{(2)}_{S \to R},$$

and $OT_R$. In this case, an expression such as $$OT^{(1)}_{R \to S}$$

indicates that it is the first (1) oblivious transfer round, and that it involves transmission of an oblivious transfer message from the receiver R to the sender S. An expression such as $OT_R$ indicates that it is an oblivious transfer routine carried out by the receiver R which does not involve the transmission of an oblivious transfer message, and is hence not an oblivious transfer round. Oblivious transfer messages may sometimes be represented using ot. For example $ot_2$ may refer to a second oblivious transfer message.

The equations, expressions, and terms introduced above are described in more detail below, particularly regarding their relevance to methods according to embodiments of the present disclosure, and with reference to FIGS. 5A-5B, 7A-7C, and 9A-9C. The purpose of this introduction was primarily to orient the reader to some of the descriptive and mathematical conventions used throughout this disclosure, as well as introduce many of the most common expressions used throughout the disclosure, rather than to provide a detailed description of methods and systems according to embodiments.

As described above, the first oblivious transfer method according to embodiments can comprise a one-out-of-two random single bit oblivious transfer. As stated above, this one-out-of-two random single bit oblivious transfer can be used as a "building block" to implement the second oblivious transfer method (i.e., the one-out-of-two random string oblivious transfer method) and the third oblivious transfer method (i.e., the one out of two non-random string oblivious transfer method). While specific details on how this can be achieved are described in more detail with reference to FIGS. 7A-7C and 9A-9C below, it may be useful to describe this concept at a high level before describing embodiments of the present disclosure in more detail.

Figure 1B:
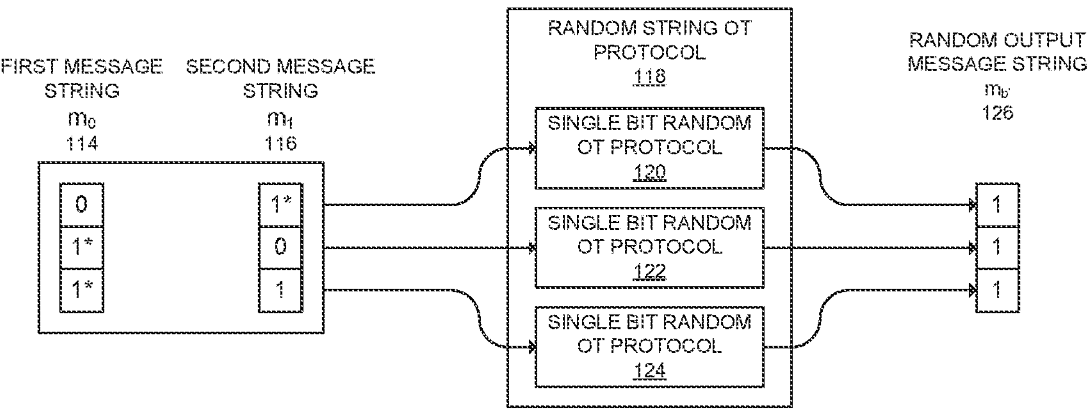
FIG. 1B shows a diagram detailing how a random single bit oblivious transfer protocol can be used to perform random string oblivious transfer.

FIGS. 1A and 1B show an overview of a random single bit oblivious transfer method and a random string oblivious transfer method respectively. These figures are primarily intended to introduce the reader to some useful concepts that may help the reader better understand embodiments of the present disclosure. Particularly, FIGS. 1A and 1B generally show how random string oblivious transfer can be implemented by repeatedly performing random single bit oblivious transfer. However, it should be understood that that the methods of FIGS. 1A and 1B are described in a manner that is general and accessible rather than perfectly accurate. As such FIGS. 1A and 1B are not intended to be limiting. More detailed descriptions of methods according to embodiments can be found below, particularly with reference to FIGS. 5A-5B, 7A-7C, and 9A-9C.

Referring to FIG. 1A, in a single bit one-out-of-two random oblivious transfer method, a sender computer 102 can possess two messages, a first message $m_0$ 106 and a second message $m_1$ 108. Each of these messages can comprise a single bit. Although these messages are shown in FIG. 1A with two different Boolean values, it is possible for these messages to have the same value. To accomplish the random single bit oblivious transfer, the sender computer 102 and the receiver computer 104 can execute a single bit random oblivious transfer protocol 110. As a result of the single bit random oblivious transfer protocol 110, the receiver computer 104 can determine an output message bit $m_{b'}$ 112, which can comprise either the first message $m_0$ 106 or the second message $m_1$ 108, determined effectively at random.

FIG. 1B illustrates how multiple single bit random oblivious transfer protocols 120-124 can be executed in order to accomplish a random string oblivious transfer protocol 118. Like in FIG. 1A, the sender computer 102 can possess a first message $m_0$ 114 and a second message $m_1$ 116. Both of these messages can comprise message strings comprising a number of message bits, e.g., three message bits as depicted in FIG. 1B. The sender computer 102 and the receiver computer 104 can repeatedly perform a series of single bit random oblivious transfer protocols 120-124, one for each "matching pair" of message bits (e.g., message bits from the first message $m_0$ 114 and the second message $m_1$ 116 that occupy the same index i in their respective message), which can result in the receiver computer 104 determining a series of output message bits that comprise the random output message string $m_{b'}$ 126.

The message bit transmitted in each random single bit oblivious transfer protocol 120-124 are indicated in FIG. 1B using asterisks (*). As depicted in FIG. 1B, in single bit random oblivious transfer protocol 120, the receiver computer 104 receives the bit "1" from the second message $m_1$ 116. In single bit random oblivious transfer protocol 1122, the receiver computer 104 receives the bit "1" from the first message $m_0$ 114. In single bit random oblivious transfer protocol 124, the receiver computer 104 receives the bit "1" from the first message $m_0$ 114. These bits can collectively comprise the output message $m_{b'}$ 126 (which can comprise a random output message string) produced by the receiver computer 104.

In a technical sense, the random string oblivious transfer protocol 118 does not satisfy the conditions of oblivious transfer, because the random output message string $m_{b'}$ 126 is not equivalent to either the first message $m_0$ 114 or the second message $m_1$ 116. This fails the condition that the receiver computer 104 receive exactly one of the two messages possessed by the sender computer 102, as the receiver computer 104 has not technically received either the first message $m_0$ 114 or second message $m_1$ 116.

Some embodiments of the present disclosure, particularly the second oblivious transfer method described below with reference to FIGS. 7A-7C address this problem. In particular, the second oblivious transfer method involve some addition steps to overcome this problem including updating the first message $m_0$ 114 and the second message $m_1$ 116, such that these embodiments meet the conditions of oblivious transfer. As stated above, FIG. 1B is not particularly representative of embodiments of the present disclosure, and is mainly used to illustrate, in a broad sense, how random string oblivious transfer can be built, in part, by repeatedly performing random single bit oblivious transfer protocols, one for each bit in each message.

Another aspect illustrated by FIG. 1B is the nature of the "randomness" present in the random output message $m_{b'}$ 126. The random output message $m_{b'}$ 126 is effectively a random combination of the first message $m_0$ 114 and the second message $m_1$ 116, rather than e.g., either the first message $m_0$ 114 or the second message $m_1$ 116 selected randomly, and as such, may not have any inherent or immediate meaning. As a non-Boolean analogy, if the first message $m_0$ 114 was an English language string such as "HORSE" and the second message $m_1$ 116 was a English language string such as "TIGER" it is more likely that the output message $m_{b'}$ 126 comprises a non-English language string such as "TOGSR," "HIRSR," "TIRER" rather than e.g., "HORSE" or "TIGER."

Obfuscated messages are used in various oblivious transfer methods according to embodiments. As such, it may be useful to describe some characteristics obfuscation messages prior to describing embodiments in more detail. An obfuscated message may "convey" some message or message bit in an obfuscated form, such that by de-obfuscating the obfuscated message, an entity (e.g., a receiver computer) can acquire the message or message bit. Additionally, entities cannot determine the message or message bit conveyed by the obfuscated message without de-obfuscating the obfuscated message. The use of obfuscated message can comprise a means by which a message is obliviously transferred by a sender computer to a receiver computer.

A ciphertext is a useful analogy for an obfuscated message. A plaintext message (e.g., "HORSE") can be encrypted to produce a ciphertext. The ciphertext conveys the plaintext message, however, an entity cannot determine the plaintext message without decrypting the ciphertext. This is similar to how an entity cannot determine a message bit conveyed by an obfuscated message without de-obfuscating the obfuscated message.

There are some differences between convention ciphertexts and obfuscated messages as described herein. In a ciphertext, the message used to "generate" the ciphertext (i.e., the plaintext) is the same as the message conveyed by the ciphertext. For example, if a message such as "HORSE" is encrypted to produce a ciphertext, it is expected that the ciphertext will decrypt to produce the message "HORSE." It would be unusual for the ciphertext to decrypt to produce a different message, such as "TIGER."

In embodiments of the present disclosure however, it is possible for the sender computer to generate an obfuscated message using one message that "conveys" a different message, which may be somewhat unintuitive. For example, in the first oblivious transfer method and the second oblivious transfer method described below, the sender computer can generate one or more obfuscated messages $\sigma_j$ using a first message $m_0$ possessed by the sender computer. However, that does not mean that the sender computer is always obliviously transferring the first message $m_0$ to the receiver computer. The sender computer can generate an obfuscated message $\sigma_j$ using a message bit from the first message $m_0$, but in effect obliviously transfer a message bit from the second message $m_1$.

This property can be a result of the limited nature of Boolean algebra, particularly with regard to Boolean algebra performed with random or pseudorandom bits. A single bit can only take on one of two values: 0 ("FALSE") or 1 ("TRUE"), which means that, fairly often, a random process or function applied to one message bit (e.g., $m_{0,j}$) can coincidentally produce a different message bit $m_1$.

As an example, consider two single bit messages possessed by a sender computer, $m_0=0$ and $m_1=1$, an obfuscation bit a=1 (known to the sender computer), and a random de-obfuscation bit t (generated by the receiver computer). A sender computer can produce an obfuscated message by obfuscating the first message $m_0$ using the obfuscation bit a by calculating the exclusive or (XOR) of the first message $m_0$ and the obfuscation bit a, i.e., $\sigma=m_0 \oplus a=0 \oplus 1=1$. The sender computer can send the obfuscated message a to the receiver computer. The receiver computer can then produce an output message $m_{b'}$ by de-obfuscating the obfuscated message $\sigma$ using the random de-obfuscation bit t, e.g., by calculating an exclusive or (XOR) of the obfuscated message $\sigma$ and the random de-obfuscation bit t, i.e., $m_{b'}=\sigma\oplus t$.

The random de-obfuscation bit t can randomly take the value t=0 or t=1. If t=0, the output message $m_{b'}$ evaluates to 1 ($m_{b'}\sigma\oplus t=1 \oplus 0=1$), which is equal to the second message $m_1$. In this case, the obfuscated message $\sigma$ effectively conveys the second message $m_1$, even though it was generated with the first message $m_0$. By contrast, if t=1, the output message $m_{b'}$ evaluates to 0 ($m_{b'}=\sigma\oplus t=1 \oplus 1=0$), which is equal to the first message m. This demonstrates that (in this example) the value of the random de-obfuscation bit t can effectively determine which message is conveyed by the obfuscated message $\sigma$, regardless of which message was actually used to generate the obfuscated message $\sigma$.

Figure 2:
FIG. 2 shows a diagram of an exemplary oblivious transfer system according to some embodiments of the present disclosure.

Having described oblivious transfer, random oblivious transfer, some characteristics of embodiments of the present disclosure, variable conventions, a general implementation of random string oblivious transfer from random single bit oblivious transfer, and properties of obfuscated messages, it may be now be helpful to describe an oblivious transfer system according to some embodiments. FIG. 2 shows a diagram of an exemplary oblivious transfer system 200 according to some embodiments of the present disclosure. The oblivious transfer system 200 can comprise a sender computer 202 (described in more detail below with reference to FIG. 3), a receiver computer 204 (described in more detail below with reference to FIG. 4), and a communication network 206.

The communication network 206 can take any suitable form, and may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the sender computer 202 and the receiver computer 204 may be transmitted using a communication protocol, such as, but not limited to, File Transfer Protocol (FTP); Hypertext Transfer Protocol (HTTP); Secure Hypertext Transfer Protocol (HTTPS); Secure Socket Layer (SSL), ISO (e.g., ISO 8583) and/or the like.

The sender computer 202 and receiver computer 204 can communicate with one another via the communication network 206 in order to perform any of the oblivious transfer methods describe herein. The oblivious transfer method may result in the receiver computer 204 receiving one of two messages possessed by the sender computer 202, referred to herein as a first message $m_0$ and a second message $m_1$. Depending on the method under consideration (e.g., the first oblivious transfer method, the second oblivious transfer method, or the third oblivious transfer method), the first message $m_0$ and a second message $m_1$ may comprise single bits, random strings of bits, or non-random strings of bits.

The message received by the receiver computer (i.e., an output message $m_b$ or $m_{b'}$) may be determined by a receiver choice bit b or a random receiver choice bit b', which may be known to (or determinable by) the receiver computer 204, and which may be unknown to the sender computer 202. Over the course of either the first oblivious transfer method, the second oblivious transfer method, or the third oblivious transfer method, the sender computer 202 and receiver computer 204 can exchange oblivious transfer messages, including a first oblivious transfer message $ot_i$, a second oblivious transfer message $ot_2$, and a third oblivious transfer message $ot_3$ via communication network 206. One of these oblivious transfer messages may comprise one or more obfuscated messages $\sigma_j$, which the receiver computer 205 can de-obfuscate in order to acquire the output message $m_b$ or $m_{b'}$.

Figure 3:
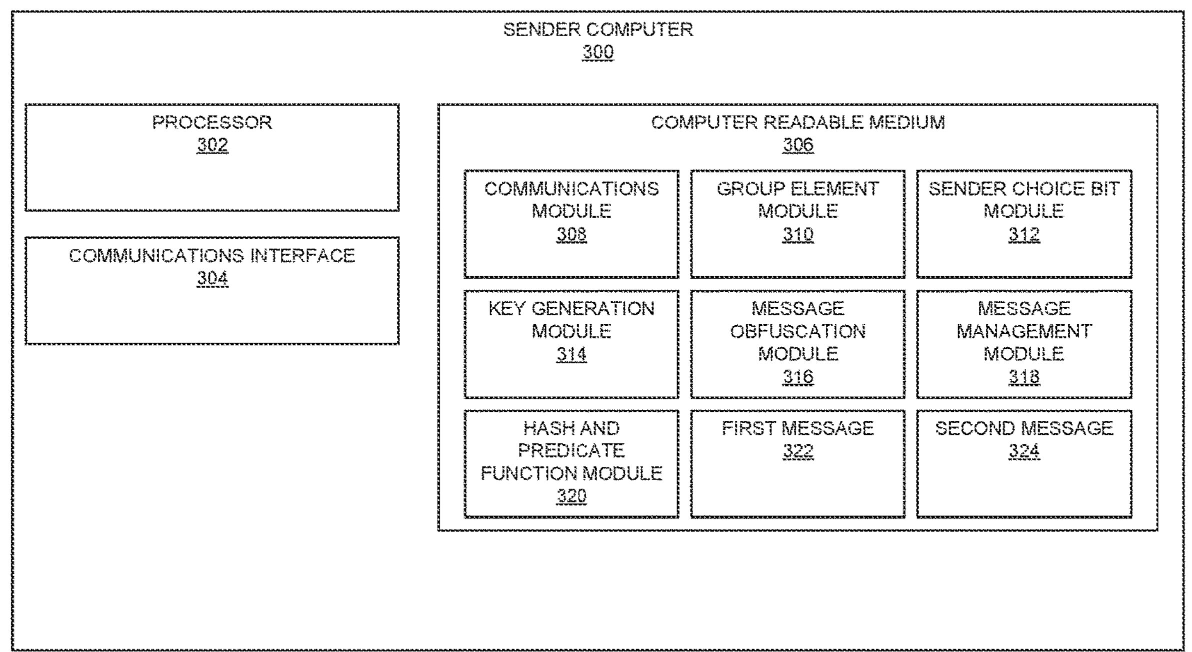
FIG. 3 shows a system block diagram of an exemplary sender computer according to some embodiments of the present disclosure.

A sender computer may be better understood with reference to FIG. 3, which shows an exemplary sender computer 300 comprising a processor 302, a communications interface 304, and a computer readable medium 306. The computer readable medium 306 may be non-transitory and coupled to the processor 302. The computer readable medium 306 may contain data, code, and/or software modules, which may be used by the sender computer 300 to implement some methods according to embodiments. These data, codes, and/or software modules may include a communications module 308, a group element module 310, a sender choice bit module 312, a key generation module 314, a message obfuscation module 316, a message management module 318, a hash and predicate function module 320, a first message $m_0$ 322 and a second message $m_1$ 324. It should be understood that the particular software modules were chosen primarily for the purpose of explaining some method steps or operations according to embodiments, and that FIG. 3 shows only one of a large number of valid sender computer configurations. Many alternative configurations may become apparent to a skilled cryptographer. As an example, the software modules displayed in FIG. 3 could be combined into a single monolithic software application in order to implement some of the methods described herein.

As stated above, the sender computer 300 can possess a first message $m_0$ 322 and a second message $m_1$ 324. The first message $m_0$ 322 may comprise one or more first message bits $m_{0,j}$ and the second message $m_1$ 324 may comprise one or more second message bits $m_{0,j}$. Generally, the role of the sender computer 300 in oblivious transfer methods is to transmit one of these two messages to the receiver computer, without knowing which message it transmitted and without inadvertently revealing the other message to the receiver computer. The sender computer 300 may use its components, software modules, code, data, etc., to perform this function.

In some methods according to embodiments (e.g., the "first oblivious transfer method" summarized above), the first message $m_0$ 322 and second message $m_1$ 324 can comprise single bits. In others (e.g., the "second oblivious transfer method" and "third oblivious transfer method" summarized above), the first message $m_0$ 322 and second message $m_1$ 324 can comprise strings of bits of arbitrary length. Consequently, the first message $m_0$ 322 and the second message $m_1$ 324 can comprise most forms of digital data, as most digital data can be represented as strings of bits. For example, the first message $m_0$ 322 and second message $m_1$ 324 could comprise text documents, image files, audio files, videos, executable applications, etc. It is not necessary that the first message $m_0$ 322 and the second message $m_1$ 324 comprise similar types of data, for example, the first message $m_0$ 322 could comprise a text file and the second message $m_1$ 324 could comprise an audio file.

Processor 302 may comprise any suitable data computation device or devices. Processor 302 may be able to interpret code and carry out instructions stored on computer readable medium 306. Processor 302 may comprise a Central Processing Unit (CPU) operating on a reduced instructional set, and may comprise a single or multi-core processor. Processor 302 may also include an Arithmetic Logic Unit (ALU) and a cache memory.

Communications interface 304 may comprise any interface by which sender computer 300 may communicate with other computers or devices. Examples of communication interfaces include: wired interfaces, such as USB, Ethernet, or FireWire, as well as wireless interfaces such as Bluetooth or Wi-Fi receivers. Sender computer 300 may possess multiple communications interfaces 304. As an example, sender computer 300 may communicate through an Ethernet interface as well as a USB port.

Sender computer 300 may communicate with other devices or computers via one or more secure and authenticated point-to-point channels. These channels may use a standard public key infrastructure. For example, sender computer 300 and a receiver computer may exchange a symmetric key via their communication interfaces. This key exchange may comprise, for example, a Diffie-Hellman key exchange. After exchanging cryptographic keys, the sender computer 300 and the receiver computer may communicate over a public channel (such as an unsecured network) using a standard authenticated encryption scheme. Messages between sender computer 300 and the receiver computer can be encrypted with a symmetric cryptographic key. Additional authentication methods, such as digital signatures, can also be used.

However, it should be understood that in some embodiments, such security may not be necessary. Methods according to embodiments are designed such that the sender computer 300 is unable to determine, for example, which of the two messages (i.e., first message $m_0$ 322 and second message $m_1$ 324) that the receiver computer is able to successfully de-obfuscate (i.e., receive). The receiver computer may de-obfuscate messages using information (e.g., a receiver choice bit b or a random receiver choice bit b') that can be unknown to the sender computer 300. Presumably, if this information is unknown to all entities other than the receiver computer, then any potential eavesdroppers or "men-in-the-middle," will be unable to de-obfuscate the messages, regardless of whether communications between the sender computer 300 and the receiver computer are encrypted or not. While mutual authentication is often preferable, it may not be necessary for the sender computer 300 and the receiver computer to communicate over a secure encrypted channel.

Communications module 308 may comprise code, software, or instructions that may be interpreted and executed by processor 302. This software may be used by sender computer 300 to communicate with other computers, devices, and entities, particularly a receiver computer. As stated above, in embodiments of the present disclosure, oblivious transfer methods can be used to transmit either the first message $m_0$ 322 or the second message $m_1$ 324 from the sender computer 300 to the receiver computer. Such oblivious transfer methods can involve a number of oblivious transfer rounds. In each round, either the sender computer 300 can transmit an "oblivious transfer message" to the receiver computer, or conversely, the receiver computer can transmit an oblivious transfer message to the sender computer 300. The communications module 308 can be used to manage the transmission and receipt of these oblivious transfer messages.

As stated above, these oblivious transfer messages can be distinct from the first message $m_0$ 322 and the second message $m_1$ 324. Generally, the oblivious transfer messages can contain data and other information that can be used to transfer the first message $m_0$ 322 or the second message $m_1$ 324 to the receiver computer, but they may not contain the first message $m_0$ 322 or the second message $m_1$ 324 in plaintext form. In the first oblivious transfer method according to embodiments, there may be two oblivious transfer rounds and two oblivious transfer messages (a first oblivious transfer message $ot_1$ and a second oblivious transfer message $ot_2$). In the second oblivious transfer method according to embodiments, there may be three oblivious transfer rounds and three oblivious transfer messages (a first oblivious transfer message $ot_i$, a second oblivious transfer message $ot_2$, and a third oblivious transfer message $ot_3$). In the third oblivious transfer method according to embodiments, there may also be three oblivious transfer rounds and three oblivious transfer messages (a first oblivious transfer message $ot_i$, a second oblivious transfer message $ot_2$, and a third oblivious transfer message $ot_3$).

As such, the communications module 308 can be used by the sender computer 300 to perform the act of generating oblivious transfer messages (e.g., in the first oblivious transfer method and the second oblivious transfer method, the sender computer 300 can generate a second oblivious transfer message $ot_2$, while in the third oblivious transfer method the sender computer 300 can generate a first oblivious transfer message $ot_1$ and a third oblivious transfer message $ot_3$), sending those oblivious transfer messages to the receiver computer, receiving oblivious transfer messages (e.g., in the first oblivious transfer method the sender computer 300 can receive a first oblivious transfer message $ot_1$, in the second oblivious transfer method the sender computer 300 can receive a first oblivious transfer message $ot_1$ and a third oblivious transfer message $ot_3$, and in the third oblivious transfer method the sender computer 300 can receive a second oblivious transfer message $ot_2$) from the receiver computer, and interpreting any received oblivious transfer messages.

The sender computer 300 may also use communications module 308 to transmit hashes of messages (e.g., a first message hash $M_0=h(m_0)$ and a second message hash $M_1=h(m_1)$) to the receiver computer, along with hash function(s) h or hash function indicators. The receiver computer can use the hash function(s) h or hash function indicators to determine its own message hashes, which can be compared to the first message hash $M_0$ or second message hash $M_1$ in order to verify completion of the oblivious transfer protocol.

The communications module 308 may enable the sender computer 300 to perform these functions and communicate with other computers and devices according to any appropriate communication protocol, such as the user datagram protocol (UDP), the transmission control protocol (TCP), ISO 8583, etc.

Group element module 310 may comprise code, software, or instructions that may be interpreted and executed by processor 302. This software or code may be used by sender computer 300 to determine one or more group elements $Q_1$ by randomly sampling these group elements from a cyclic group G. These one or more group elements $Q_1$ may be used by the sender computer 300 to generate one or more first public keys $pk_{0,i,j}$, and one or more second public keys $pk_{1,i,j}$, which may be included in oblivious transfer messages. Additionally, sender computer 300 can use group element module 310 to select one or more random group elements from one or more first random group elements $R_{0,j}$ and one or more second random group elements $R_{1,j}$, thereby determining one or more selected random group elements $R_{\gamma,j}$. The sender computer 300 can perform this selection process using one or more sender choice bits $\gamma_j$. These one or more selected random group elements $R_{\gamma,j}$ may be used by the sender computer 300 to generate one or more obfuscated messages $\sigma_j$, as described in more detail further below. In addition, group element module 310 can be used by sender computer 300 to perform operations on group elements or otherwise modify group elements, including performing operations such as exponentiation. For example the sender computer 300 can use group element module 310 to exponentiate the one or more selected random group elements $R_{\gamma,j}$ using one or more sets of secret keys $sk_{i,j}$, thereby determining one or more exponentiated selected random group elements

$$R_{\gamma,j}^{sk_{i,j}}.$$

Sender choice bit module 312 may comprise code, software, or instructions that may be interpreted and executed by processor 302. This software or code may be used by sender computer 300 in order to determine and store one or more sender choice bits $\gamma_j$, which may, as described above, be used in methods according to embodiments. For example, the sender computer 300 can use sender choice bits $\gamma_j$ to determine one or more first public keys $pk_{0,i,j}$, and one or more second public keys $pk_{1,i,j}$, as well as select random group elements, thereby determining selected random group elements $R_{\gamma,j}$.

More specifically, the sender computer 300 may use sender choice bit module 312 to calculate one or more exclusive ors (XORs) of one or more first message bits $m_{0,j}$ and one or more second message bits $m_{1,j}$, i.e., $\gamma_j=m_{0,j}\oplus m_{1,j}$. These one or more first message bits $m_{0,j}$ and one or more second message bits $m_{1,j}$ may correspond to the first message $m_0$ 322 and second message $m_1$ 324 respectively.

Key generation module 314 may comprise code, software, or instructions that may be interpreted and executed by processor 302. This software or code may be used by sender computer 300 in order to generate one or more sets of secret keys $sk_{i,j}$, one or more sets of first public keys $pk_{0,i,j}$ and one or more sets of second public keys $pk_{1,i,j}$. These secret keys and public keys may be used to perform oblivious transfer methods according to embodiments of the present disclosure. For example, the one or more sets of first public keys $pk_{0,i,j}$ may be used by the receiver computer to determine one or more message computation values $t_{0,j}$, which may be used by receiver computer to de-obfuscate one or more obfuscated messages $\sigma_j$.

More specifically, the sender computer 300 can use key generation module 314 to determine one or more sets of secret keys $sk_{i,j}$ by randomly sampling each secret key of the one or more sets of secret keys $sk_{i,j}$ from an interval of integers based on (e.g., modulo) a prime number $\mathbb{Z}_q$. Each set of secret keys $sk_{i,j}$ can comprise one or more secret keys, and each set of the one or more sets of secret keys can comprise a number of secret keys equal to a security parameter $\kappa$. The sender computer 300 can use the key generation module 314, the one or more sets of secret keys $sk_{i,j}$, one or more group elements $Q_j$ and a generator g to generate one or more sets of first public keys $pk_{0,i,j}$ and one or more sets of second public keys $pk_{1,i,j}$. Each set of first public keys $pk_{0,i,j}$ can comprise one or more first public keys, which can comprise a number of first public keys $pk_{0,i,j}$ equal to security parameter κ. Each set of second public keys $pk_{1,i,j}$ can comprise one or more second public keys, which can comprise a number of second public keys equal to the security parameter κ.

Message obfuscation module 316 may comprise code, software, or instructions that may be interpreted and executed by processor 302. This software or code may be used by sender computer 300 in order to determine one or more obfuscation bits $a_j$ and generate one or more obfuscated messages $\o_j$ using those one or more obfuscation bits $a_j$. The sender computer 300 can determine one or more obfuscation bits $a_j$ using a hardcore predicate function H (which may be part of hash and predicate function module 320), one or more selected random group elements $R_{\gamma,j}$ (which may be selected using group element module 310, as described above), and one or more sets of secret keys $sk_{i,j}$ (which may be generated using key generation module 314).

After determining the one or more obfuscation bits $a_1$, the sender computer 300 can use message obfuscation module 316 to determine one or more obfuscated messages $\sigma_j$ by calculating one or more exclusive ors (XORs) of one or more first message bits $m_{0,j}$ (which may be derived from the first message $m_0$ 322) and the one or more obfuscation bits $a_j$, i.e., $\sigma_j = m_{0,j} \oplus a_j$. In some embodiments, the sender computer 300 can determine the one or more obfuscated messages $\sigma_j$ by calculating one or more exclusive ors (XORs) of one or more chosen message bits $m_{z_j,j}$ and the one or more obfuscation bits $a_1$, i.e., $\sigma_1 = m_{z_j,j} \oplus a_1$. The sender computer 300 can select the one or more chosen message bits $m_{z_j,j}$ using message management module 318, as described below.

Message management module 318 may comprise code, software, or instructions that may be interpreted and executed by processor 302. In some embodiments (e.g., those relating to the third oblivious transfer method) this software or code may be used by sender computer 300 in order to select one or more chosen message bits $m_{z_j,j}$. In some embodiments (e.g., those relating to the second oblivious transfer method), the sender computer 300 can use message management module 318 to update the first message $m_0$ 322 and the second message $m_1$ 324, thereby determining an updated first message $$m'_0$$

and an updated second message $$m'_1.$$

The sender computer 300 may use message management module 318 to perform this function in order to make the second oblivious transfer method meet the requirements of oblivious transfer, i.e., that the receiver computer receives one of two messages (e.g., the updated first message $$m'_0$$

and the updated second message $$m'_1)$$

possessed by the sender computer 300. The functions performed by the sender computer using message management module 318 are described in more detail below with reference to FIGS. 6 and 7A-7C.

In more detail, the sender computer 300 can use the message management module 318 to select one or more chosen message bits $m_{z_j,j}$ from among one or more first message bits $m_0$ and one or more second message bits $m_{1,j}$ based on one or more indicator bits $z_j$ (which may be received from the receiver computer in an oblivious transfer message), such that a chosen message bit $m_{z_j,j}$ of the one or more chosen message bits $m_{z_j,j}$ is selected from a corresponding first message bit $m_{0,j}$ if a corresponding indicator bit $z_j$ is equal to zero or false, and is selected from a corresponding second message bit $m_{1,j}$ if a corresponding indicator bit $z_j$ is equal to one or true. Expressed otherwise, if $z_j=0$ then $m_{z_j,j}=m_1$ and if $z_j=1$ then $m_{z_j,j}=m_{1,j}$.

Hash and predicate function module 320 may comprise code, software, or instructions that may be interpreted and executed by processor 302. This software or code may include one or more hash functions h and a hardcore predicate function H, and may be used by the sender computer 300 to perform methods according to embodiments. For example, the sender computer 300 can use hash and predicate function module 320 to sample a hash function h, which can be used by the sender computer 300 and the receiver computer to verify that oblivious transfer methods were performed correctly. The sender computer 300 can use hash and predicate function module 320 to determine a first message hash $$M_0 = h(m'_0)$$

and a second message hash $$M_1 = h(m'_1)$$

using an updated first message $$m'_0,$$

an updated second message $$m'_1,$$

and the hash function h. Additionally, the sender computer 300 can use hash and predicate function module 320 in order to use a hardcore predicate function H to generate or determine values used to execute some methods according to embodiments, including determining one or more obfuscation bits $a_j$ using one or more exponentiated selected random group elements $$R_\gamma^{sk_i}$$

and the hardcore predicate function H.

Figure 4:
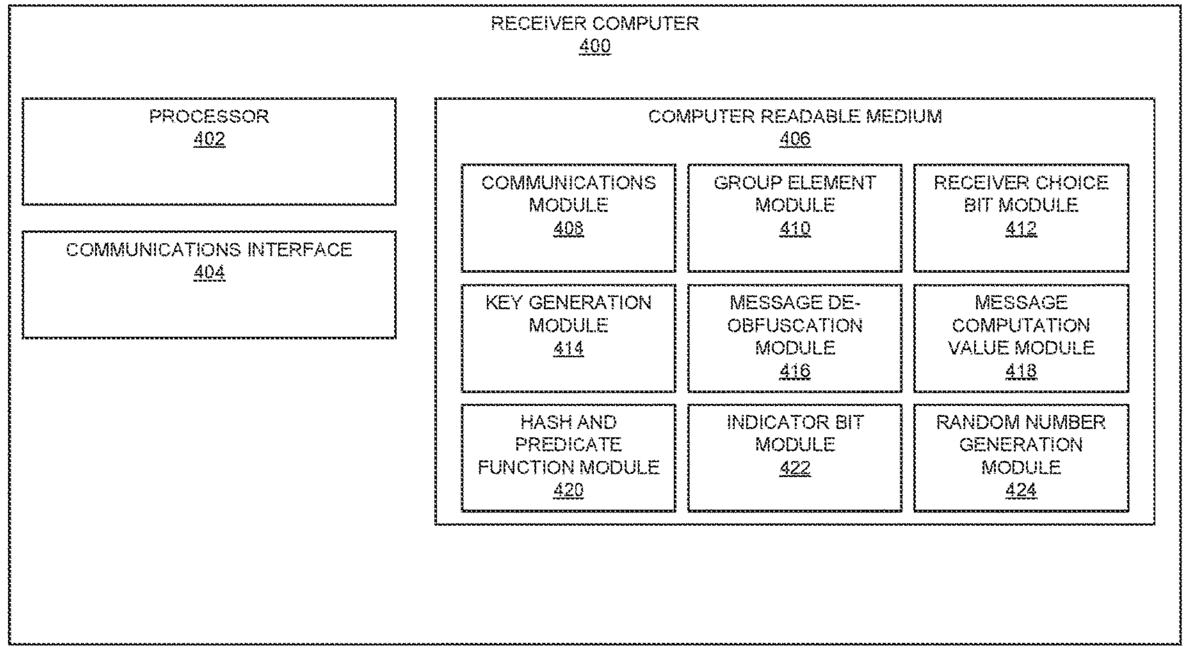
FIG. 4 shows a system block diagram of an exemplary receiver computer according to some embodiments of the present disclosure.

A receiver computer may be better understood with reference to FIG. 4, which shows an exemplary receiver computer 400 comprising a processor 402, a communications interface 404, and a computer readable medium 406. The computer readable medium 406 may be non-transitory and coupled to the processor 402. The computer readable medium 406 may contain data, code, and/or software modules, which may be used by the receiver computer 400 to implement some methods according to embodiments. These data, codes, and/or software modules may include a communications module 408, a group element module 410, a receiver choice bit module 412, a key generation module 414, a message de-obfuscation module 416, a message computation value module 418, a hash and predicate function module 420, an indicator bit module 422, and a random number generation module 424. It should be understood that the particular software modules were chosen primarily for the purpose of explaining some method steps or operations according to embodiments, and that FIG. 4 shows only one of a large number of valid receiver computer configurations. Many alternative configurations may become apparent to a skilled cryptographer. As an example, the software modules displayed in FIG. 4 could be combined into a single monolithic software application in order to implement some of the methods described herein.

As stated above, a sender computer can possess a first message $m_0$ and a second message $m_1$, which can each comprise one or more message bits. In oblivious transfer methods according to embodiments, the sender computer can obliviously transfer the first message $m_0$ or the second message $m_1$ to the receiver computer 400. Generally, the role of the receiver computer 400 is to perform actions to receive one of the two messages during the oblivious transfer. The receiver computer 400 may use its components, software modules, code, data etc., to perform this function. For example, the receiver computer 400 may use message de-obfuscation module 416 to de-obfuscate one or more obfuscated messages $\sigma_j$ received from the sender computer, thereby determining an output message $m_{b'}$ (or $m_b$), which can comprise either the first message $m_0$ or the second message $m_1$.

Processor 402 may comprise any suitable data computation device or devices. Processor 402 may be able to interpret code and carry out instructions stored on computer readable medium 406. Processor 402 may comprise a Central Processing Unit (CPU) operating on a reduced instructional set, and may comprise a single or multi-core processor. Processor 402 may also include an Arithmetic Logic Unit (ALU) and a cache memory.

Communications interface 404 may comprise any interface by which receiver computer 400 may communicate with other computers or devices. Examples of communication interfaces include: wired interfaces, such as USB, Ethernet, or FireWire, as well as wireless interfaces such as Bluetooth or Wi-Fi receivers. Receiver computer 400 may possess multiple communications interfaces 404. As an example, receiver computer 400 may communicate through an Ethernet interface as well as a USB port.

Receiver computer 400 may communicate with other devices or computers via one or more secure and authenticated point-to-point channels. These channels may use a standard public key infrastructure. For example, receiver computer 400 and a sender computer may exchange a symmetric key via their communication interfaces. This key exchange may comprise, for example, a Diffie-Hellman key exchange. After exchanging cryptographic keys, receiver computer 400 and the sender computer may communicate over a public channel (such as an unsecured network) using a standard authenticated encryption scheme. Messages between receiver computer 400 and the sender computer can be encrypted with a symmetric cryptographic key. Additional authentication methods, such as digital signatures, can also be used.

However, as stated above, it should be understood that in some embodiments, such security may not be necessary. Methods according to embodiments are designed such that the sender computer is unable to determine for example, which of the two messages (i.e., the first message $m_0$ and the second message $m_1$) that the receiver computer 400 is able to successfully de-obfuscate (i.e., receive). As stated above, the receiver computer 400 may de-obfuscate messages using some information (e.g., a receiver choice bit b), which can be unknown to the sender computer. Presumably, if this information is unknown to all entities other than the receiver computer 400, then any potential eavesdroppers or "men-in-the-middle," will be unable to de-obfuscate such messages, regardless of whether communications between the sender computer and the receiver computer 400 are encrypted or not. While mutual authentication is often preferable, it may not be necessary for the sender computer and the receiver computer 400 to communicate over a secure encrypted channel.

Communications module 408 may comprise code, software, or instructions that may be interpreted and executed by processor 402. This software may be used by receiver computer 400 to communicate with other computers, devices, and entities, particularly a sender computer. As stated above, in embodiments of the present disclosure, oblivious transfer methods can be used to transmit either a first message $m_0$ or a second message $m_1$ from the sender computer to the receiver computer 400. Such oblivious transfer methods can involve a number of oblivious transfer rounds. In each round, either the sender computer can transmit an "oblivious transfer message" to the receiver computer 400, or conversely, the receiver computer 400 can transmit an oblivious transfer message to the sender computer. The communications module 408 can be used to manage the transmission and receipt of these oblivious transfer messages.

As such, the communications module 408 can be used by the receiver computer 400 to perform the act of generating oblivious transfer messages, sending those oblivious transfer messages to the sender computer, receiving oblivious transfer messages from the sender computer, and interpreting any received oblivious transfer messages. In the first and second oblivious transfer methods for example, the receiver computer 400 can transmit a first oblivious transfer message $ot_1$ comprising one or more group elements $Q_j$, one or more first random group elements $R_{0,j}$ and one or more second random group elements $R_{1,j}$. Likewise, in the first and second oblivious transfer methods the receiver computer 400 can receive a second oblivious transfer message $ot_2$ from the sender computer. In the second oblivious transfer method, the receiver computer 400 can send a third oblivious transfer method $ot_3$ to the sender computer.

In the third oblivious transfer method, the receiver computer 400 can receive a first oblivious transfer message $ot_1$ comprising one or more group elements $Q_j$ and one or more sets of first public keys $pk_{0,i,j}$. Likewise, in the third oblivious transfer method, the receiver computer 400 can transmit a second oblivious transfer message $ot_2$ comprising one or more first random group elements $R_{0,j}$ one or more second random group elements $R_{1,j}$, and one or more indicator bits $z_j$ to the sender computer. Further, in the third oblivious transfer method, receiver computer 400 can receive a third oblivious transfer message $ot_3$ comprising one or more obfuscated messages $z_j$ from the sender computer.

Additionally, communications module 408 may enable receiver computer 400 to receive messages hashes (including a first message hash $M_0$, a second message hash $M_1$), and hash functions h or hash function indicators from the sender computer, which the receiver computer 400 can use to verify that oblivious transfer methods according to embodiments were performed correctly.

The communications module 408 may enable the receiver computer 400 to perform the functions and operations described above, in addition to enabling the receiver computer 400 to communicate with other computers and devices according to any appropriate communication protocol, such as the user datagram protocol (UDP), the transmission control protocol (TCP), ISO 8583, etc.

Group element module 410 may comprise code, software, or instructions that may be interpreted and executed by processor 402. This software or code may be used by receiver computer 400 to generate or determine group elements, including one or more group elements $Q_j$, one or more first random group elements $R_{0,j}$ and one or more second random group elements $R_{1,j}$. Group element module 410 can also be used by receiver computer 400 to perform operations on group elements or otherwise modify group elements, including performing operations such as exponentiation. For example, the receiver computer 400 can use group element module 410 to exponentiate a generator g using one or more first random numbers $r_{0,j}$. The receiver computer 400 can determine the one or more group elements $Q_j$ by using group element module 410 to randomly sample the one or more group elements $Q_j$ from a cyclic group G, which may be defined by a prime number q. The receiver computer 400 can determine the one or more first random group elements $R_{0,j}$ based on one or more first random numbers $r_{0,j}$ and a generator g, e.g., by using group element module 410 to exponentiate the generator g using the one or more first random numbers $r_{0,j}$ (e.g., $R_{0,j}=g^{r_{0,j}}$). The receiver computer 400 can determine the one or more second random group elements $R_{1,j}$ based on one or more second random numbers $r_{1,j}$ and a generator g, e.g., by using group element module 410 to exponentiate the generator g using the one or more second random numbers $r_{1,j}$ (e.g., $R_{1,j}=g^{r_{1,j}}$).

Receiver choice bit module 412 may comprise code, software or instructions that may be interpreted and executed by processor 402. This software or code may be used by receiver computer 400 in order to store and retrieve a receiver choice bit b, and generate one or more random receiver choice bits $$b'_j.$$

For example, receiver computer 400 can retrieve a receiver choice bit b from a secure memory region of computer readable medium 406 (which may comprise, e.g., receiver choice bit module 412 itself). The receiver computer 400 can also use receiver choice bit module 412 to determine one or more random receiver choice bits $b_j'$ by calculating one or more exclusive ors (XORs) of one or more first message computation values $t_{0,j}$ (e.g., generated using the message computation value module 418, described below) and one or more second message computation values $t_{1,j}$ (again, generated, for example, using the message computation value module 418), e.g., $$b'_j = t_{0,j} \oplus t_{1,j}.$$

The one or more random receiver choice bits $$b'_j$$

and the receiver choice bit b may be unknown to a sender computer, in order to preserve receiver privacy. The receiver choice bit b and one or more random receiver choice bits $$b'_j$$

may be used to generate one or more indicator bits $z_j$, which may be communicated by the receiver computer 400 to a sender computer, in order to perform some oblivious transfer methods according to embodiments.

Key generation module 414 may comprise code, software or instructions that may be interpreted and executed by processor 402. This software or code may be used by receiver computer 400 in order to generate cryptographic keys, particularly one or more sets of second public keys $pk_{1,i,j}$ using one or more sets of first public keys $pk_{0,i,j}$, and one or more group elements $Q_j$ contained in a first oblivious transfer message $$ot_1\left(\text{e.g., } pk_{1,i,j} = \frac{Q_j}{pk_{0,i,j}}\right).$$

Receiver computer 400 can use the one or more sets of first public keys $pk_{0,i,j}$, and one or more sets of second public keys $pk_{1,i,j}$ to determine one or more first message computation values $t_{0,j}$ and one or more second message computation values $t_{1,j}$ respectively, which may be used by the receiver computer 400 to de-obfuscate one or more obfuscated messages $\sigma_j$, thereby producing an output message $m_{b'}$ (or $m_b$). The one or more sets of first public keys $pk_{0,i,j}$, and one or more sets of second public keys $pk_{1,i,j}$ may have been initially determined by a sender computer. However, in order to reduce oblivious transfer message sizes (thereby improving the speed and efficiency of embodiments of the present disclosure), the first oblivious transfer message $ot_1$ may contain the one or more sets of first public keys $pk_{0,i,j}$, but not the one or more sets of second public keys $pk_{1,i,j}$. The receiver computer 400 can use key generation module 414 to generate the one or more sets of second public keys $pk_{1,i,j}$ in order to perform oblivious transfer methods according to embodiments of the present disclosure.

Message de-obfuscation module 416 may comprise code, software, or instructions that may be interpreted and executed by processor 402. This software or code may be used by receiver computer 400 to de-obfuscate one or more obfuscated messages $\sigma_1$ received from a sender computer, thereby determining an output message $m_{b'}$ (or $m_b$). The output message $m_{b'}$ (or $m_b$) can, in some embodiments, comprise either the first message $m_0$ or the second message $m_1$ possessed by the sender computer. The receiver computer 400 can use message de-obfuscation module 416 to de-obfuscate the one or more obfuscated messages $\sigma_j$ using one or more first message computation values $t_{0,j}$ (which may be generated using the message computation value module 418, described below) by computing one or more exclusive ors (XORs) of the one or more obfuscated messages $\sigma_j$ and the one or more first message computation values $t_{0,j}$, thereby determining one or more output message bits $m_{b,j}$ (e.g., $m_{b,j}-\sigma_j \oplus t_{0,j}$). The output message $m_b$ can comprise the one or more output message bits, (e.g., $m_b=\{m_{b,j}\}_{j\in n}$.

Message computation value module 418 may comprise code, software, or instructions that may be interpreted and executed by processor 402. This software or code may be used by receiver computer 400 to generate one or more first message computation values $t_{0,j}$ and one or more second message computation values $t_{1,j}$, which can be used by the receiver computer 400 to de-obfuscate the one or more obfuscated messages $\sigma_j$ and determine one or more random receiver choice bits $$b'_j$$

as described above.

The receiver computer 400 can use message computation value module 418 to generate the one or more first message computation values $t_{0,j}$ using one or more sets of first public keys $pk_{0,i,j}$, one or more first random numbers $r_{0,j}$ and a hardcore predicate function H. The receiver computer 400 can use message computation value module 418 to exponentiate each first public key of the one or more sets of first public keys $pk_{0,i,j}$, with a corresponding first random number of the one or more first random numbers $r_{0,j}$, thereby determining one or more sets of exponentiated first public keys (e.g., $$pk_{0,i,j}^{r_{0,j}}).$$

The receiver computer 400 can use message computation value module 418 to input each exponentiated first public key of the one or more exponentiated first public keys $$pk_{0,i,j}^{r_{0,j}}$$

into the hardcore predicate function H, thereby determining the one or more first message computation values $t_{0,j}$, (e.g., $$t_{0,j} = H\left(pk_{0,i,j}^{r_{0,j}}, \ldots\right)).$$

The receiver computer 400 can use message computation value module 418 to generate the one or more second message computation values $t_{1,j}$ using one or more sets of second public keys $pk_{1,i,j}$, one or more second random numbers $r_{1,j}$ and a hardcore predicate function H. The receiver computer 400 can use message computation value module 418 to exponentiate each second public key of the one or more sets of second public keys $pk_{1,i,j}$ with a corresponding second random number of the one or more second random numbers $r_{1,j}$, thereby determining one or more sets of exponentiated second public keys (e.g., $$pk_{1,i,j}^{r_{1,j}}).$$

The receiver computer 400 can use message computation value module 418 to input each exponentiated second public key of the one or more exponentiated second public keys $$pk_{1,i,j}^{r_{1,j}}$$

into the hardcore predicate function H, thereby determining the one or more second message computation values $t_{1,j}$ (e.g., $$t_{1,j} = H\left(pk_{1,i,j}^{r_{1,j}}, \ldots\right)).$$

The receiver computer 400 can additionally use hash and predicate function module 420 (described below) to generate the one or more first message computation values $t_{0,j}$ and the one or more second message computation values $t_{1,j}$, e.g., by using hash and predicate function module 420 to access the hardcore predicate function H.

Hash and predicate function module 420 may comprise code, software, or instructions that may be interpreted and executed by processor 402. This software or code may be used by receiver computer 400 to use a hash function h to generate an output message hash $h(m_b)$ and compare the output message hash $h(m_b)$ to a first message hash $M_0$ and a second message hash $M_1$, in order to verify that oblivious transfer methods according to embodiments were performed correctly. In addition, receiver computer 400 can use hash and predicate function module 420 to use a hardcore predicate function H in some steps or operations of methods according to embodiments. For example, receiver computer 400 can use hash and predicate function module 420 to determine one or more first message computation values $t_{0,j}$ using the hardcore predicate function H, the one or more sets of first public keys $pk_{0,i,j}$, and one or more first random numbers $R_{0,j}$ (e.g., $$t_{0,j} = H\left(R_{0,j}^{pk_{0,i,j}}, \ldots\right)).$$

Indicator bit module 422 may comprise code, software, or instructions that may be interpreted and executed by processor 402. This software or code may be used by receiver computer 400 to generate one or more indicator bits $z_j$, which can be used in the second oblivious transfer method to enable the sender computer to update the first message $m_0$ and the second message $m_1$, thereby producing an updated first message $$m'_0$$

and an updated second message $$m_1',$$

and which can be used by the sender computer in the third oblivious transfer method to generate one or more obfuscated messages $\sigma_j$. The receiver computer 400 can use indicator bit module 422 to determine one or more indicator bits $z_j$ based on a receiver choice bit b and one or more random receiver choice bits $$b_j'$$

by computing one or more exclusive ors (XORs) of the receiver choice bit b and the one or more random receiver choice bits $b_j'$, e.g., $$z_j = b \oplus b_j'.$$

Random number generation module 424 may comprise code, software, or instructions that may be interpreted and executed by processor 402. This software or code may be used by receiver computer 400 to generate random numbers, including one or more first random numbers $r_{0,j}$ and one or more second random numbers $r_{1,j}$, using any appropriate random or pseudorandom number generation method, including cryptographically secure pseudorandom number generators, such as the AES-CTR DRBG, ISAAC, Yarrow, ChaCha, etc. The receiver computer 400 can use random number generation module 424 to determine one or more first random numbers $r_{0,j}$ and one or more second random numbers $r_{1,j}$ by randomly sampling the one or more first random numbers $r_{0,j}$ and one or more second random numbers $r_{1,j}$ from an interval of integers $\mathbb{Z}_q$ based on (e.g., modulo) a prime number q.

The first oblivious transfer method is described below with reference to the sequence diagram of FIG. 5A-5B. The first oblivious transfer method can comprise three probabilistic polynomial time oblivious transfer routines, which can be represented by the expressions $$OT^{(1)}_{R\rightarrow S},\ OT^{(2)}_{S\rightarrow R},$$

and $OT_R$. The subscript R→S can indicate that a particular oblivious transfer routine involves a transmission of an oblivious transfer message (e.g., $ot_1$) from the receiver computer 504 R to the sender computer 502 S. Likewise, the subscript S→R can indicate that a particular oblivious transfer routine involves a transmission of an oblivious transfer message (e.g., $ot_2$) from the sender computer 504 S to the receiver computer 502 R. A subscript such as R can indicate that an oblivious transfer routine can involve operations performed by the receiver computer 504 R, but does not involve the transmission of any oblivious transfer messages.

Figure 5A:
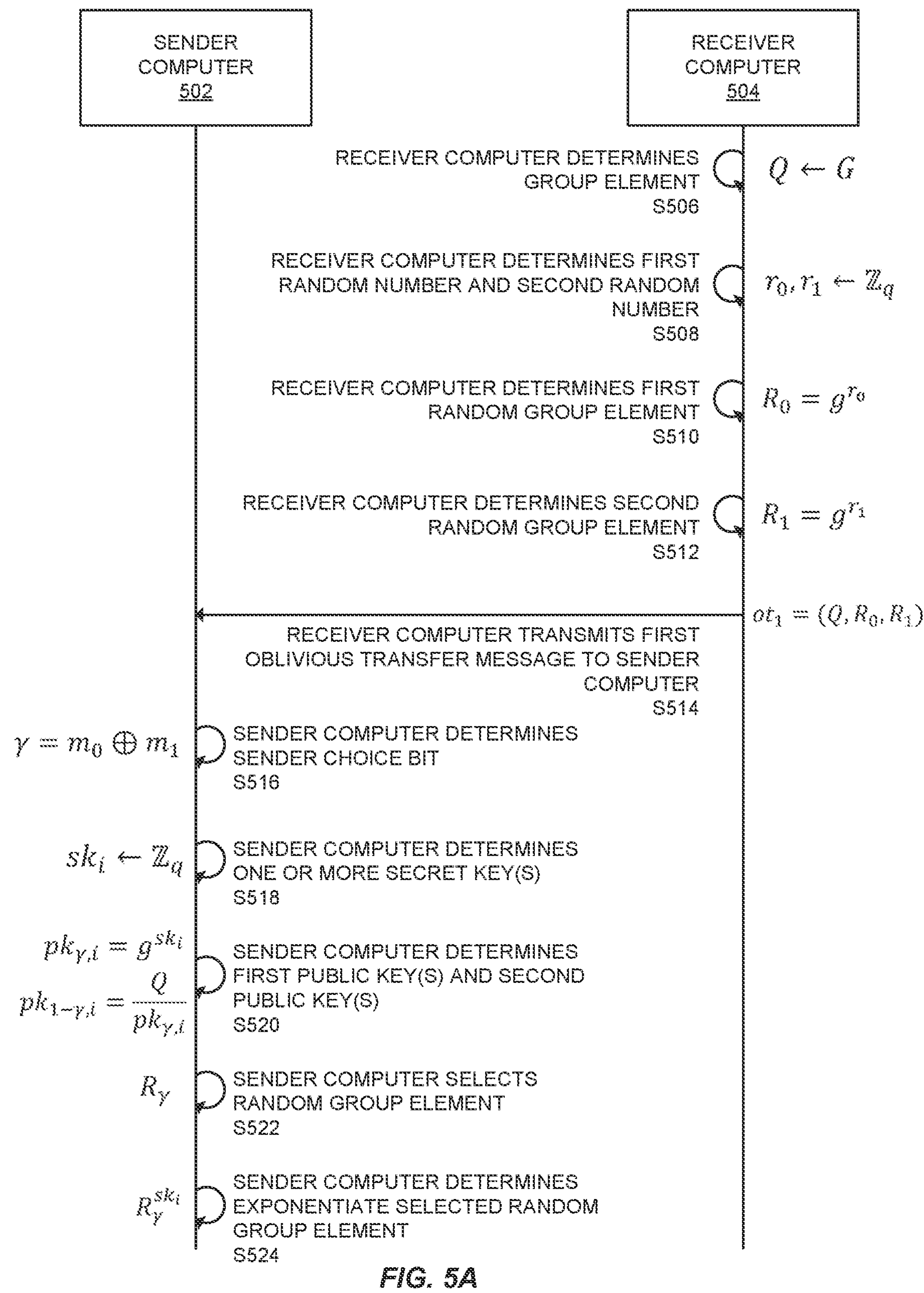
FIGS. 5A-5B show a sequence diagram of an exemplary method for performing a random single bit oblivious transfer according to some embodiments of the present disclosure.

The first oblivious transfer routine $$OT^{(1)}_{R\rightarrow S}(1^\kappa)$$

can be executed by the receiver computer 504 and result in an oblivious transfer message $ot_i$, which the receiver computer 504 can transmit to the sender computer 502. The first oblivious transfer routine $$OT^{(1)}_{R\rightarrow S}(1^\kappa)$$

can correspond to steps S506-S514 in FIG. 5A. During the first oblivious transfer routine $$OT^{(1)}_{R\rightarrow S},$$

the receiver computer 504 may generate some values that are not transmitted to the sender computer 502, such as a first random number $r_0$ and a second random number $r_1$. These random numbers may later be used by the receiver computer 504 to de-obfuscate an obfuscated message σ received from the sender computer 502, e.g., in the second oblivious transfer routine $$OT^{(2)}_{S\rightarrow R}.$$

The pair of random numbers $(r_0,r_1)$ may sometimes be referred to as a secret receiver internal state $st_R$.

Figure 5B:
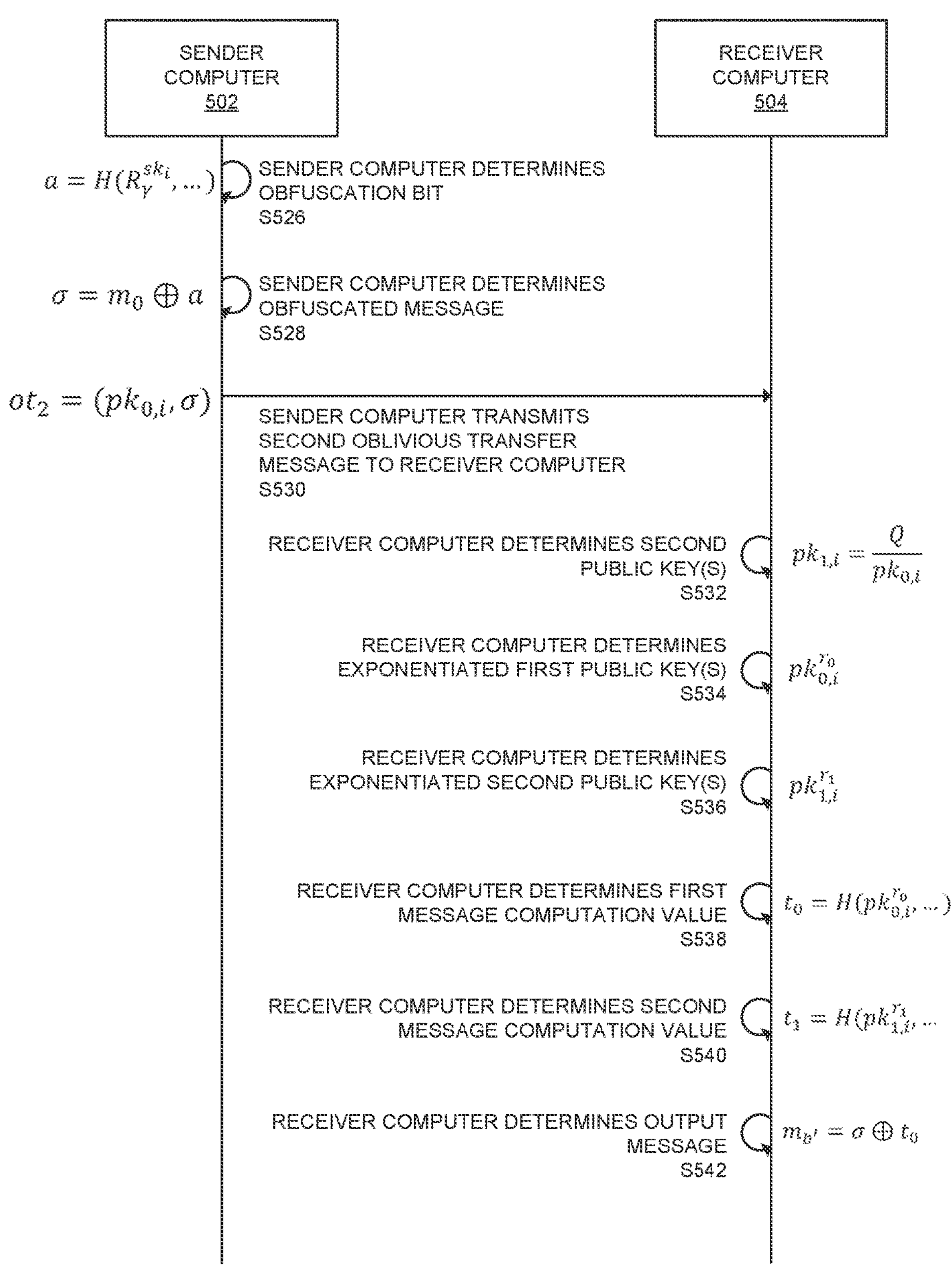

The second oblivious transfer routine $$OT^{(2)}_{S\rightarrow R}(1^\kappa, (m_0, m_1), ot_1)$$

can be executed by the sender computer 502, and may result in a second oblivious transfer message $ot_2$, which can be sent by the sender computer 502 to the receiver computer 504. The second oblivious transfer routine $$OT^{(2)}_{S\rightarrow R}(1^\kappa, (m_0, m_1), ot_1)$$

can corresponding to steps S516-S530 in FIGS. 5A-5B. The sender computer 502 can use the first message $m_0$ and the second message $m_1$ (which may comprise single message bits, i.e., $m_0,m_1 \in \{0,1\}$), along with any data contained in the first oblivious transfer message $ot_1$ to generate the second oblivious transfer message $ot_2$, which may contain, among other data, an obfuscated message σ. Any information generated during this oblivious transfer routine that is not sent to the receiver computer 504, or any private information previously held by the sender computer 502 (e.g., one or more secret keys $sk_i$, the first message $m_0$, the second message $m_1$, etc.) may be referred to as the secret sender internal state $st_S$.

The third oblivious transfer routine $OT_R(st_R,ot_2)$ can be executed by the receiver computer 504, and may result in the receiver computer 504 producing an output message $m_b \in \{0,1\}$, which may comprise either the first message $m_0$ or the second message $m_1$ at random. The third oblivious transfer routine $OT_R$ can correspond to steps S532-S542 in FIG. 5B. Optionally, the third oblivious transfer routine $OT_R$ may result in the receiver computer 504 producing a random receiver choice bit $b' \in \{0,1\}$. The receiver computer 504 can determine the output message $m_{b'}$ using the receiver secret internal state $st_R$ along with any data contained in the second oblivious transfer message $ot_2$.

Referring now to FIG. 5A, at step S506, the receiver computer 504 can determine one or more group elements $Q_j$ by randomly sampling the one or more group elements $Q_j$ from a cyclic group G, which can be defined by a prime number q (i.e., $Q_j \leftarrow G$). In the first oblivious transfer method, the one or more group elements $Q_j$ can comprise a single group element Q. The one or more group elements $Q_j$ may comprise part of a first oblivious transfer message $ot_1$ sent by the receiver computer 504 to the sender computer 502 (e.g., at step S514). The sender computer 502 can use the one or more group elements $Q_j$ to determine one or more sets of first public keys $pk_{0,i,j}$, and one or more sets of second public keys $pk_{1,i,j}$ (e.g., at step S520).

At step S508, the receiver computer 504 can determine one or more first random numbers $r_{0,j}$ and one or more second random numbers $r_{1,j}$ by sampling the one or more first random numbers $r_{0,j}$ and the one or more second random numbers $r_{1,j}$ from an interval of integers $\mathbb{Z}_q$ based on (e.g., modulo) a prime number q (i.e., $r_{0,j}$, $r_{1,j} \leftarrow \mathbb{Z}_q$). In the first oblivious transfer method, the one or more first random numbers $r_{0,j}$ can comprise a single first random number $r_0$. Likewise the one or more second random numbers $r_{1,j}$ can comprise a single second random number $r_1$. In some embodiments, the receiver computer 504 can uniformly sample the one or more first random numbers $r_{0,j}$ and the one or more second random numbers $r_{1,j}$ from the interval of integers $\mathbb{Z}_q$.

At step S510, the receiver computer 504 can determine one or more first random group elements $R_{0,j}$ based on the one or more first random numbers $r_{0,j}$. In some embodiments, the receiver computer 504 can determine the one or more first random group elements $R_{0,j}$ by exponentiating a generator g using the one or more first random numbers $r_{0,j}$ (i.e., $R_{0,j}=g^{r_{0,j}}$). The generator g may be a generator of the cyclic group G. In the first oblivious transfer method, the one or more first random group elements $R_{0,j}$ can comprise a single first random group element $R_0$.

At step S512, the receiver computer 504 can determine one or more second random group elements $R_{1,j}$ based on the one or more second random numbers $r_{1,j}$. In some embodiments, the receiver computer 504 can determine the one or more second random group elements $R_{1,j}$ by exponentiating a generator g using the one or more second random numbers $r_{1,j}$ (i.e., $R_{1,j}=g^{r_{1,j}}$). In the first oblivious transfer method, the one or more second random group elements $R_{1,j}$ can comprise a single second random group element $R_1$.

The one or more first random group elements $R_{0,j}$ and the one or more second random group elements $R_{1,j}$ may later be used by sender computer 502 to generate one or more obfuscation bits $a_1$, which the sender computer 502 can use to generate one or more obfuscated messages $\sigma_j$ (e.g., at step S528 of FIG. 5B).

At step S514, the receiver computer 504 can transmit a first oblivious transfer message $ot_1$ comprising the one or more group elements $Q_j$, the one or more first random group elements $R_{0,j}$, and the one or more second random group elements $R_{1,j}$ to the sender computer 502. The sender computer 502 can use the one or more group elements $Q_j$, the one or more first random group elements $R_{0,j}$, and the one or more second random group elements $R_{1,j}$ to determine a second oblivious transfer message (e.g., at step S530 of FIG. 5B) comprising one or more sets of first public keys $pk_{0,i,j}$, (e.g., determined at step S520) and one or more obfuscated messages $\sigma_j$ (i.e., determined at step S528 of FIG. 5B).

At step S516, the sender computer 502 can determine one or more sender choice bits $\gamma_j$ by calculating one or more exclusive ors (XORs) of one or more first message bits $m_{0,j}$ and one or more second message bits $m_{1,j}$ (i.e., $\gamma_j=m_{0,j} \oplus m_{1,j}$). The first message $m_0$ may comprise the one or more first message bits $m_{0,j}$ and the second message $m_1$ may comprise the one or more second message bits $m_1$. In the first oblivious transfer method, the first message $m_0$ and the second message $m_1$ may comprise single bit messages, and may therefore comprise one first message bit $m_{0,j}$ and one second message bit $m_{1,j}$ respectively. As such, in the first oblivious transfer method, the one or more sender choice bits $\gamma_j$ may comprise a single sender choice bit $\gamma$.

At step S518, the sender computer 502 can determine one or more sets of secret keys $sk_{i,j}$ by randomly sampling the one or more sets of secret keys $sk_{i,j}$ from an interval of integers $\mathbb{Z}_q$ based on (e.g., modulo) a prime number q (i.e., $sk_{i,j} \leftarrow \mathbb{Z}_q$), which may be the same as the interval of integers $\mathbb{Z}_q$ used by the receiver computer 504 to sample the one or more first random numbers $r_{0,j}$ and the one or more second random numbers $r_{1,j}$ at step S508. In the first oblivious transfer method, the one or more sets of secret keys $sk_{i,j}$ may comprise a single set of secret keys $sk_i$. Each set of the one or more sets of secret keys $sk_{i,j}$ may comprise a number of secret keys $sk_i$ equal to a security parameter κ or any other appropriate number of secret keys $sk_i$.

At step S520, the sender computer 502 can determine one or more sets of first public keys $pk_{0,i,j}$, and one or more sets of second public keys $pk_{1,i,j}$ using the one or more sets of secret keys $sk_{i,j}$, the one or more group elements $Q_j$ and the generator g (which may be known to both the sender computer 502 and the receiver computer 504). Each set of the one or more sets of first public keys $pk_{0,i,j}$, can comprise a number of first public keys equal to a security parameter κ or any other appropriate number of first public keys $pk_{0,i,j}$. Likewise, each set of the one or more sets of second public keys $pk_{1,i,j}$ can comprise a number of second public keys equal to a security parameter κ or any other appropriate number of second public keys $pk_{0,i,j}$. In the first oblivious transfer method, the one or more sets of first public keys $pk_{0,i,j}$, can comprise a single set of first public keys $pk_{0,i}$. Likewise, in the first oblivious transfer method, the one or more sets of second public keys $pk_{1,i,j}$ can comprise a single set of second public keys $pk_{0,i}$. The sender computer 502 can use the following formulas to determine the one or more sets of first public keys $pk_{0,i,j}$ and the one or more sets of second public keys $pk_{1,i,j}$:

$$pk_{\gamma_j,i,j} = g^{sk_{i,j}}$$

$$pk_{1-\gamma,i,j} = \frac{Q_j}{pk_{\gamma,i,j}}$$

As evident, these formulas depend on the one or more sender choice bits $\gamma_j$, meaning that the method used by the sender computer 502 to determine the one or more sets of first public keys $pk_{0,i,j}$, and the one or more sets of second public keys $pk_{1,i,j}$ changes depending on the values of the one or more sender choice bits $\gamma_j$. For example, if a sender choice bit γ=0, a corresponding set of first public keys $pk_{0,i,j}=g^{sk_{i,j}}$, and a corresponding set of second public keys $$pk_{1,i,j} = \frac{Q_j}{pk_{0,i,j}}.$$

By contrast, if a sender choice bit $\gamma=1$, a corresponding set of second public keys $pk_{1,i,j}=g^{sk_{i,j}}$ and a corresponding set of first public keys $$pk_{0,i,j} = \frac{Q_j}{pk_{1,i,j}}.$$

By changing how the one or more sets of first public keys $pk_{0,i,j}$, and the one or more sets of second public keys $pk_{1,i,j}$ are determined based on the one or more (secret) sender choice bits $\gamma_j$, the sender computer 502 can maintain sender privacy and avoid accidentally revealing both messages to the receiver computer 504.

At step S522, the sender computer 502 can select one or more random group elements from the one or more first random group elements $R_{0,j}$ or the one or more second random group elements $R_{1,j}$ using the one or more sender choice bits $\gamma_j$, thereby determining one or more selected random group elements $R_{\gamma,j}$. In the first oblivious transfer method, the one or more first random group elements $R_{0,j}$ may comprise a single first random group element $R_0$ the one or more second random group elements $R_{1,j}$ may comprise a single second random group element $R_1$ and the one or more sender choice bits $\gamma_j$ may comprise a single sender choice bit $\gamma$. Consequently, the one or more selected random group elements $R_{\gamma_j,j}$ may comprise a single selected random group element $R_\gamma$.

As an example, the sender computer 502 can iterate through the one or more sender choice bits $\gamma_j$ and for each sender choice bit of the one or more sender choice bits $\gamma_j$, the sender computer 502 can select a corresponding first random group element from the one or more first random group elements $R_{0,j}$ if the sender choice bit has a value of zero or false, and select a corresponding second random group element from the one or more second random group elements $R_{1,j}$ if the sender choice bit has a value of one or true. Expressed otherwise, if $\gamma=0$, then $R_\gamma=R_0$ and if $\gamma=1$, then $R_\gamma=R_1$. As another example, if $\gamma_0=1$ and $\gamma_1=0$, then $R_{\gamma_0,0}=R_{1,0}$ and $R_{\gamma_1,1}=R_{0,1}$, or if $\gamma_0=0$ and $\gamma_1=1$, then $R_{\gamma_0,0}=R_{0,0}$ and $R_{\gamma_1,1}=R_{1,1}$. The one or more selected random group elements $R_{\gamma_j,j}$ may later be used by the sender computer 502 to generate one or more obfuscation bits $a_1$ (e.g., at step S526 of FIG. 5B), which can later be used to generate one or more obfuscated messages $\sigma_j$ (e.g., at step S528 of FIG. 5B).

At step S524, the sender computer 502 can determine one or more sets of exponentiated selected random group elements $$R_{\gamma_j,j}^{sk_{i,j}}$$

by exponentiating the one or more selected random group elements $R_{\gamma_j,j}$ using the one or more sets of secret keys $sk_{i,j}$. In the first oblivious transfer method, the one or more sets of exponentiated selected random group elements may comprise a single set of exponentiated selected random group elements $$R_\gamma^{sk_i}.$$

Referring now to FIG. 5B, at step S526, the sender computer 502 can determine one or more obfuscation bits $a_j$ using a hardcore predicate function H, the one or more selected random group elements $R_{\gamma_j,j}$, and the one or more sets of secret keys $sk_{i,j}$. In the first oblivious transfer method, the one or more obfuscation bits $a_j$ can comprise a single obfuscation bit a. In more detail the sender computer 702 can use the one or more selected random group elements $R_{\gamma_j,j}$, and the one or more sets of secret keys $sk_{i,j}$ to generate one or more sets of exponentiated selected random group elements $$R_{\gamma_j,j}^{sk_{i,j}}$$

(as described above), then input the one or more sets of exponentiated selected random group elements $$R_{\gamma_j,j}^{sk_{i,j}}$$

into the hardcore predicate function H to generate the one or more obfuscation bits $a_j$ (i.e., $$a_j = H\left(R_{\gamma_j,j}^{sk_{i,j}}, \ldots\right)).$$

At step S528, the sender computer 502 can determine one or more obfuscated messages $\sigma_1$ by calculating one or more exclusive ors (XORs) of one or more first message bits $m_{0,j}$ and the one or more obfuscation bits $a_1$, (i.e., $\sigma_j=m_{0,j}\oplus a_j$). In the first oblivious transfer method, the first message $m_0$ may comprise a single first message bit $m_{0,j}$, and the one or more obfuscation bits $a_j$ can comprise a single obfuscation bit a, as such the one or more obfuscated messages $\sigma_j$ can comprise a single obfuscated message $\sigma$. The one or more obfuscated messages $\sigma_j$ can be sent by the sender computer 502 to the receiver computer 504, and the receiver computer 504 can de-obfuscate the one or more obfuscated messages $\sigma_1$ to produce the output message $m_{b'}$, completing the first oblivious transfer method.

At step S530, the receiver computer 504 can receive a second oblivious transfer message $ot_2=(pk_{0,i,j},\sigma_j)$ comprising the one or more sets of first public keys $pk_{0,i,j}$, and the one or more oblivious transfer messages $\sigma_j$ from the sender computer 502. The receiver computer 504 can later use the one or more sets of first public keys $pk_{0,i,j}$, to generate one or more first message computation values $t_{0,j}$ (e.g., at step S538) which can later be used to de-obfuscate the one or more obfuscated messages $\sigma_j$ to produce the output message $m_{b'}$ (e.g., at step S542). In some embodiments, the second oblivious transfer message $ot_2$ can additionally comprise the one or more sets of second public keys $pk_{1,i,j}$.

At step S532, which is optional, the receiver computer 504 can optionally determine the one or more sets of second public keys $pk_{1,i,j}$ using the one or more sets of first public keys $pk_{0,i,j}$ and the one or more group elements $Q_j$, e.g., according to the formula $$pk_{1,i,j} = \frac{Q_j}{pk_{0,i,j}}.$$

The receiver computer 504 can determine the one or more sets of second public keys $pk_{1,i,j}$ if the one or more sets of second public keys $pk_{1,i,j}$ were not included in the second oblivious transfer message $ot_2$.

At step S534, the receiver computer 504 can exponentiate each first public key of the one or more sets of first public keys $pk_{0,i,j}$, with a corresponding first random number of the one or more first random numbers $r_{0,j}$, thereby determining one or more sets of exponentiated first public keys $$pk_{0,i,j}^{r_{0,j}}.$$

In the first oblivious transfer method, the one or more sets of first public keys $pk_{0,i,j}$ can comprise a single set of first public keys $pk_{0,i}$, and the one or more first random numbers $r_{0,j}$ can comprise a single first random number $r_0$ and as such, the one or more sets of exponentiated first public keys $$pk_{0,i,j}^{r_{0,j}}$$

can comprise a single set of exponentiated first public keys $$pk_{0,i}^{r_0}.$$

Each set of exponentiated first public keys $$pk_{0,i,j}^{r_{0,j}}$$

can comprise a number of exponentiated first public keys equal to a security parameter κ, or any other appropriate number of exponentiated first public keys.

At step S536, which is optional, the receiver computer 504 can exponentiate each second public key of the one or more sets of second public keys $pk_{1,i,j}$ with a corresponding second random number of the one or more second random numbers $r_{1,j}$, thereby determining one or more sets of exponentiated second public keys $$pk_{1,i,j}^{r_{1,j}}.$$

In the first oblivious transfer method, the one or more sets of second public keys $pk_{1,i,j}$ can comprise a single set of second public keys $pk_{1,i}$, and the one or more second random numbers $r_{1,j}$ can comprise a single second random number $r_1$, and as such, the one or more sets of exponentiated second public keys $$pk_{1,i,j}^{r_{1,j}}$$

can comprise a single set of exponentiated second public keys $$pk_{1,i}^{r_1}.$$

Each set of exponentiated second public keys $$pk_{1,i,j}^{r_{1,j}}$$

can comprise a number of exponentiated second public keys equal to a security parameter κ, or any other appropriate number of exponentiated second public keys.

At step S538, the receiver computer 504 can determine one or more first message computation values $t_{0,j}$ using the one or more sets of first public keys $pk_{0,i,j}$, the one or more first random numbers $r_{0,j}$, and the hardcore predicate function H. The receiver computer 504 can generate the one or more sets of exponentiated first public keys $$pk_{0,i,j}^{r_{0,j}}$$

as described above, then input each exponentiated first public key of the one or more sets of exponentiated first public keys $$pk_{0,i,j}^{r_{o,j}}$$

into the hardcore predicate function H, thereby determining the one or more first message computation values $t_{0,j}$ (i.e., $$t_{0,j} = H(pk_{0,i,j}^{r_{0,j}}, \ldots)).$$

In the first oblivious transfer method, the one or more first message computation values $t_{0,j}$ may comprise a single first message computation value $t_0$.

At step S540, which is optional, the receiver computer 504 can determine one or more second message computation values $t_{1,j}$ using the one or more sets of second public keys $pk_{1,i,j}$, the one or more second random numbers $r_{1,j}$, and the hardcore predicate function H. The receiver computer 504 can generate the one or more sets of exponentiated second public keys $$\mathrm{pk}_{1,i,j}^{r_{1,j}}$$

as described above, then input each exponentiated second public key of the one or more sets of exponentiated second public keys $$\mathrm{pk}_{1,i,j}^{r_{1,j}}$$

into the hardcore predicate function H, thereby determining the one or more second message computation values $t_{1,j}$ (i.e., $$t_{1,j} = H(\mathrm{pk}_{1,i,j}^{r_{1,j}}, \ldots )).$$

In the first oblivious transfer method, the one or more second message computation values $t_{1,j}$ may comprise a single second message computation value $t_1$.

At step S542, the receiver computer 504 can de-obfuscate the one or more obfuscated messages $\sigma_1$ using the one or more first message computation values $t_{0,j}$, thereby determining an output message $m_{b'}$. The receiver computer 504 can de-obfuscate the one or more obfuscated messages $\sigma_j$ by computing one or more exclusive ors (XORs) of the one or more first message computation values $t_{0,j}$ and the one or more obfuscated messages $\sigma_j$ (i.e., $m_b=\sigma_j \oplus t_{0,j}$). In the first oblivious transfer method, the one or more first message computation values $t_{0,j}$ may comprise a single first message computation value $t_0$ and the one or more obfuscated messages $\sigma_j$ may comprise a single obfuscated message $\sigma$, and therefore the output message $m_{b'}$ may comprise a single message bit. The output message $m_{b'}$ may comprise either the first message $m_0$ or the second message $m_1$. As such, determining the output message $m_{b'}$ at step S542 generally completes the first oblivious transfer message, as one of the first message $m_0$ or the second message $m_1$ has been obliviously transferred by the sender computer 502 to the receiver computer 504.

As described above, this method results in the receiver computer receiving a message effectively at random, meaning the receiver computer does not choose the message it receives. A random receiver choice bit $b'=t_0 \oplus t_1$ can be used to demonstrate the correctness of the first oblivious transfer method. The method can be said to be correct if the random receiver choice bit b' "matches" the message that is transferred to the receiver computer during the oblivious transfer protocol. For example, If the random receiver choice bit b'=0, then the method can be shown to be correct provided that the receiver computer randomly received the first message m. If the random receiver choice bit b'=1, then the method can be shown to be correct provided the receiver computer randomly received the second message $m_1$. Expressed in other words, the first oblivious transfer method can be said to be correct if for any $\kappa \in \mathbb{N}$ and any pair of single bit messages $m_0$, $m_1 \in \{0,1\}$, letting:

$$(ot_1, st_R) \leftarrow OT^{(1)}_{R\to S}(1^\kappa),\ (ot_2) \leftarrow OT^{(2)}_{S\to R}(1^\kappa, (m_0, m_1), ot_1),\ (b', m') \leftarrow OT_R(st_R, ot_2),$$

Leads to $m'=m_{b'}$ with high probability.

Demonstrating the correctness of this method can be accomplished by evaluating two separate variations. Because these variations (described below) relate to the only possible outcomes of the method, demonstrating the correctness in each variation demonstrates the correctness of the method.

The first variation relates to the sender's two messages. Because the first oblivious transfer method comprises a random single bit oblivious transfer method, the first message $m_0$ and the second message $m_1$ can comprise single bits, and can take on the values 0 (false) or 1 (true). The first variation is that either the first message $m_0$ is the same as the second message $m_1$ or the first message $m_0$ is different from the second message $m_1$, or more concisely: either $m_0=m_1$ or $m_0 \neq m_1$ (which further implies $m_0=\overline{m}_1$).

If $m_0=m_1$, it doesn't matter which message the receiver computer receives, as receiving either message is equivalent to receiving the other message. As such, the receiver computer will always receive a message that matches the random receiver choice bit b'. Therefore demonstrating that the receiver computer receives either of the messages is sufficient to demonstrate that the method is correct in this variation. As demonstrated below, if $m_0=m_1$:

$$\gamma = m_0 \oplus m_1 = m_1 \oplus m_1 = 0$$

$$\mathrm{pk}_\gamma = \mathrm{pk}_0 = g^{sk}$$

$$a = H(R_\gamma^{sk}) = H(R_0^{sk})$$

$$\mathrm{map} = m_0 \oplus H(R_\gamma^{sk}) = m_0 \oplus H(R_0^{sk})$$

$$t_0 = H(\mathrm{pk}_0^{r_0}) = H(g^{sk^{r_0}}) = H({g^{r_0}}^{sk}) = H(R_0^{sk})$$

$$m_b = \mathrm{map} \oplus t_0 = m_0 \oplus H(R_0^{sk}) \oplus H(R_0^{sk}) = m_0 \oplus 0 = m_0$$

Under these conditions (i.e., $m_0=m_1$), the receiver computer will always receive $m_0$, but since $m_0=m_1$, this is equivalent to receiving $m_1$. Thus the receiver computer will always receive a message that matches the random receiver choice bit b'.

Considering the other case, if $m_0 \neq m_1$ (which implies $m_0=\overline{m}_i$):

$$\gamma = m_0 \oplus m_1 = \overline{m}_1 \oplus m_1 = 0$$

$$\mathrm{pk}_\gamma = \mathrm{pk}_1 = g^{sk}$$

$$\mathrm{pk}_{1-\gamma} = \mathrm{pk}_0 = \frac{Q}{g^{sk}}$$

$$a = H(R_\gamma^{sk}) = H(R_1^{sk})$$

$$\mathrm{map} = m_0 \oplus a = m_0 \oplus H(R_1^{sk})$$

$$t_1 = H(\mathrm{pk}_1^{r_1}) = H(g^{sk^{r_1}}) = H({g^{r_1}}^{sk}) = H(R_1^{sk})$$

From here another variation must be considered. One of the following cases must be true: either $t_0=t_1$ or $t_0 \neq t_1$ (implying $t_0=\overline{t}_1$).

If $t_0=t_1$, then $b=t_0 \oplus t_1=t_1 \oplus t_1=0$. In this case, the protocol is correct provided that the receiver computer receives the first message $m_0$, demonstrated below:

$$m_b = \mathrm{map} \oplus t_0 = m_0 \oplus H(R_1^{sk}) \oplus t_0 = m_0 \oplus t_1 = t_0$$

$$m_b = m_0 \oplus t_1 \oplus t_1 = m_0 \oplus 0 = m_0$$

If $t_0 \neq t_1$, then $b=t_0 \oplus t_1=\overline{t}_1 \oplus t_1=1$. In this case, the protocol is correct provided that the receiver computer receives the second message $m_1$ (recall that because $m_0 \neq m_1$, then $m_0=\overline{m}_1$), demonstrated below:

$$m_b = \mathrm{map} \oplus t_0 = m_0 \oplus H(R_1^{sk}) \oplus t_0 = m_0 \oplus t_1 \oplus t_0$$

$$m_b = m_0 \oplus t_1 \oplus \overline{t}_1 = m_0 \oplus 1 = \overline{m}_0 = m_1$$

As the correctness of the method has been proven for all possible cases, the method is therefore proven correct.

More concisely the proof can be expressed as follows:

$$
\begin{aligned}
&\mathrm{Real}_r((m_0, m_1), 1^\kappa) = \\
&(t_0 \oplus t_1, \mathrm{Map} \oplus t_0) = \left(H\left(\mathrm{pk}_0^{r_0}\right) \oplus H\left(\mathrm{pk}_1^{r_1}\right), m_0 \oplus a \oplus t_0\right) = \\
&\left(H\left(\mathrm{pk}_0^{r_0}\right) \oplus H\left(\mathrm{pk}_1^{r_1}\right), m_0 \oplus H\left(R_\gamma^{sk}\right) \oplus t_0\right) = \\
&\left(H\left(\mathrm{pk}_0^{r_0}\right) \oplus H\left(\mathrm{pk}_1^{r_1}\right), m_0 \oplus H\left(\mathrm{pk}_\gamma^{r_\gamma}\right) \oplus H\left(\mathrm{pk}_0^{r_0}\right)\right) = \\
&\left(H\left(\mathrm{pk}_0^{r_0}\right) \oplus H\left(\mathrm{pk}_1^{r_1}\right), m_0 \oplus \gamma \cdot H\left(\mathrm{pk}_0^{r_0}\right) \oplus H\left(\mathrm{pk}_1^{r_1}\right)\right) = \\
&\left(H\left(\mathrm{pk}_0^{r_0}\right) \oplus H\left(\mathrm{pk}_1^{r_1}\right), m_0 \oplus (m_0 \oplus m_1) \cdot H\left(\mathrm{pk}_0^{r_0}\right) \oplus H\left(\mathrm{pk}_1^{r_1}\right)\right) = \\
&(b, m_0 \oplus (m_0 \oplus m_1) \cdot b) = (b, m_b)
\end{aligned}
$$

A high level overview of a security proof for the random single bit oblivious transfer method against a corrupt sender computer and a corrupt receiver computer is as follows. The first oblivious transfer method can be said to satisfy computational receiver privacy if for any $\kappa \in \mathbb{N}$, any pair of single bit messages $m_0, m_1 \in \{0,1\}$, and any probabilistic polynomial time adversary $\mathcal{A}$, letting $b' = \mathrm{Exp}^{\kappa, m_0, m_1}(\mathcal{A})$:

$$|Pr[b = 0] - Pr[b = 1]| \leq negl(\kappa),$$

where the experiment $\mathrm{Exp}^{\kappa, m_0, m_1}(\mathcal{A})$ is defined as follows:

$$(ot_1, st_R) \leftarrow OT^{(1)}_{R \to S}(1^\kappa). \quad 1$$

$$(ot_2) \leftarrow \mathcal{A}(1^\kappa, (m_0, m_1), ot_1). \quad 2$$

$$(b', m') \leftarrow OT_R(st_R, ot_2). \quad 3$$

$$\text{Output } b'. \quad 4$$

This method can be said to satisfy statistical sender privacy if for any $\kappa \in \mathbb{N}$ and any first oblivious transfer message $ot_1$, there exists a bit $\beta$ such that for every pair of bit messages $m_0, m_1 \in \{0,1\}$ the following two distributions are statistically indistinguishable:

$$OT^{(2)}_{S \to R}(1^\kappa, (m_0, m_1), ot_1) \approx^s OT^{(2)}_{S \to R}(1^\kappa, (m_\beta, m_\beta), ot_1)$$

A corrupt sender computer can theoretically break receiver privacy and obtain the random receiver choice bit b' (thus determining which of the two messages the receiver computer received during the oblivious transfer process) if it computes both the first message computation value $t_0$ and the second message computation value $t_1$. However, because H is a hardcore predicate function, in order to do so, the corrupt sender would need to solve the computational Diffie-Hellman problem by applying the Goldreich-Levin Theorem.

Given a hypothetical adversary $\mathcal{A}$ that corrupts the sender and breaks receiver privacy, a hypothetical computational Diffie-Hellman adversary $\mathcal{A}_{CDH}$ can be constructed that distinguishes between the hardcore bit of a computational Diffie-Hellman challenge and a random bit, hence breaking the computational Diffie-Hellman assumption. The computation Diffie-Hellman adversary $\mathcal{A}_{CDH}$ can be described as a "function" $\mathcal{A}_{CDH}(g, X, Y, z)$. Assuming $X = g^x$ and $Y = g^y$ for random $x, y \leftarrow \mathbb{Z}_q$ then z can comprise either a random bit or $z = H(g^{xy})$. Additionally the adversary can set $Q = X$, sample $c \leftarrow \{0,1\}$, set $R_c = Y$, sample $r \leftarrow \mathbb{Z}_q$ and set $R_{\bar{c}} = g^r$. The adversary $\mathcal{A}$ can compute $b = t_0 \oplus t_1$ and obtain $$t_{\bar{c}} = H(\mathrm{pk}_{\bar{c}}^r)$$

as the adversary $\mathcal{A}_{CDH}$ choses $g^r$. If the adversary $\mathcal{A}$ can obtain $t_0$ and $t_1$, the adversary $\mathcal{A}$ can also obtain $$\mathrm{pk}_c^y \text{ and } \mathrm{pk}_{\bar{c}}^r.$$

To break privacy, the adversary needs to compute $$pk_{\bar{c}}^y = Y^{q-sk}$$

where $\mathrm{pk}_c = g^{sk}$ and $Q = g^q$. This demonstrates Lemma 1, which states that provided the computational Diffie-Hellman assumption holds, a corrupt sender is unable to determine both the first message computation value $t_0$ and the second message computation value $t_1$, and is hence unable to determine the random receiver choice bit b'.

Regarding statistical sender privacy, it can be observed that the sender choice bit $\gamma$ is hidden by the one or more first public keys $\mathrm{pk}_{0,i}$. As such, the message the receiver computer did not receive (i.e., $m_{\bar{b}'}$ or $m_{1-b'}$) is also hidden, demonstrated by the cases below.

If $b'=0$, then $t_0 = t_1$. The obfuscated message $\sigma = m_0 \oplus a = m_0 \oplus t_0 = m_0 \oplus t_1$. The obfuscated message $\sigma$ is independent of the second message $m_1$ and hence it hides the value of the second message $m_1$. If $b'=1$, then $t_0 = \overline{t_1}$. The value of the obfuscation bit a can be parsed as $a = m_0 \oplus m_1 \oplus t_0$. The value of the obfuscated message $\sigma = m_0 \oplus a = m_0 \oplus (m_0 \oplus m_1 \oplus t_0) = m_1 \oplus t_0$, thus the obfuscated message $\sigma$ is independent of the first message $m_0$ and as such it hides the value of the first message $m_0$.

As a result, the second oblivious transfer message $ot_2$ hides the unreceived message $m_{\bar{b}'}$ from a corrupt receiver and provides sender privacy. This is argued more formally as follows:

$$
\begin{aligned}
&OT^{(2)}_{S \to R}(1^\kappa, (m_0, m_1), ot_1) = OT^{(2)}_{S \to R}(1^\kappa, (m_0, m_1), (Q, R_0, R_1)) = \\
&(\mathrm{pk}_0, \sigma) = (\mathrm{pk}_0, m_0 \oplus a) = \left(\mathrm{pk}_0, m_0 \oplus H\left(R_\gamma^{sk}\right)\right) = \\
&\left(\mathrm{pk}_0, m_0 \oplus H\left(R_\gamma^{r_\gamma}\right)\right) = \left(\mathrm{pk}_0, m_0 \oplus H\left(R_0^{r_0}\right) \oplus \gamma \cdot \left(H\left(\mathrm{pk}_0^{r_0}\right) \oplus H\left(\mathrm{pk}_1^{r_0}\right)\right)\right) = \\
&(\mathrm{pk}_0, m_0 \oplus t_0 \oplus \gamma \cdot (t_0 \oplus t_1)) = \\
&(\mathrm{pk}_0, m_0 \oplus t_0 \oplus \gamma \cdot \beta) = (\mathrm{pk}_0, m_0 \oplus t_0 \oplus (m_0 \oplus m_1) \cdot \beta) = (\mathrm{pk}_0, m_\beta \oplus t_0) \\
&OT^{(2)}_{S \to R}(1^\kappa, (m_\beta, m_\beta), ot_1) = \\
&OT^{(2)}_{S \to R}(1^\kappa, (m_\beta, m_\beta), (Q, R_0, R_1)) = (\mathrm{pk}_0, \sigma) = (\mathrm{pk}_0, m_\beta \oplus a) = \\
&\left(\mathrm{pk}_0, m_\beta \oplus H\left(R_\gamma^{r_\gamma}\right)\right) = \left(\mathrm{pk}_0, m_\beta \oplus H\left(R_0^{sk}\right)\right)(\text{as } \gamma = m_\beta \oplus m_\beta = 0) = \\
&\left(\mathrm{pk}_0, m_\beta \oplus H\left(\mathrm{pk}_0^{r_0}\right)\right) = (\mathrm{pk}_0, m_\beta \oplus t_0)
\end{aligned}
$$

As such, sender privacy holds as follows:

$$OT^{(2)}_{S \to R}(1^\kappa, (m_0, m_1), ot_1) \equiv OT^{(2)}_{S \to R}(1^\kappa, (m_\beta, m_\beta), ot_1)$$

As stated above with reference to FIGS. 1A-1B, string random oblivious transfer can (in concept) be implemented by performing single bit random oblivious transfer multiple times, once for each bit in the message strings. For two messages comprising three bits, for example, a sender computer and a receiver computer can perform three single bit oblivious transfers in order to obviously transfer one of the messages to the receiver computer. As such, the second oblivious transfer method, described in more detail below with respect to FIGS. 7A-7C, comprises some steps that are similar to steps in the first oblivious transfer method and can be understood, in part, based on the first oblivious transfer method.

However, as described above with reference to FIGS. 1A-1B, it is possible that such techniques (i.e., repeatedly performing random single bit oblivious transfers in order to implement random string oblivious transfer) may not satisfy the requirements of two-out-of-one oblivious transfer. Particularly the requirement that the receiver computer receives exactly one of the two messages possessed by the sender computer. It is possible, and in some cases likely, that the receiver computer receives a "mix" of the first message $m_0$ and the second message $m_1$, rather than either message in its entirety. For example, for even short three character messages (e.g., "COW," "RAT") represented by three byte UTF-8 (24 bit) message strings, there is approximately a 99.8% chance that the receiver computer does not receive either the first message $m_0$ or the second message $m_1$. As such, naively implementing random string oblivious transfer by repeatedly performing random single-bit oblivious transfer has a low probability (for most message lengths) of actually qualifying as one-out-of-two oblivious transfer.

Embodiments of the present disclosure, such as the second oblivious transfer method, can overcome this problem using indicator bits $z_j$, which is one difference between the first oblivious transfer method described above with reference to FIGS. 5A-5B and the second oblivious transfer method described below with reference to FIGS. 7A-7C. Understanding the use of indicator bits $z_j$ may be helpful in understanding the second oblivious transfer method. Rather than attempting to guarantee that the receiver computer receives one of the first message $m_0$ or the second message $m_1$, the sender computer can use indicator bits $z_j$, received from the receiver computer, in order to update the first message $m_0$ and the second message $m_1$, thereby determining an updated first message $$m_0'$$

and an updated second message $$m_1'$$

so that one of these two updated messages is equivalent to the output message $m_b'$ received by the receiver computer. This process is generally depicted in FIG. 6.

Figure 6:
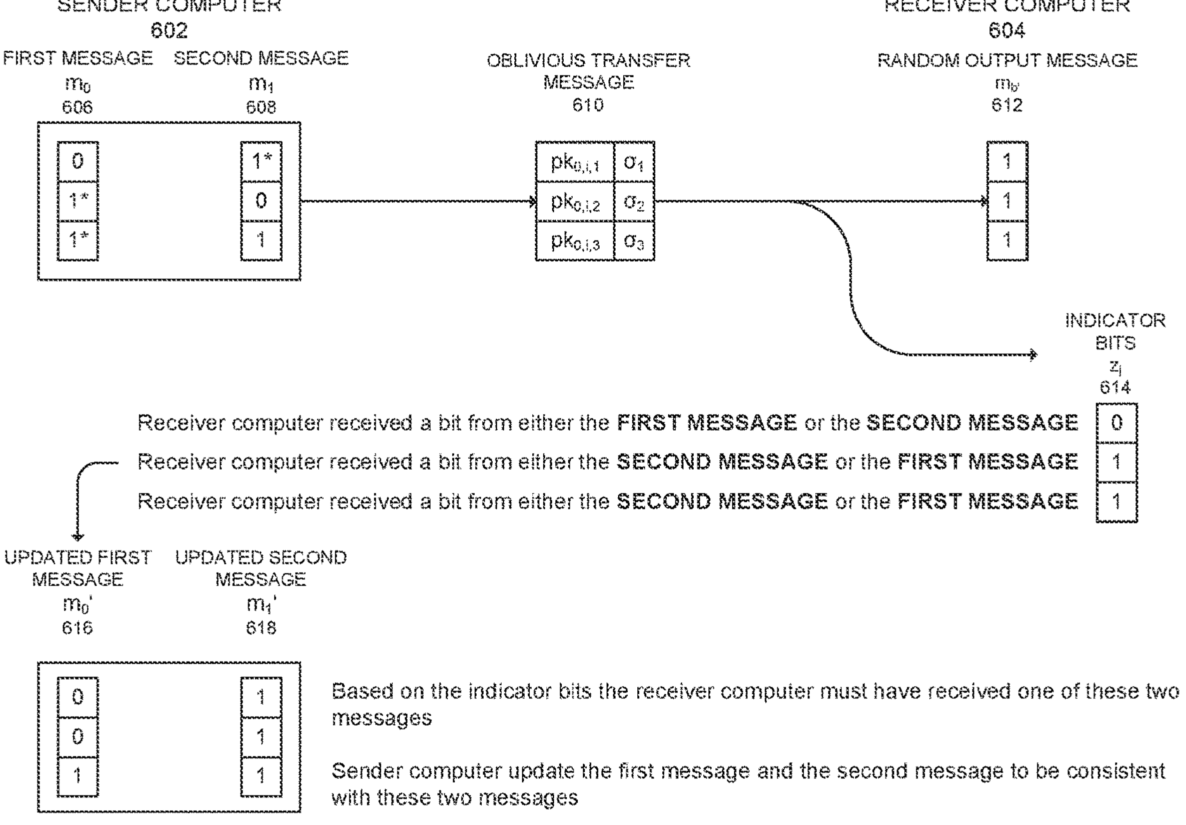
FIG. 6 shows a diagram summarizing a method for performing random string oblivious transfer according to some embodiments of the present disclosure.

As shown in FIG. 6, a sender computer 602 and a receiver computer 604 can perform an oblivious transfer method, which can involve the receiver computer 604 receiving an oblivious transfer message 610 from the sender computer 602. This oblivious transfer message 610 can contain data such as one or more sets of first public keys $pk_{0,i,j}$, and one or more oblivious transfer messages $\sigma_j$. Using the one or more sets of first public keys $pk_{0,i,j}$, along with any other relevant data possessed by the receiver computer 604 (e.g., one or more first random numbers $r_{0,j}$ and one or more second random numbers $r_{1,j}$), the receiver computer 604 can de-obfuscate the one or more obfuscated messages $\sigma_j$ in oblivious transfer message 610 to produce a random output message $m_{b'}$ 612. In FIG. 6, the random output message $m_{b'}$ 612 comprises the bit string "111." As indicated by the asterisks (*) by message bits corresponding to the first message $m_0$ 606 and the second message $m_1$ 608, the random output message $m_{b'}$ 612 comprises the first bit of the second message $m_{1,1}$ 608, the second bit of the first message $m_{0,2}$ 606, and the third bit of the first message $m_{0,3}$ 606. Although not known to either the sender computer 602 or the receiver computer 604, the output message $m_{b'}$ 612 is not equal to either the first message $m_0$ 606 or the second message $m_1$ 608.

To address this problem, the receiver computer 604 can additionally generate one or more indicator bits $z_j$ 614, represented in FIG. 6 as the bit string "011." The one or more indicator bits $z_j$ 614 indicate a general relationship between the message bits received by the receiver computer 604 during the oblivious transfer method, without actually revealing which message bits the receiver computer 604 received.

For example, the first indicator bit "0" can indicate that the receiver computer 604 receives a message bit from either the first message $m_0$ 606 or the second message $m_1$ 608. This alone doesn't communicate anything to the sender computer 602, as the sender computer 602 cannot determine whether the receiver computer 604 received the first bit of the first message $m_0$ 606 or the first bit of the second message $m_1$ 608. The second indicator bit "1" can indicate that the receiver computer 604 received a message bit from either the second message $m_1$ 608 or the first message $m_0$ 606. While again, the sender computer 602 cannot determine which message bit the receiver computer 604 received, the sender computer 602 can determine that the receiver computer 604 received the second output message bit from the opposite message from the first output message bit. Collectively, from the three indicator bits $z_j$ 614, the sender computer 602 can determine two possible messages that the receiver computer 604 received, either a message comprising the first bit of the first message $m_{0,1}$, the second bit of the second message $m_{1,2}$, and the third bit of the second message $m_{1,3}$ (i.e., 001) or a message comprising the first bit of the second message $m_{1,1}$, the second bit of the first message $m_{1,2}$, and the third bit of the first message $m_{1,3}$ (i.e., 111). Notably, exactly one of these messages is equivalent to the random output message $m_{b'}$ 612.

Using the indicator bits $z_j$ 614, the sender computer 602 can update the first message $m_0$ 608 to produce an updated first message $$m_0'$$

616, and update the second message $m_1$ 608 to produce an updated second message $$m_1'$$

618, using, e.g., the two possible messages determined by the sender computer 602 as described above (001 and 111).

This can be accomplished by the sender computer 602 by "swapping" the message bits corresponding to indicator bits $z_j$ 614 with a value of 1, e.g., the second indicator bit and third indicator bit. As such, the sender computer 602 can swap the second bit of the first message $m_0$ 606 with the second bit of the second message $m_1$ 608, and additionally swap the third bit of the first message $m_0$ 606 and the third bit of the second message $m_1$ 608 in order to produce the updated first message $$m_0'$$

616 and updated second message $$m_1'$$

618. One of these two updated messages can be equivalent to the random output message $m_{b'}$ 612. As a result, the second oblivious transfer method according to embodiments satisfies the conditions of one-out-of-two oblivious transfer.

The second oblivious transfer method is described below with reference to the sequence diagram of FIGS. 7A-7C. The second oblivious transfer method can comprise four probabilistic polynomial time oblivious transfer routines, which can be represented by the expressions $$OT^{(1)}_{R\to S},\ OT^{(2)}_{S\to R},\ OT^{(3)}_{R\to S},$$

and $OT_S$. As above, the subscript R→S can indicate that a particular oblivious transfer routine involves a transmission of an oblivious transfer message (e.g., $ot_1$) from the receiver computer 704 R to the sender computer 702 S. Likewise, the subscript S→R can indicate that a particular oblivious transfer routine involves a transmission of an oblivious transfer message (e.g., $ot_2$) from the sender computer 702 S to the receiver computer 704 R. A subscript such as S can indicate that an oblivious transfer routine can involve operations performed by the sender computer 702 S, but does not involve the transmission of any oblivious transfer messages.

Figure 7A:
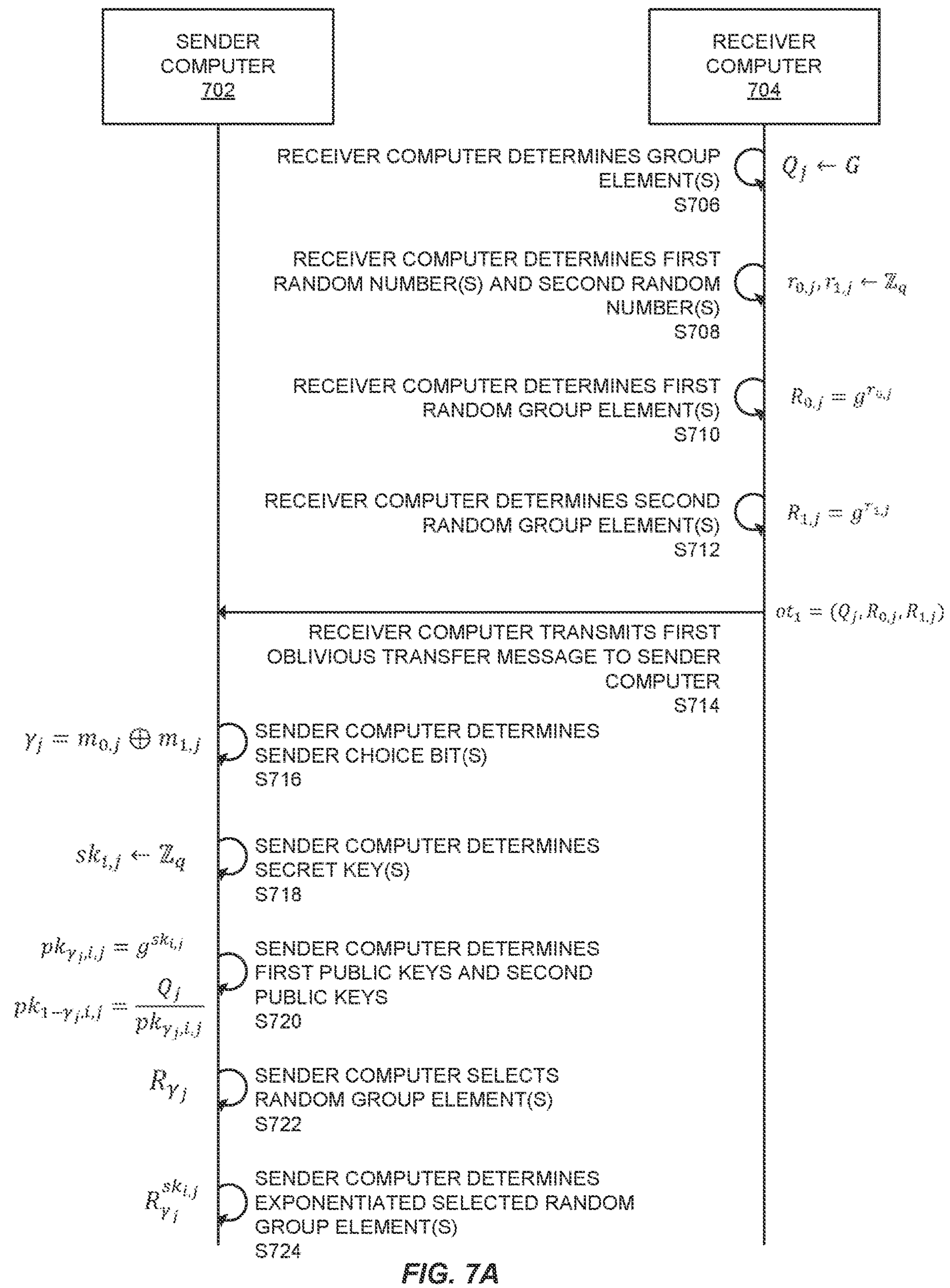
FIGS. 7A-7C show a sequence diagram of an exemplary method for preforming random string oblivious transfer according to some embodiments of the present disclosure.

The first oblivious transfer round $$OT^{(1)}_{R\to S}(1^\kappa)$$

can be executed by the receiver computer 704 and result in an oblivious transfer message $ot_1$, which the receiver computer 704 can transmit to the sender computer 702. The first oblivious transfer routine $$OT^{(1)}_{R\to S}(1^\kappa)$$

can correspond to steps S706-S714 in FIG. 7A. During the first oblivious transfer routine $$OT^{(1)}_{R\to S},$$

the receiver computer 704 may generate some values that are not transmitted to the sender computer 702, such as one or more first random numbers $r_{0,j}$ and one or more second random number $r_{1,j}$. These random numbers may later be used by the receiver computer 704 to de-obfuscate one or more obfuscated message $\sigma_j$ received from the sender computer 702, e.g., in the second oblivious transfer routine $$OT^{(2)}_{S\to R}.$$

The one or more first random numbers $r_{0,j}$ and the one or more second random numbers $r_{1,j}$ may sometimes be referred to as a secret receiver internal state $st_R$.

Figure 7B:
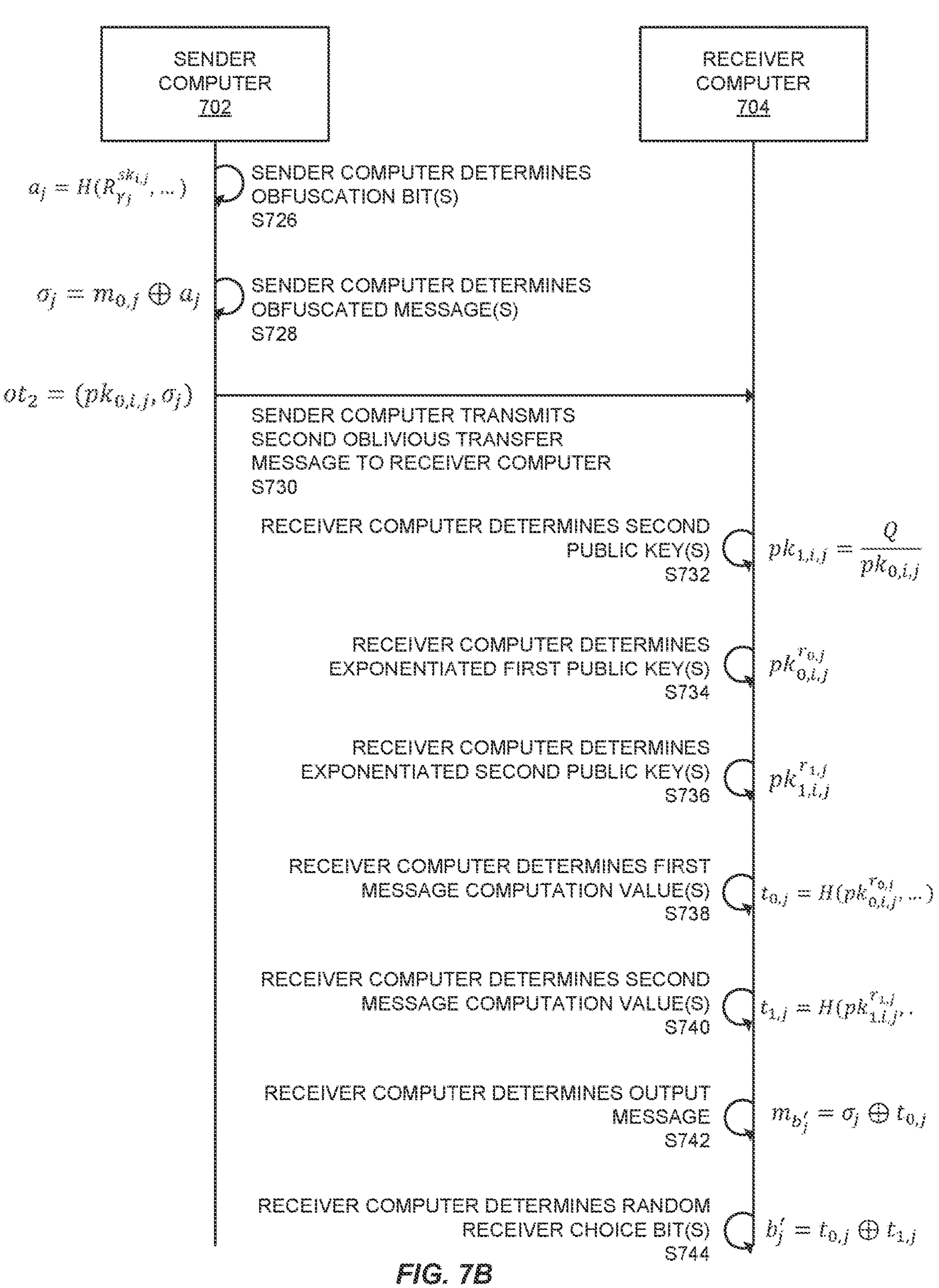

The second oblivious transfer routine $$OT^{(2)}_{S\to R}(1^\kappa, (m_0, m_1), ot_1)$$

can be executed by the sender computer 702, and may result in a second oblivious transfer message $ot_2$, which can be sent by the sender computer 702 to the receiver computer 704. The second oblivious transfer routine $$OT^{(2)}_{S\to R}(1^\kappa, (m_0, m_1), ot_1)$$

can correspond to steps S716-S730 in FIGS. 7A-7B. The sender computer 702 can use the first message $m_0$ and the second message $m_1$ (which may comprise one or more message bits, along with any data contained in the first oblivious transfer message $ot_1$ to generate the second oblivious transfer message $ot_2$, which may contain, among other data, one or more obfuscated messages $\sigma_j$. Any information generated during this oblivious transfer routine that is not sent to the receiver computer 704, or any private information previously held by the sender computer 702 (e.g., one or more secret keys $sk_i$, the first message $m_0$, the second message $m_1$, etc.) may be referred to as the secret sender internal state $st_S$.

Figure 7C:
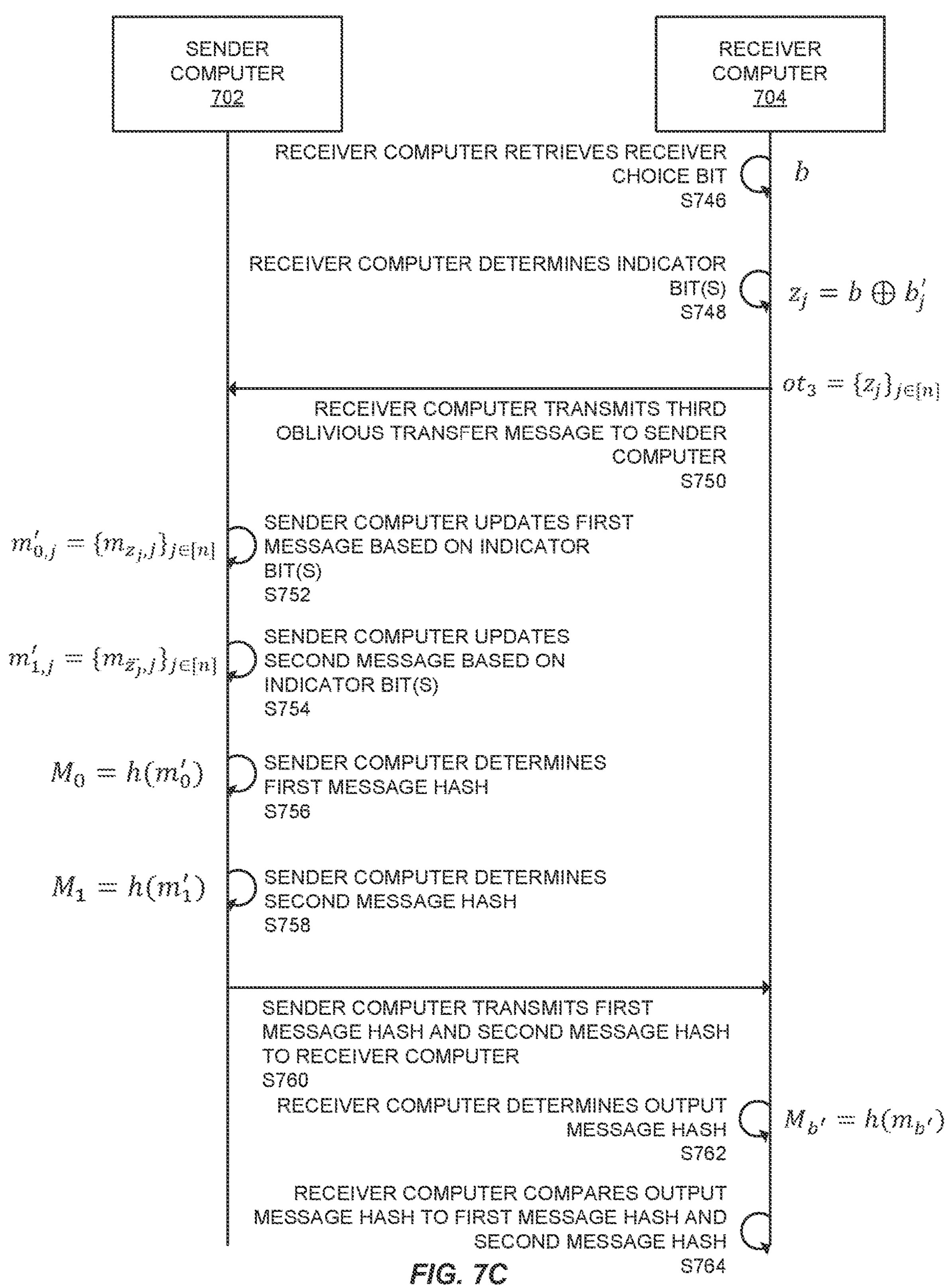

The third oblivious transfer routine $$OT^{(3)}_{R\to S}(st_R, b, ot_2)$$

can be executed by the receiver computer 704 and may result in a third oblivious transfer message $ot_3$, which can be sent by the receiver computer 704 to the sender computer 702. The third oblivious transfer routine $$OT^{(3)}_{R\to S}(st_R, b, ot_2)$$

cam correspond to steps S732-S750 in FIGS. 7B-7C. The receiver computer 704 can use the secret receiver internal state $st_R$ (e.g., one or more first random numbers $r_{0,j}$ and one or more second random numbers $r_{1,j}$) and any information contained in the second oblivious transfer message $ot_2$ (e.g., the one or more obfuscated messages $\sigma_j$) to de-obfuscate the one or more obfuscated messages $\sigma_j$ (thereby generating an output message $m_{b'}$) and generate one or more random receiver choice bits $b'_j$.

Using these one or more random receiver choice bits $b'_j$ and a receiver choice bit b, the receiver computer 704 can generate a third oblivious transfer message $ot_3$ which can comprise one or more indicator bits $z_j$. The receiver computer 704 can transmit this third oblivious transfer message $ot_3$ to the sender computer 702. The one or more indicator bits $z_j$ can be used by the sender computer 702 in the fourth oblivious transfer routine (described below) to update the first message $m_0$ and the second message $m_1$. Notably, the receiver choice bit b is not used until the third oblivious transfer routine $$OT^{(3)}_{R \to S}(st_R, b, ot_2).$$

This "delayed input" feature may be useful, as it may enable a receiver computer 704 or its operator to delay the generation or selection of the receiver choice bit b until the third oblivious transfer routine.

The fourth oblivious transfer routine $OT_S(st_S, ot_3)$ can be executed by the sender computer 702, and may result in the sender computer 702 updating the first message $m_0$ to an updated first message $m'_0$ and the second message $m_1$ to an updated second message $m'_1$.

The fourth oblivious transfer routine $OT_S(st_S, ot_3)$ can correspond to steps S752-S754 in FIG. 7C. The sender computer 702 can use the secret sender internal state $st_S$ (e.g., the first message $m_0$ and the second message $m_1$) and the contents of the third oblivious transfer message $ot_3$ (e.g., the one or more indicator bits $z_j$ to perform the fourth oblivious transfer routine $OT_S(st_S, ot_3)$. Updating the first message $m_0$ and the second message $m_1$ may insure that either the updated first message $m'_0$ or the updated second message $m'_1$ is equivalent to the output message $m_{b'_j}$, in order for the second oblivious transfer method to be consistent with the requirements of one-out-of-two oblivious transfer, as described above with reference to FIG. 6.

Referring to FIG. 7A, at step S706, the receiver computer 704 can determine one or more group elements $Q_j$ by randomly sampling the one or more group elements $Q_j$ from a cyclic group G, which can be defined by a prime number q (i.e., $Q_j \leftarrow G$). In the second oblivious transfer method, the one or more group elements $Q_j$ can comprise a number of group elements equal to the length n of the first message $m_0$ and the second message $m_1$. The one or more group elements $Q_j$ may comprise part of a first oblivious transfer message $ot_1$ sent by the receiver computer 704 to the sender computer 702 (e.g., at step S714). The sender computer 702 can use the one or more group elements $Q_j$ to determine one or more sets of first public keys $pk_{0,i,j}$, and one or more sets of second public keys $pk_{1,i,j}$ (e.g., at step S720).

At step S708, the receiver computer 704 can determine one or more first random numbers $r_{0,j}$ and one or more second random numbers $r_{1,j}$ by sampling the one or more first random numbers $r_{0,j}$ and the one or more second random numbers $r_{1,j}$ from an interval of integers $\mathbb{Z}_q$ based on (e.g., modulo) a prime number q (i.e., $r_{0,j}, r_{1,j} \leftarrow \mathbb{Z}_q$). In the second oblivious transfer method, the one or more first random numbers $r_{0,j}$ can comprise a number of first random numbers equal to the length n of the first message $m_0$ and the second message $m_1$. Likewise the one or more second random numbers $r_{1,j}$ can comprise a number of second random numbers equal to the length n of the first message $m_0$ and the second message $m_1$. In some embodiments, the receiver computer 704 can uniformly sample the one or more first random numbers $r_{0,j}$ and the one or more second random numbers $r_{1,j}$ from the interval of integers $\mathbb{Z}_q$.

At step S710, the receiver computer 704 can determine one or more first random group elements $R_{0,j}$ based on the one or more first random numbers $r_{0,j}$. In some embodiments, the receiver computer 704 can determine the one or more first random group elements $R_{0,j}$ by exponentiating a generator g using the one or more first random numbers $r_{0,j}$ (i.e., $R_{0,j}=g^{r_{0,j}}$). The generator g may be a generator of the cyclic group G. In the second oblivious transfer method, the one or more first random group elements $R_{0,j}$ can comprise a number of first random group element $R_0$ equal to the length n of the first message $m_0$ and the second message $m_1$.

At step S712, the receiver computer 704 can determine one or more second random group elements $R_{1,j}$ based on the one or more second random numbers $r_{1,j}$. In some embodiments, the receiver computer 704 can determine the one or more second random group elements $R_{1,j}$ by exponentiating a generator g using the one or more second random numbers $r_{1,j}$ (i.e., $R_{1,j}=g^{r_{1,j}}$). In the second oblivious transfer method, the one or more second random group elements $R_{1,j}$ can comprise a number of second random group elements $R_0$ equal to the length n of the first message $m_0$ and the second message $m_1$.

The one or more first random group elements $R_{0,j}$ and the one or more second random group elements $R_{1,j}$ may later be used by sender computer 702 to generate one or more obfuscation bits $a_j$, which the sender computer 702 can use to generate one or more obfuscated messages $\sigma_j$ (e.g., at step S728 of FIG. 7B).

At step S714, the receiver computer 704 can transmit a first oblivious transfer message $ot_1$ comprising the one or more group elements $Q_1$, the one or more first random group elements $R_{0,j}$ and the one or more second random group elements $R_{1,j}$ to the sender computer 702. The sender computer 702 can use the one or more group elements $Q_j$, the one or more first random group elements $R_{0,j}$, and the one or more second random group elements $R_{1,j}$ to determine a second oblivious transfer message $ot_2$ (e.g., at step S730 of FIG. 7B) comprising one or more sets of first public keys $pk_{0,i,j}$, (e.g., determined at step S720) and one or more obfuscated messages $\sigma_j$ (i.e., determined at step S728 of FIG. 7B).

At step S716, the sender computer 702 can determine one or more sender choice bits $\gamma_j$ by calculating one or more exclusive ors (XORs) of one or more first message bits $m_{0,j}$ and one or more second message bits $m_{1,j}$ (i.e., $\gamma_j = m_{0,j} \oplus m_{1,j}$). The first message $m_0$ may comprise the one or more first message bits $m_{0,j}$ and the second message $m_1$ may comprise the one or more second message bits $m_{1,j}$. In the second oblivious transfer method, the one or more sender choice bits $\gamma_j$ may comprise a number of sender choice bits $\gamma_j$ equal to the length n of the first message $m_0$ and the second message $m_1$.

At step S718, the sender computer 702 can determine one or more sets of secret keys $sk_{i,j}$ by randomly sampling the one or more sets of secret keys $sk_{i,j}$ from an interval of integers $\mathbb{Z}_q$ based on (e.g., modulo) a prime number q (i.e., $sk_{i,j} \leftarrow \mathbb{Z}_q$), which may be the same as the interval of integers $\mathbb{Z}_q$ used by the receiver computer 704 to sample the one or more first random numbers $r_{0,j}$ and the one or more second random numbers $r_{1,j}$ at step S708. In the second oblivious transfer method, the one or more sets of secret keys $sk_{i,j}$ may comprise a number of sets of secret keys equal to a message length n of the first message $m_0$ and the second message $m_1$. Each set of the one or more sets of secret keys $sk_{i,j}$ may comprise a number of secret keys $sk_i$ equal to a security parameter $\kappa$ or any other appropriate number of secret keys $sk_i$.

At step S720, the sender computer 702 can determine one or more sets of first public keys $pk_{0,i,j}$, and one or more sets of second public keys $pk_{1,i,j}$ using the one or more sets of secret keys $sk_{i,j}$ the one or more group elements $Q_j$ and the generator g. Each set of the one or more sets of first public keys $pk_{0,i,j}$, can comprise a number of first public keys equal to a security parameter $\kappa$ or any other appropriate number of first public keys $pk_{0,i,j}$. Likewise, each set of the one or more sets of second public keys $pk_{1,i,j}$ can comprise a number of second public keys equal to a security parameter $\kappa$ or any other appropriate number of second public keys $pk_{0,i,j}$. In the second oblivious transfer method, the one or more sets of first public keys $pk_{0,i,j}$ can comprise a number of sets of first public keys $pk_{0,i,j}$ equal to a message length n of the first message $m_0$ and the second message $m_1$. Likewise, in the second oblivious transfer method, the one or more sets of second public keys $pk_{1,i,j}$ can comprise a number of set of second public keys $pk_{0,i,j}$ equal to a message length n of the first message $m_0$ and the second message $m_1$. The sender computer 702 can use the following formulas to determine the one or more sets of first public keys $pk_{0,i,j}$ and the one or more sets of second public keys $pk_{1,i,j}$:

$$pk_{\gamma_j,i,j} = g^{sk_{i,j}}$$

-continued $$pk_{1-\gamma,i,j} = \frac{Q_j}{pk_{\gamma,i,j}}$$

As evident, these formulas depend on the one or more sender choice bits $\gamma_j$, meaning that the method used by the sender computer 702 to determine the one or more sets of first public keys $pk_{0,i,j}$ and the one or more sets of second public keys $pk_{1,i,j}$ changes depending on the values of the one or more sender choice bits $\gamma_j$. For example, if a sender choice bit $\gamma=0$, a corresponding set of first public keys $pk_{0,i,j} = g^{sk_{i,j}}$, and a corresponding set of second public keys $$pk_{1,i,j} = \frac{Q_j}{pk_{0,i,j}}.$$

By, contrast, if a sender choice bit $\gamma=1$, a corresponding set of second public keys $pk_{1,i,j} = g^{sk_{i,j}}$ and a corresponding set of first public keys $$pk_{0,i,j} = \frac{Q_j}{pk_{1,i,j}}.$$

By changing how the one or more sets of first public keys $pk_{0,i,j}$ and the one or more sets of second public keys $pk_{1,i,j}$ are determined based on the one or more (secret) sender choice bits $\gamma_j$, the sender computer 702 can maintain sender privacy and avoid accidentally revealing both messages to the receiver computer 704.

At step S722, the sender computer 702 can select one or more random group elements from the one or more first random group elements $R_{0,j}$ or the one or more second random group elements $R_{1,j}$ using the one or more sender choice bits $\gamma_j$, thereby determining one or more selected random group elements $R_{\gamma_j,j}$. In the second oblivious transfer method, the one or more selected random group elements $R_{\gamma_j,j}$ may comprise a number of sets of selected random group elements $R_{\gamma_j,j}$ equal to a message length n of the first message $m_0$ and the second message $m_1$.

As an example, the sender computer 702 can iterate through the one or more sender choice bits $\gamma_j$ and for each sender choice bit of the one or more sender choice bits $\gamma_j$, the sender computer 702 can select a corresponding first random group element from the one or more first random group elements $R_{1,j}$ if the sender choice bit has a value of zero or false, and select a corresponding second random group element from the one or more second random group elements $R_{1,j}$ if the sender choice bit has a value of one or true. Expressed otherwise, if $\gamma=0$, then $R_\gamma=R_0$ and if $\gamma=1$, then $R_\gamma=R_1$. As another example, if $\gamma_0=1$ and $\gamma_1=0$, then $R_{\gamma_0,0}=R_{1,0}$ and $R_{\gamma_1,1}=R_{0,1}$, or if $\gamma_0=0$ and $\gamma_1=1$, then $R_{\gamma_0,0}=R_{0,0}$ and $R_{\gamma_1,1}=R_{1,1}$. The one or more selected random group elements $R_{\gamma_j,j}$ may later be used by the sender computer 702 to generate one or more obfuscation bits $a_j$ (e.g., at step S726 of FIG. 7B), which can later be used to generate one or more obfuscated messages $\sigma_j$ (e.g., at step S728 of FIG. 7B).

At step S724, the sender computer 702 can determine one or more sets of exponentiated selected random group elements $$R_{\gamma_j,j}^{sk_{i,j}}$$

by exponentiating the one or more selected random group elements $R_{\gamma_j,j}$ using the one or more sets of secret keys $sk_{i,j}$. In the second oblivious transfer method, the one or more sets of exponentiated selected random group elements $$R_{\gamma_j,j}^{sk_{i,j}}$$

may comprise a number of sets of exponentiated selected random group elements equal to a message length n of the first message $m_0$ and the second message $m_1$.

Referring now to FIG. 7B, at step S726, the sender computer 702 can determine one or more obfuscation bits $a_j$ using a hardcore predicate function H, the one or more selected random group elements $R_{\gamma_j,j}$, and the one or more sets of secret keys $sk_{i,j}$. In the second oblivious transfer method, the one or more obfuscation bits $a_j$ can comprise a number of obfuscation bits $a_j$ equal to a message length n of the first message $m_0$ and the second message $m_1$. In more detail the sender computer 502 can use the one or more selected random group elements $R_{\gamma_j,j}$, and the one or more sets of secret keys $sk_{i,j}$ to generate one or more sets of exponentiated selected random group elements $$R_{\gamma_j,j}^{sk_{i,j}}$$

(as described above), then input the one or more sets of exponentiated selected random group elements $$R_{\gamma_j,j}^{sk_{i,j}}$$

into the hardcore predicate function H to generate the one or more obfuscation bits $a_j$ (i.e., $$a_j = H\left(R_{\gamma_j,j}^{sk_{i,j}}, \ldots\right)\Big).$$

At step S728, the sender computer 702 can determine one or more obfuscated messages $\sigma_j$ by calculating one or more exclusive ors (XORs) of one or more first message bits $m_{0,j}$ and the one or more obfuscation bits $a_j$, (i.e., $\sigma_j=m_{0,j}\oplus a_j$). In the second oblivious transfer method, the one or more obfuscated messages $\sigma_j$ can comprise a number of obfuscated messages $\sigma_j$ equal to a message length n of the first message $m_0$ and the second message $m_1$. In effect, each obfuscated message can communicate one message bit from either the first message $m_0$ or the second message $m_1$. Later, the one or more obfuscated messages $\sigma_j$ can be sent by the sender computer 702 to the receiver computer 704, and the receiver computer 704 can de-obfuscate the one or more obfuscated messages $\sigma_j$ to produce the output message $m_{b'_j}$ (e.g., at step S742).

At step S730, the receiver computer 704 can receive a second oblivious transfer message $ot_2=(pk_{0,i,j},\sigma_j)$ comprising the one or more sets of first public keys $pk_{0,i,j}$, and the one or more oblivious transfer messages $\sigma_j$ from the sender computer 702. The receiver computer 704 can later use the one or more sets of first public keys $pk_{0,i,j}$, to generate one or more first message computation values $t_{0,j}$ (e.g., at step S738) which can later be used to de-obfuscate the one or more obfuscated messages $\sigma_1$ to produce the output message $m_{b'_i}$ (e.g., at step S742). In some embodiments, the second oblivious transfer message $ot_2$ can additionally comprise the one or more sets of second public keys $pk_{1,i,j}$.

At step S732, the receiver computer 704 can optionally determine the one or more sets of second public keys $pk_{1,i,j}$ using the one or more sets of first public keys $pk_{0,i,j}$, and the one or more group elements $Q_j$, e.g., according to the formula $$pk_{1,i,j} = \frac{Q_j}{pk_{0,i,j}}.$$

The receiver computer 704 can determine the one or more sets of second public keys $pk_{1,i,j}$ if the one or more sets of second public keys $pk_{1,i,j}$ were not included in the second oblivious transfer message $ot_2$.

At step S734, the receiver computer 704 can exponentiate each first public key of the one or more sets of first public keys $pk_{0,i,j}$, with a corresponding first random number of the one or more first random numbers $r_{0,j}$, thereby determining one or more sets of exponentiated first public keys $$pk_{0,i,j}^{r_{0,j}}.$$

In the second oblivious transfer method, the one or more sets of exponentiated first public keys $$pk_{0,i,j}^{r_{0,j}}$$

can comprise a number of sets of exponentiated first public keys $$pk_{0,i}^{r_0}$$

equal to a message length n of the first message $m_0$ and the second message $m_1$. Each set of exponentiated first public keys $$pk_{0,i,j}^{r_{0,j}}$$

can comprise a number of exponentiated first public keys equal to a security parameter κ, or any other appropriate number of exponentiated first public keys.

At step S736, the receiver computer 704 can exponentiate each second public key of the one or more sets of second public keys $pk_{1,i,j}$ with a corresponding second random number of the one or more second random numbers $r_{1,j}$, thereby determining one or more sets of exponentiated second public keys $$pk_{1,i,j}^{r_{1,j}}.$$

In the second oblivious transfer method, the one or more sets of exponentiated second public keys $$pk_{0,i,j}^{r_{0,j}}$$

can comprise a number of sets of exponentiated second public keys $$pk_{1,i}^{r_1}$$

equal to a message length n of the first message $m_0$ and the second message $m_1$. Each set of exponentiated second public keys $$pk_{1,i,j}^{r_{1,j}}$$

can comprise a number of exponentiated second public keys equal to a security parameter κ, or any other appropriate number of exponentiated second public keys.

At step S738, the receiver computer 704 can determine one or more first message computation values $t_{0,j}$ using the one or more sets of first public keys $pk_{0,i,j}$, the one or more first random numbers $r_{0,j}$, and the hardcore predicate function H. The receiver computer 704 can generate the one or more sets of exponentiated first public keys $$pk_{0,i,j}^{r_{0,j}}$$

as described above, then input each exponentiated first public key of the one or more sets of exponentiated first public keys $$pk_{0,i,j}^{r_{0,j}}$$

into the hardcore predicate function H, thereby determining the one or more first message computation values $t_{0,j}$ (i.e., $$t_{0,j} = H\left(pk_{0,i,j}^{r_{0,j}}, \ldots\right)\right).$$

In the second oblivious transfer method, the one or more first message computation values $t_{0,j}$ may comprise a number of first message computation values $t_{0,j}$ equal to a message length n of the first message $m_0$ and the second message $m_1$.

At step S740, the receiver computer 704 can determine one or more second message computation values $t_{1,j}$ using the one or more sets of second public keys $pk_{1,i,j}$, the one or more second random numbers $r_{1,j}$, and the hardcore predicate function H. The receiver computer 704 can generate the one or more sets of exponentiated second public keys $$pk_{1,i,j}^{r_{1,j}}$$

as described above, then input each exponentiated second public key of the one or more sets of exponentiated second public keys $$\mathrm{pk}_{1,i,j}^{r_{1,j}}$$

into the hardcore predicate function H, thereby determining the one or more second message computation values $t_{1,j}$ (i.e., $$t_{1,j} = H\left(\mathrm{pk}_{1,i,j}^{r_{1,j}}, \ldots\right)\right).$$

In the second oblivious transfer method, the one or more second message computation values $t_{1,j}$ may comprise a number of second message computation values $t_{1,j}$ equal to a message length n of the first message $m_0$ and the second message $m_1$.

At step S742, the receiver computer 704 can de-obfuscate the one or more obfuscated messages $\sigma_1$ using the one or more first message computation values $t_{0,j}$, thereby determining an output message $$m_{b'_j}.$$

The receiver computer 704 can de-obfuscate the one or more obfuscated messages $\sigma_j$ by computing one or more exclusive ors (XORs) of the one or more first message computation values $t_{0,j}$ and the one or more obfuscated messages $\sigma_j$ (i.e., $$m_{b'_j} = \sigma_j \oplus t_{0,j}\Big),$$

producing one or more output message bits $$m_{b'_j,j}$$

which can collectively comprise the output message $$m_{b'_j}\left(i.e.,\ m_{b'_j} = \left\{m_{b'_j,j}\right\}_{j\in n}\right).$$

In the second oblivious transfer method, the one or more output message bits $$m_{b'_j,j}$$

can comprise a number of output message bits $$m_{b'_j,j}$$

equal to a message length n of the first message $m_0$ and the second message $m_1$. The output message $$m_{b'_j}$$

may comprise some random combination of the first message $m_0$ or the second message $m_1$, and may not be equivalent to either the first message $m_0$ or the second message $m_1$, As such, some additional steps (described below) may be performed to update the first message $m_0$ and the second message $m_1$ in order to meet the requirements of one-out-of-two oblivious transfer.

At step S744, the receiver computer 704 can determine one or more random receiver choice bits $$b'_j$$

by calculating one or more exclusive ors (XORs) of the one or more first message computation values $t_{0,j}$ and the one or more second message computation values $$t_{1,j}\ \left(\text{i.e., } b'_j = t_{0,j} \oplus t_{1,j}\right).$$

In the second oblivious transfer method, the one or more random receiver choice bits $$b'_j$$

may comprise a number of random receiver choice bits $$b'_j$$

equal to a message length n of the first message $m_0$ and the second message $m_1$. The one or more random receiver choice bits $$b'_j$$

can be used to determine one or more indicator bits $z_j$, which as described above with reference to FIG. 6, can be used by the sender computer 702 to update the first message $m_0$ and the second message $m_1$.

Referring now to FIG. 7C, at step S746, the receiver computer 704 can retrieve a receiver choice bit b. As examples, the receiver computer 704 can retrieve the receiver choice bit b from a memory element (e.g., a secure memory element, a computer readable medium, a receiver choice bit module, etc.), or the receiver computer 704 can retrieve the receiver choice bit b from an operator of the receiver computer 704 (e.g., via an IO interface such as a keyboard), or the receiver computer 704 can use some procedure (e.g., a function or code) to generate the receiver choice bit b.

At step S748, the receiver computer 704 can determine one or more indicator bits $z_j$ based on the receiver choice bit b and the one or more random receiver choice bits $$b'_j.$$

The receiver computer 704 can determine the one or more indicator bits $z_j$ by calculating one or more exclusive ors (XORs) of the receiver choice bit b and the one or more random receiver choice bits $$b'_j\left(i.e.,\ z_j = b \oplus b'_j\right).$$

In the second oblivious transfer method, the one or more indicator bits $z_j$ may comprise a number of indicator bits $z_j$ equal to a message length n of the first message $m_0$ and the second message $m_1$.

At step S750, the receiver computer 704 can transmit a third oblivious transfer message $ot_3$ comprising the one or more indicator bits $z_j$ to the sender computer 702 (i.e., $ot_3=\{z_j\}_{j\in n}$)

At step S752, the sender computer 702 can update the first message $m_0$ based on the one or more indicator bits $z_j$, thereby determining an updated first message $$m'_0\ \left(\text{i.e., } m'_{0,j} = \{m_{z_j,j}\}_{j\in[n]}\right).$$

The sender computer 702 can determine the updated first message $$m'_0$$

by effectively generating the updated first message $$m'_0$$

using message bits from the first message $m_0$ and the second message $m_1$, which can be selected based on the one or more indicator bits $z_j$.

This process may be better illustrated by example. If the first message $m_0$ comprises a bit string "011", the second message $m_1$ comprises a bit string "101" and the one or more indicator bits $z_j$ comprise a bit string "011," then the sender computer 702 can determine the updated first message $$m'_0$$

using the following process. The sender computer 702 can evaluate the first indicator bit $z_1$. Because the value of the first indicator bit $z_1=0$, the sender computer 702 can assign the first bit of the updated first message $$m'_0$$

equal to the first bit of the first message $m_{0,1}=0$. The updated first message $$m'_0$$

now comprises the bit string "0XX". Next, the sender computer 702 can evaluate the second indicator bit $z_2$. Because the value of the second indicator bit $z_2=1$, the sender computer 702 can assign the second bit of the updated first message $$m_0'$$

equal to the second bit of the second message $m_{1,2}=0$. The updated second message $$m_0'$$

now comprises the bit string "00X". Next, the sender computer 702 can evaluate the third indicator bit $z_3$. Because the value of the third indicator bit $z_3=1$, the sender computer 702 can assign the third bit of the updated first message $$m_0'$$

equal to the third bit of the second message $m_{1,2}=1$. The updated first message $$m_0'$$

now comprises the bit string "001," completing the step of updating the first message $m_0$ to determine the updated first message $$m_0'.$$

At step S754, the sender computer 702 can update the second message $m_1$ based on the one or more indicator bits $z_j$, thereby determining an updated second message $$m_1' \left(\text{i.e., } m_{1,j}' = \{m_{\overline{z_j},j}\}_{j\in[n]}\right).$$

The sender computer 702 can determine the updated second message $$m_1'$$

by effectively generating the updated second message $$m_1'$$

using message bits from the first message $m_0$ and the second message $m_1$, which can be selected based on the one or more indicator bits $z_j$. This process is similar to the process described above with reference to step S752, except the sender computer selects message bits using the logical inverse of the indicator bits $\overline{z_j}$ rather than the indicator bits $z_j$ themselves. For example, if $z_0=0$, the sender computer 702 can select a message bit from the second message $m_1$, rather than the first message $m_0$, as described above.

This process may be better illustrated by example. If the first message $m_0$ comprises a bit string "011", the second message $m_1$ comprises a bit string "101" and the one or more indicator bits $z_j$ comprise a bit string "011," then the sender computer 702 can determine the updated second message $$m_1'$$

using the following process. The sender computer 702 can evaluate the first indicator bit $z_1$. Because the value of the first indicator bit $z_1=0$, the sender computer 702 can assign the first bit of the updated second message $$m_1'$$

equal to the first bit of the second message $m_{1,1}=1$. The updated second message $$m_1'$$

now comprises the bit string "1XX". Next, the sender computer 702 can evaluate the second indicator bit $z_2$. Because the value of the second indicator bit $z_2=1$, the sender computer 702 can assign the second bit of the updated second message $$m_1'$$

equal to the second bit of the first message $m_{0,2}=1$. The updated second message $$m_1'$$

now comprises the bit string "11X". Next, the sender computer 702 can evaluate the third indicator bit $z_3$. Because the value of the third indicator bit $z_3=1$, the sender computer 702 can assign the third bit of the updated second message $$m_1'$$

equal to the third bit of the first message $m_{0,3}=1$. The updated second message $$m_1'$$

now comprises the bit string "001," completing the step of updating the second message $m_1$ to determine the updated second message $$m_1'.$$

At this point, the receiver computer 704 has determined the output message $$m_{b'_j}$$

and the sender computer 702 has updated the first message $m_0$ and the second message $m_1$, thereby determining an updated first message $$m'_0$$

and an updated second message $$m'_1,$$

completing a one-out-of-two random string oblivious transfer. However, some additional optional steps (e.g., steps S756-S764) can be performed in order to verify that the second oblivious transfer method was executed correctly.

At step S756, the sender computer 702 can determine a first message hash $M_0$ using the updated first message $$m'_0$$

and a hash function h (i.e., $$M_0 = h(m'_0)).$$

This first message hash $M_0$ can later be analyzed by the receiver computer 704 to verify that the receiver computer 704 received one of the updated first message $$m'_0$$

and the updated second message $$m'_1$$

during the second oblivious transfer method.

At step S758, the sender computer 702 can determine a second message hash $M_1$ using the updated first message $$m'_1$$

and a hash function h (i.e., $$M_1 = h(m'_1)).$$

This second message hash $M_1$ can later be analyzed by the receiver computer 704 to verify that the receiver computer 704 received one of the updated first message $$m'_0$$

and the updated second message $$m'_1$$

during the second oblivious transfer method.

At step S760, the sender computer 702 can transmit the first message hash $M_0$ and the second message hash $M_1$ to the receiver computer 704. The sender computer 702 may also transmit a hash function indicator to the receiver computer 704, which the receiver computer 704 can use to identify the hash function h. Alternatively, the sender computer 702 can transmit a digital representation of the hash function h itself to the receiver computer 704.

At step S762, the receiver computer 704 can determine an output message hash $M_{b'}$ using the output message $$m_{b'_j}$$

and the hash function h (i.e., $$M_{b'} = h\left(m_{b'_j}\right)).$$

Ideally, if the second oblivious transfer method was completed correctly, the output message hash $M_{b'}$ can be equivalent to one of the first message hash $M_0$ and the second message hash $M_1$.

At step S764, the receiver computer 704 can compare the output message hash $M_{b'}$ to the first message hash $M_0$ and the second message hash $M_1$, e.g., by testing the equality of the first message hash $M_0$ to the output message hash $M_{b'}$ and the equality of the second message hash $M_1$ to the output message hash $M_{b'}$. If the output message hash $M_{b'}$ is equal to one of the first message hash $M_0$ and the second message hash $M_1$, then the second oblivious transfer method has been completed correctly. In some embodiments, the receiver computer 704 can transmit the output message hash $M_{b'}$ to the sender computer 702, enabling the sender computer 702 to also verify that the second oblivious transfer method has been completed correctly.

The second oblivious transfer method can be said to be correct if for any security parameter $\kappa \in \mathbb{N}$ and any receiver choice bit $b \in \{0,1\}$, letting:

$$(ot_1, st_R) \leftarrow OT^{(1)}_{R\to S}(1^\kappa),$$
$$(ot_2, st_S) \leftarrow OT^{(2)}_{R\to S}(1^\kappa, (m_0, m_1), ot_1),$$
$$(ot_3, m') \leftarrow OT^{(3)}_{R\to S}(st_R, b, ot_2),$$
$$(m'_0, m'_1) \leftarrow OT_S(st_S, ot_3),$$

then $m'=m_{b'}$ with overwhelming probability.

Because the second oblivious transfer method can involves repeated execution of the first oblivious transfer method, the correctness of the second oblivious transfer method follows from the correctness of the first oblivious transfer method. Using the indicator bits $z_j$, the sender computer 702 can guarantee that output message $m_{b'}$ is equivalent to either the updated first message $$m'_0$$

or the updated second message $$m'_1,$$

demonstrating the correctness of the method. The receiver computer 704 can use the first message hash $M_0$ and second message hash $M_1$ to verify that the sender computer 702 updated the first message $m_0$ and the second message $m_1$, demonstrating at least semi-honest execution of the method on the part of the sender computer 702.

Computational receiver privacy and statistical sender privacy of the second oblivious transfer method can be proven as follows. Computational receiver privacy follows from the receiver privacy of the first oblivious transfer method. To prove computational receiver privacy, n consecutive hybrids can be considered, in which the first $Hyb_1$ corresponds to b==0 and $Hyb_n$ corresponds to b==1. In the $j^{th}$ hybrid $Hyb_j$, $$z_i == b'_i \text{ for } i \in [1, j-1] \text{ and } z_i = \overline{b_{i'}} \text{ for } i \in [j, n].$$

Given a distinguisher $\mathcal{D}$ for distinguishing between $Hyb_j$ and $Hyb_{j+1}$, a hypothetical adversary $\mathcal{A}$ can break receiver privacy as follows. The hypothetical adversary $\mathcal{A}$ can interact with a challenger in a computational receiver privacy experiment $Exp^{k,m_0,m_1}$. The hypothetical adversary $\mathcal{A}$ can obtain and set the first oblivious transfer message $ot_1$ in the experiment. The rest of the experiment can be performed according to $Hyb_j$. The hypothetical adversary $\mathcal{A}$ can also obtain the second oblivious transfer message $ot_2$ from the distinguisher $\mathcal{D}$, which can be forwarded to the challenger as the second oblivious transfer message $ot_2$. The second oblivious transfer method can be said to satisfy computational receiver privacy if:

$$|Pr[b=0] - Pr[b=1]| = \left|Pr[\mathcal{D} \text{ is in } Hyb_j] - Pr[\mathcal{D} \text{ is in } Hyb_{j+1}]\right| \leq negl(\kappa)$$

It can be seen that the experiment corresponds to $Hyb_j$ when b==0 and corresponds to $Hyb_{j+1}$ when b==1. This construction of the hypothetical adversary $\mathcal{A}$ and distinguisher $\mathcal{D}$ and reduces proving computational receiver privacy of the second oblivious transfer method to proving computational receiver privacy of the first oblivious transfer method, as demonstrated above. Statistical sender privacy can be demonstrated in a similar manner.

Figure 8:
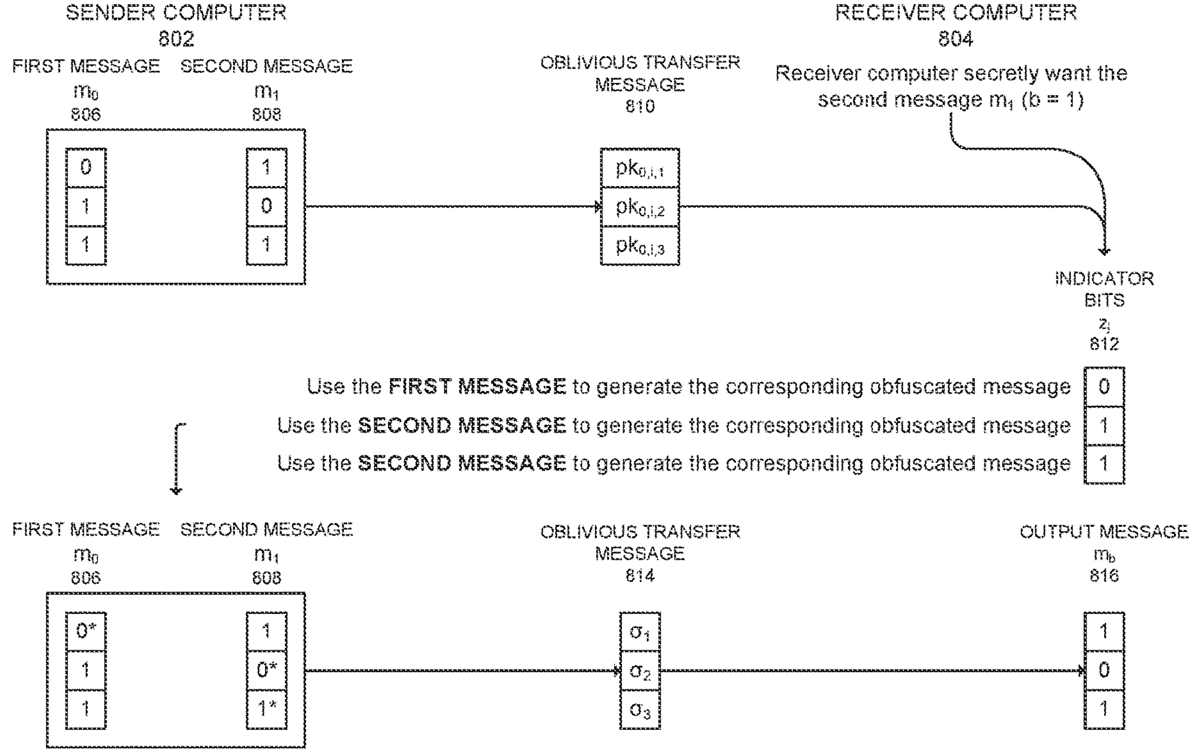
FIG. 8 shows a diagram summarizing a method for performing non-random string oblivious transfer according to some embodiments of the present disclosure.

One difference between the third oblivious transfer method (described below with reference to FIGS. 9A-9C) and the second oblivious transfer method (described above with reference to FIGS. 7A-7C) is that the second oblivious transfer method can comprise a random string oblivious transfer method, while the third oblivious transfer method can comprise a non-random string oblivious transfer method. Achieving non-random string oblivious transfer can be accomplished by modifying the use of indicator bits $z_j$, introduced above with reference to FIG. 6. Prior to describing the third oblivious transfer method in more detail with reference to FIGS. 9A-9C, this modified use of indicator bits $z_j$ is described with below reference to FIG. 8.

As described above with reference to FIGS. 7A-7C, the receiver computer 804 can generate one or more indicator bits $z_j$ 812 by calculating one or more exclusive ors (XORs) of a receiver choice bit b and one or more random receiver choice bits $$b'_j.$$

Further, the receiver computer 804 can generate the one or more random receiver choice bits $$b'_j$$

by calculating one or more exclusive ors (XORs) of one or more first message computation values $t_{0,j}$ and one or more second message computation values $t_{1,j}$. The one or more first message computation values $t_{0,j}$ can be computed using one or more sets of first public keys $pk_{0,i,j}$, one or more sets of second public keys $pk_{1,i,j}$, and a hardcore predicate function H. The receiver computer 804 does not need to de-obfuscating one or more obfuscated messages $\sigma_j$ before generating the one or more indicator bits $z_j$ 812. As a result, the receiver computer 804 can generate the one or more indicator bits $z_j$ 812 prior to de-obfuscating the one or more obfuscated messages $\sigma_j$. Consequently, the receiver computer 804 can use the one or more indicator bits $z_j$ 812 to indicate to the sender computer 802 which message bits the sender computer should use to generate the one or more obfuscated messages $\sigma_j$. In doing so, the sender computer 802 and receiver computer 804 can guarantee that the receiver computer 804 determines an output message $m_b$ 816 that is consistent with a receiver choice bit b possessed by the receiver computer 804.

In more detail, the sender computer 802 can send an oblivious transfer message 810 comprising one or more sets of first public keys $pk_{0,i,j}$, and optionally one or more sets of second public keys $pk_{0,i,j}$, and/or one or more group elements $Q_j$. Using the contents of the oblivious transfer message 810 and a hardcore predicate function H, the receiver computer 804 can generate one or more first message computation values $t_{0,j}$ and one or more second message computation values $t_{1,j}$. Using the one or more first message computation values $t_{0,j}$ and the one or more second message computation values $t_{1,j}$, the receiver computer 804 can generate one or more random receiver choice bits $$b'_j.$$

Using the one or more random receiver choice bits $$b'_j$$

and the receiver choice bit b, the receiver computer 804 can generate one or more indicator bits $z_j$ 812, which the receiver computer 804 can send to the sender computer 802.

The sender computer 802 can use the one or more indicator bits $z_j$ 812 to select one or more selected message bits $m_{z_j}$ from the first message $m_0$ 806 and the second message $m_1$ 808. These selected message bits $m_{z_j}$ are indicated by asterisks (*). In some embodiments, the sender computer 802 can select message bits from the first message $m_0$ 806 when a corresponding indicator bit $z_j$ 812 is equal to 0 or false and select message bits from the second message $m_1$ 808 when a corresponding indicator bit $z_j$ 812 is equal to 1 or true. The sender computer 802 can generate one or more obfuscated messages $\sigma_j$ using the one or more selected message bits $m_{z_j}$ and one or more obfuscation bits $a_j$ generated by the sender computer 802.

The sender computer 802 can then send an oblivious transfer message 814 containing the one or more obfuscated messages $\sigma_j$ to the receiver computer 804. The receiver computer 804 can then de-obfuscated the one or more obfuscated messages $\sigma_j$ to determine an output message $m_b$ 816, which can be consistent with the second message $m_1$ 808 and the receiver choice bit b=1.

It may appear that the indicator bits $z_j$ 812 reveal the output message $m_b$ 816 and the receiver choice bit b, as they indicate which message bits should be used to generate the one or more obfuscated messages $\sigma_j$. However, as described above, message bits used to generate the one or more obfuscated messages $\sigma_j$ are not necessarily the message bits conveyed by those obfuscated messages $\sigma_j$. As such, knowing which message bits were used to generate the one or more obfuscated messages $\sigma_1$ does not enable the sender computer 802 to determine the output message $m_b$ 816. As such, receiver privacy is preserved and this oblivious transfer method (i.e., the third oblivious transfer method) qualifies as one-out-of-two oblivious transfer.

Figure 9A:
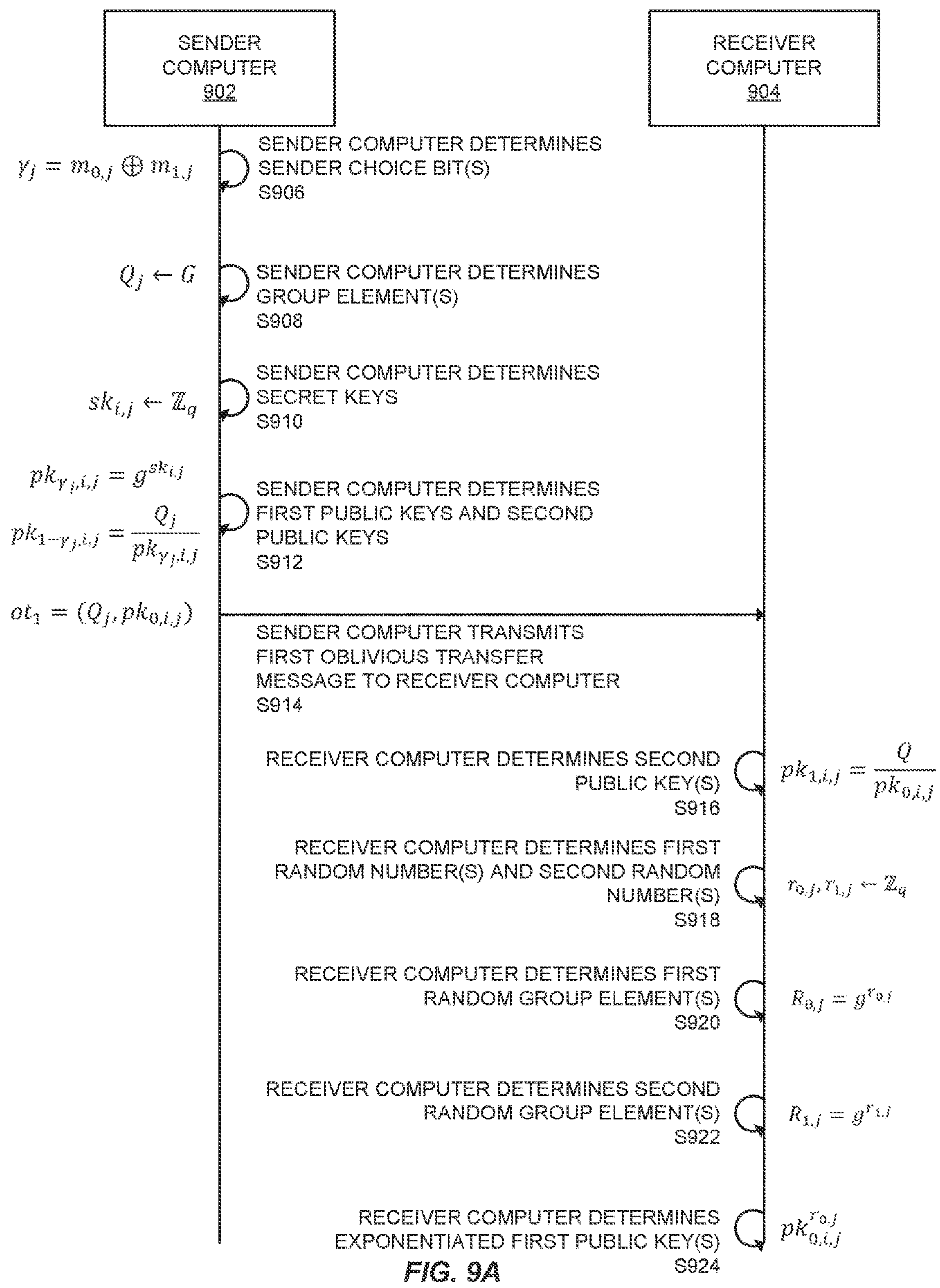
FIGS. 9A-9C show a sequence diagram of an exemplary method for performing non-random string oblivious transfer according to some embodiments of the present disclosure.

The third oblivious transfer method is described below with reference to the sequence diagram in FIGS. 9A-9C. Referring to FIG. 9A, at step S906, the sender computer 902 can determine one or more sender choice bits $\gamma_j$ by calculating one or more exclusive ors (XORs) of one or more first message bits $m_0$ and one or more second message bits $m_{1,j}$ (i.e., $\gamma_j = m_{0,j} \oplus m_{1,j}$). The first message $m_0$ may comprise the one or more first message bits $m_{0,j}$ and the second message $m_1$ may comprise the one or more second message bits $m_{1,j}$. In the third oblivious transfer method, the one or more sender choice bits $\gamma_j$ may comprise a number of sender choice bits $\gamma_j$ equal to the length n of the first message $m_0$ and the second message $m_1$.

At step S908, the sender computer 902 can determine one or more group elements $Q_j$ by randomly sampling the one or more group elements $Q_j$ from a cyclic group G, which can be defined by a prime number q (i.e., $Q_j \leftarrow G$). Notably, in the third oblivious transfer method the sender computer 902 determines the one or more cyclic group elements $Q_j$ rather than the receiver computer 904 (as in the first oblivious transfer method and the second oblivious transfer method). In the third oblivious transfer method, the one or more group elements $Q_j$ can comprise a number of group elements equal to the length n of the first message $m_0$ and the second message $m_1$. The one or more group elements $Q_j$ may comprise part of a first oblivious transfer message $ot_1$ sent by the sender computer 902 to the receiver computer 904 (e.g., at step S914).

At step S910, the sender computer 902 can determine one or more sets of secret keys $sk_{i,j}$ by randomly sampling the one or more sets of secret keys $sk_{i,j}$ from an interval of integers $\mathbb{Z}$ q based on (e.g., modulo) a prime number q (i.e., $sk_{i,j} \leftarrow \mathbb{Z}_q$), which may be the same as an interval of integers $\mathbb{Z}_q$ used by the receiver computer 904 to sample the one or more first random numbers $r_{0,j}$ and the one or more second random numbers $r_{1,j}$ (e.g., at step S918). In the third oblivious transfer method, the one or more sets of secret keys $sk_{i,j}$ may comprise a number of sets of secret keys equal to a message length n of the first message $m_0$ and the second message $m_1$. Each set of the one or more sets of secret keys $sk_{i,j}$ may comprise a number of secret keys $sk_i$ equal to a security parameter $\kappa$ or any other appropriate number of secret keys $sk_i$.

At step S912, the sender computer 902 can determine one or more sets of first public keys $pk_{0,i,j}$, and one or more sets of second public keys $pk_{1,i,j}$ using the one or more sets of secret keys $sk_{i,j}$ the one or more group elements $Q_j$ and the generator g. Each set of the one or more sets of first public keys $pk_{0,i,j}$, can comprise a number of first public keys equal to a security parameter $\kappa$ or any other appropriate number of first public keys $pk_{0,i,j}$. Likewise, each set of the one or more sets of second public keys $pk_{1,i,j}$ can comprise a number of second public keys equal to a security parameter $\kappa$ or any other appropriate number of second public keys $pk_{0,i,j}$. In the third oblivious transfer method, the one or more sets of first public keys $pk_{0,i,j}$, can comprise a number of sets of first public keys $pk_{0,i,j}$, equal to a message length n of the first message $m_0$ and the second message $m_1$. Likewise, in the third oblivious transfer method, the one or more sets of second public keys $pk_{1,i,j}$ can comprise a number of set of second public keys $pk_{0,i,j}$, equal to a message length n of the first message $m_0$ and the second message $m_1$. The sender computer 902 can use the following formulas to determine the one or more sets of first public keys $pk_{0,i,j}$, and the one or more sets of second public keys $pk_{1,i,j}$:

$$pk_{\gamma_j,i,j} = g^{sk_{i,j}}$$

$$pk_{1-\gamma,i,j} = \frac{Q_j}{pk_{\gamma,i,j}}$$

As evident, these formulas depend on the one or more sender choice bits $\gamma_j$, meaning that the method used by the sender computer 902 to determine the one or more sets of first public keys $pk_{0,i,j}$, and the one or more sets of second public keys $pk_{1,i,j}$ changes depending on the values of the one or more sender choice bits $\gamma_j$. For example, if a sender choice bit $\gamma$=0, a corresponding set of first public keys $pk_{0,i,j}$, $=g^{sk_{i,j}}$, and a corresponding set of second public keys $$pk_{1,i,j} = \frac{Q_j}{pk_{0,i,j}}.$$

By contrast, if a sender choice bit $\gamma$=1, a corresponding set of second public keys $pk_{1,i,j} = g^{sk_{i,j}}$ and a corresponding set of first public keys $$pk_{0,i,j} = \frac{Q_j}{pk_{1,i,j}}.$$

By changing how the one or more sets of first public keys $pk_{0,i,j}$ and the one or more sets of second public keys $pk_{1,i,j}$ are determined based on the one or more (secret) sender choice bits $\gamma_j$, the sender computer 902 can maintain sender privacy and avoid accidentally revealing both messages to the receiver computer 904.

The sender computer 902 can generate a first oblivious transfer message $ot_1=(Q_j,pk_{0,i,j})$ comprising the one or more group elements $Q_j$ and the one or more sets of first public keys $pk_{0,i,j}$. The first oblivious transfer message $ot_1$ can optionally comprise the one or more second public keys $pk_{1,i,j}$. At step S914, the receiver computer 904 can receive the first oblivious transfer message $ot_1$ from the sender computer 902. The receiver computer 904 can later use the one or more sets of first public keys $pk_{0,i,j}$, to generate one or more first message computation values $t_{0,j}$ (e.g., at step S928 of FIG. 9B) which can later be used to de-obfuscate the one or more obfuscated messages $\sigma_j$ to produce the output message $$m_{b'_j}$$

Figure 9B:
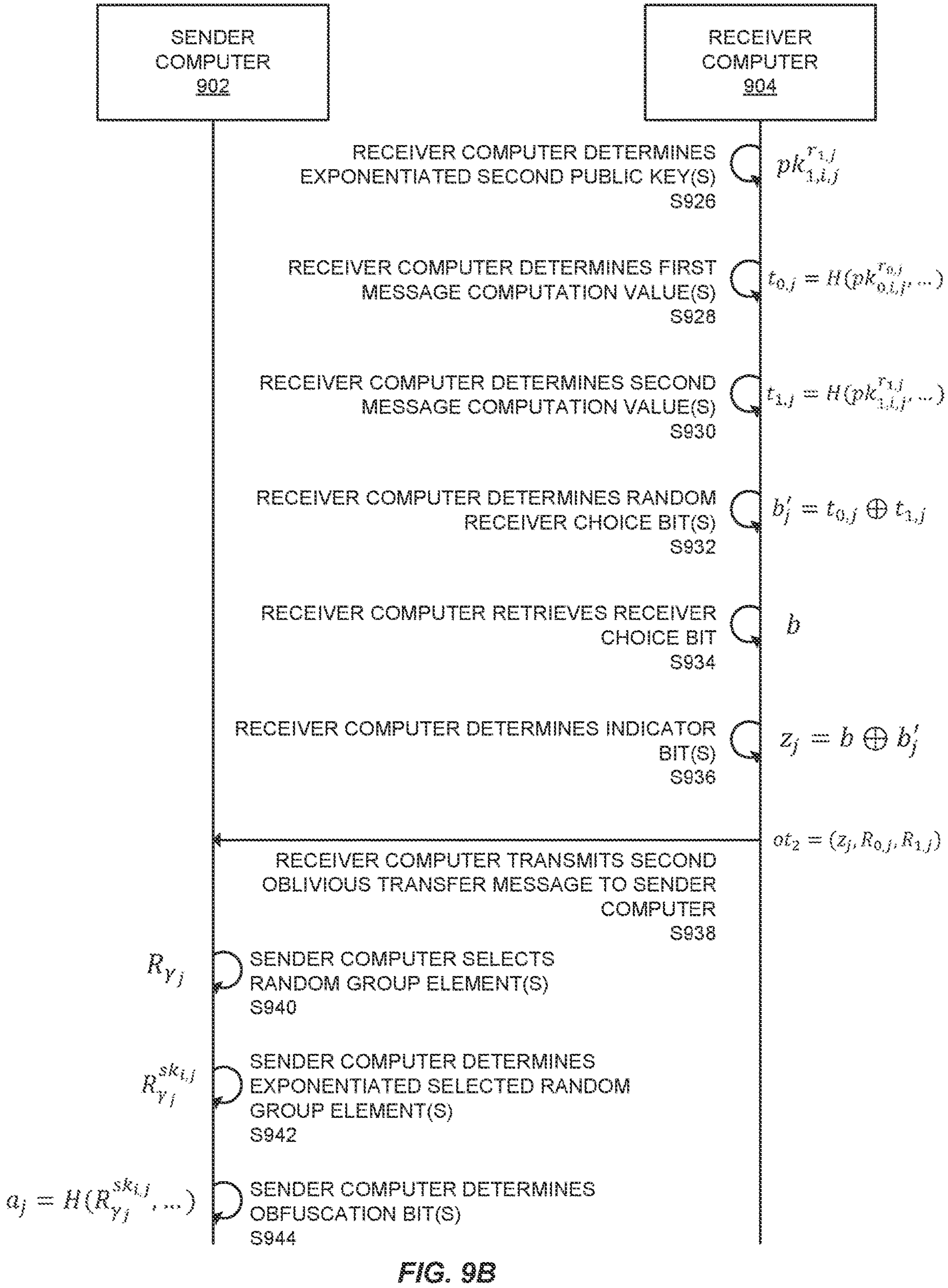
Figure 9C:
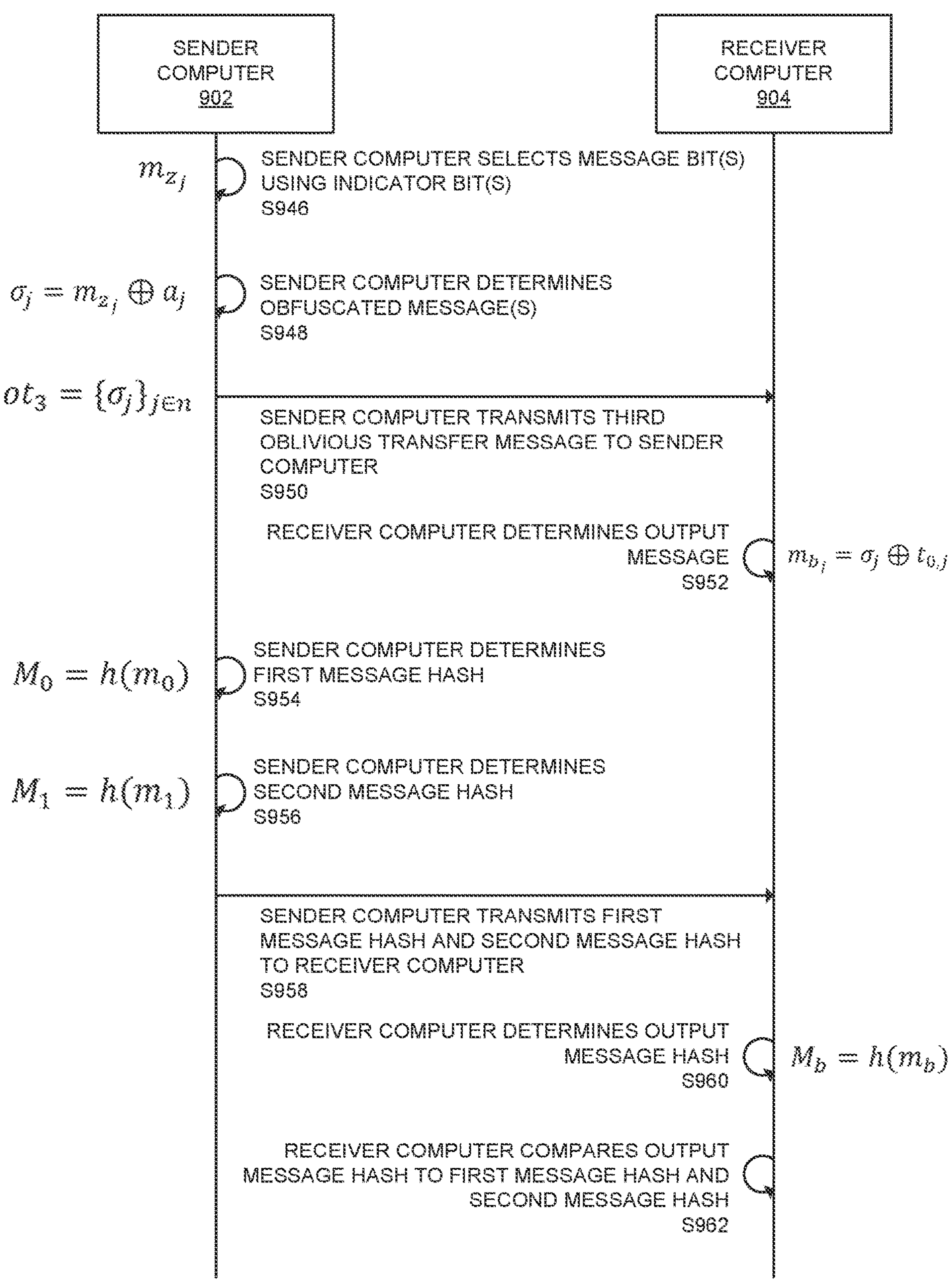

(e.g., at step S952 of FIG. 9C). In some embodiments, the second oblivious transfer message $ot_2$ can additionally comprise the one or more sets of second public keys $pk_{1,i,j}$.

At step S916, the receiver computer 904 can optionally determine the one or more sets of second public keys $pk_{1,i,j}$ using the one or more sets of first public keys $pk_{0,i,j}$, and the one or more group elements $Q_j$, e.g., according to the formula $$pk_{1,i,j} = \frac{Q_j}{pk_{0,i,j}}.$$

The receiver computer 904 can determine the one or more sets of second public keys $pk_{1,i,j}$ if the one or more sets of second public keys $pk_{1,i,j}$ were not included in the first oblivious transfer message $ot_1$.

At step S918, the receiver computer 904 can determine one or more first random numbers $r_{0,j}$ and one or more second random numbers $r_{1,j}$ by sampling the one or more first random numbers $r_{0,j}$ and the one or more second random numbers $r_{1,j}$ from an interval of integers $\mathbb{Z}_q$ based on (e.g., modulo) a prime number q (i.e., $r_{0,j}$, $r_{1,j} \leftarrow \mathbb{Z}_q$). In the third oblivious transfer method, the one or more first random numbers $r_{0,j}$ can comprise a number of first random numbers equal to a message length n of the first message $m_0$ and the second message $m_1$. Likewise the one or more second random numbers $r_{1,j}$ can comprise a number of second random numbers equal to the length n of the first message $m_0$ and the second message $m_1$. In some embodiments, the receiver computer 904 can uniformly sample the one or more first random numbers $r_{0,j}$ and the one or more second random numbers $r_{1,j}$ from the interval of integers $\mathbb{Z}_q$.

At step S920, the receiver computer 904 can determine one or more first random group elements $R_{0,j}$ based on the one or more first random numbers $r_{0,j}$. In some embodiments, the receiver computer 904 can determine the one or more first random group elements $R_{0,j}$ by exponentiating a generator g using the one or more first random numbers $r_{0,j}$ (i.e., $R_{0,j}=g^{r_{0,j}}$). The generator g may be a generator of the cyclic group G. In the third oblivious transfer method, the one or more first random group elements $R_{0,j}$ can comprise a number of first random group element $R_0$ equal to a message length n of the first message $m_0$ and the second message $m_1$.

At step S922, the receiver computer 904 can determine one or more second random group elements $R_{1,j}$ based on the one or more second random numbers $r_{1,j}$. In some embodiments, the receiver computer 904 can determine the one or more second random group elements $R_{1,j}$ by exponentiating a generator g using the one or more second random numbers $r_{1,j}$ (i.e., $R_{1,j}=g^{r_{1,j}}$). In the third oblivious transfer method, the one or more second random group elements $R_{1,j}$ can comprise a number of second random group elements $R_0$ equal to a message length n of the first message $m_0$ and the second message $m_1$.

The one or more first random group elements $R_{0,j}$ and the one or more second random group elements $R_{1,j}$ may later be used by sender computer 902 to generate one or more obfuscation bits $a_1$ (e.g., at step S944 of FIG. 9B), which the sender computer 902 can use to generate one or more obfuscated messages $\sigma_j$ (e.g., at step S948 of FIG. 9C).

At step S924, the receiver computer 904 can exponentiate each first public key of the one or more sets of first public keys $pk_{0,i,j}$, with a corresponding first random number of the one or more first random numbers $r_{0,j}$, thereby determining one or more sets of exponentiated first public keys $$pk_{0,i,j}^{r_{0,j}}.$$

In the third oblivious transfer method, the one or more sets of exponentiated first public keys $$pk_{0,i,j}^{r_{0,j}}$$

can comprise a number of sets of exponentiated first public keys $$pk_{0,i}^{r_0}$$

equal to a message length n of the first message $m_0$ and the second message $m_1$. Each set of exponentiated first public keys $$pk_{0,i,j}^{r_{0,j}}$$

can comprise a number of exponentiated first public keys equal to a security parameter κ, or any other appropriate number of exponentiated first public keys.

Referring now to FIG. 9B, at step S926, the receiver computer 904 can exponentiate each second public key of the one or more sets of second public keys $pk_{1,i,j}$ with a corresponding second random number of the one or more second random numbers $r_{1,j}$, thereby determining one or more sets of exponentiated second public keys $$pk_{1,i,j}^{r_{1,j}}.$$

In the third oblivious transfer method, the one or more sets of exponentiated second public keys

$$pk_{0,i,j}^{r_{0,j}}$$

can comprise a number of sets of exponentiated second public keys $$pk_{1,i}^{r_1}$$

equal to a message length n of the first message $m_0$ and the second message $m_1$. Each set of exponentiated second public keys $$pk_{1,i,j}^{r_{1,j}}$$

can comprise a number of exponentiated second public keys equal to a security parameter κ, or any other appropriate number of exponentiated second public keys.

At step S928, the receiver computer 904 can determine one or more first message computation values $t_{0,j}$ using the one or more sets of first public keys $pk_{0,i,j}$, the one or more first random numbers $r_{0,j}$, and the hardcore predicate function H. The receiver computer 904 can generate the one or more sets of exponentiated first public keys $$pk_{0,i,j}^{r_{0,j}}$$

as described above, then input each exponentiated first public key of the one or more sets of exponentiated first public keys $$pk_{0,i,j}^{r_{0,j}}$$

into the hardcore predicate function H, thereby determining the one or more first message computation values $t_{0,j}$ (i.e., $$t_{0,j} = H\left(pk_{0,i,j}^{r_{0,j}}, \ldots\right)).$$

In the third oblivious transfer method, the one or more first message computation values $t_{0,j}$ may comprise a number of first message computation values $t_{0,j}$ equal to a message length n of the first message $m_0$ and the second message $m_1$.

At step S930, the receiver computer 904 can determine one or more second message computation values $t_{1,j}$ using the one or more sets of second public keys $pk_{1,i,j}$, the one or more second random numbers $r_{1,j}$, and the hardcore predicate function H. The receiver computer 904 can generate the one or more sets of exponentiated second public keys $$pk_{1,i,j}^{r_{1,j}}$$

as described above, then input each exponentiated second public key of the one or more sets of exponentiated second public keys $$pk_{1,i,j}^{r_{1,j}}$$

into the hardcore predicate function H, thereby determining the one or more second message computation values $t_{1,j}$ (i.e., $$t_{1,j} = H\left(pk_{1,i,j}^{r_{1,j}}, \ldots\right)).$$

In the third oblivious transfer method, the one or more second message computation values $t_{1,j}$ may comprise a number of second message computation values $t_{1,j}$ equal to a message length n of the first message $m_0$ and the second message $m_1$.

At step S932, the receiver computer 904 can determine one or more random receiver choice bits $$b'_j$$

by calculating one or more exclusive ors (XORs) of the one or more first message computation values $t_{0,j}$ and the one or more second message computation values $t_{1,j}$ (i.e., $b_j' = t_{0,j} \oplus t_{1,j}$). In the third oblivious transfer method, the one or more random receiver choice bits $$b'_j$$

may comprise a number of random receiver choice bits $$b'_j$$

equal to a message length n of the first message $m_0$ and the second message $m_1$. The one or more random receiver choice bits $$b'_j$$

can be used to determine one or more indicator bits $z_j$, which as described above with reference to FIG. 8, can be used by the sender computer 902 to determine one or more obfuscated messages $\sigma_j$.

At step S934, the receiver computer 904 can retrieve a receiver choice bit b. As examples, the receiver computer 904 can retrieve the receiver choice bit b from a memory element (e.g., a secure memory element, a computer readable medium, a receiver choice bit module, etc.), or the receiver computer 904 can retrieve the receiver choice bit b from an operator of the receiver computer 904 (e.g., via an IO interface such as a keyboard), or the receiver computer 904 can use some procedure (e.g., a function or code) to generate the receiver choice bit b.

At step S936, the receiver computer 904 can determine one or more indicator bits $z_j$ based on the receiver choice bit b and the one or more random receiver choice bits $$b'_j.$$

The receiver computer 904 can determine the one or more indicator bits $z_j$ by calculating one or more exclusive ors (XORs) of the receiver choice bit b and the one or more random receiver choice bits $b'_j$ (i.e., $z_j = b \oplus b'_j$).

In the third oblivious transfer method, the one or more indicator bits $z_j$ may comprise a number of indicator bits $z_j$ equal to a message length n of the first message $m_0$ and the second message $m_1$.

At step S938, the receiver computer 904 can transmit a second oblivious transfer message $ot_2$ comprising the one or more indicator bits $z_j$, the one or more first random group elements $R_{0,j}$, and the one or more second random group elements $R_{1,j}$ to the sender computer 902 (i.e., $ot_2=(z_j, R_{0,j}, R_{1,j})$). The sender computer 902 can use the one or more indicator bits $z_j$, the one or more first random group elements $R_{0,j}$, and the one or more second random group elements $R_{1,j}$ to determine one or more obfuscated messages (e.g., in steps S940-S948) described below.

At step S940, the sender computer 902 can select one or more random group elements from the one or more first random group elements $R_{0,j}$ or the one or more second random group elements $R_{1,j}$ using the one or more sender choice bits $\gamma_j$, thereby determining one or more selected random group elements $R_{\gamma_j,j}$. In the third oblivious transfer method, the one or more selected random group elements $R_{\gamma_j,j}$ may comprise a number of sets of selected random group elements $R_{\gamma_j,j}$ equal to a message length n of the first message $m_0$ and the second message $m_1$.

As an example, the sender computer 902 can iterate through the one or more sender choice bits $\gamma_j$ and for each sender choice bit of the one or more sender choice bits $\gamma_j$, the sender computer 902 can select a corresponding first random group element from the one or more first random group elements $R_{0,j}$ if the sender choice bit has a value of zero or false, and select a corresponding second random group element from the one or more second random group elements $R_{1,j}$ if the sender choice bit has a value of one or true. Expressed otherwise, if $\gamma=0$, then $R_\gamma=R_0$ and if $\gamma=1$, then $R_\gamma=R_1$. As another example, if $\gamma_0=1$ and $\gamma_1=0$, then $R_{\gamma_0,0}=R_{1,0}$ and $R_{\gamma_1,1}=R_{0,1}$, or if $\gamma_0=0$ and $\gamma_1=1$, then $R_{\gamma_0,0}=R_{0,0}$ and $R_{\gamma_1,1}=R_{1,1}$. The one or more selected random group elements $R_{\gamma_j,j}$, may later be used by the sender computer 902 to generate one or more obfuscation bits $a_1$ (e.g., at step S944), which can later be used to generate one or more obfuscated messages $\sigma_j$ (e.g., at step S948 of FIG. 9C).

At step S942, the sender computer 902 can determine one or more sets of exponentiated selected random group elements $$R_{\gamma_j,j}^{sk_{i,j}}$$

by exponentiating the one or more selected random group elements $R_{\gamma_j,j}$ using the one or more sets of secret keys $sk_{i,j}$. In the third oblivious transfer method, the one or more sets of exponentiated selected random group elements $$R_{\gamma_j,j}^{sk_{i,j}}$$

may comprise a number of sets of exponentiated selected random group elements equal to a message length n of the first message $m_0$ and the second message $m_1$.

At step S944, the sender computer 902 can determine one or more obfuscation bits $a_1$ using a hardcore predicate function H, the one or more selected random group elements $R_{\gamma_j,j}$, and the one or more sets of secret keys $sk_{i,j}$. In the third oblivious transfer method, the one or more obfuscation bits $a_1$ can comprise a number of obfuscation bits $a_1$ equal to a message length n of the first message $m_0$ and the second message $m_1$. In more detail the sender computer 902 can use the one or more selected random group elements $R_{\gamma_j,j}$, and the one or more sets of secret keys $sk_{i,j}$ to generate one or more sets of exponentiated selected random group elements $$R_{\gamma_j,j}^{sk_{i,j}}$$

(as described above), then input the one or more sets of exponentiated selected random group elements $$R_{\gamma_j,j}^{sk_{i,j}}$$

into the hardcore predicate function H to generate the one or more obfuscation bits $a_1$ (i.e., $$a_j = H\left(R_{\gamma_j,j}^{sk_{i,j}}, \ldots\right)\Big).$$

Referring now to FIG. 9C, at step S946, the sender computer 904 can select one or more chosen message bits $m_{z_j,j}$ from among the one or more first message bits $m_{0,j}$ (comprising the first message m) and the one or more second message bits $m_{1,j}$ (comprising the second message $m_1$) based on the one or more indicator bits $z_j$. In some embodiments, the sender computer 904 can select a chosen message bit $m_{z_j,j}$ of the one or more chosen message bits $m_{z_j,j}$ from a corresponding first message bit $m_{0,j}$ if a corresponding indicator bit $z_j$ is equal to zero or false and select the message bit $m_{z_j,j}$ if a corresponding indicator bit $z_j$ is equal to one or true.

This process may be better illustrated by an example. If the first message $m_0$ comprises a bit string "011", the second message $m_1$ comprises a bit string "101" and the one or more indicator bits $z_j$ comprise a bit string "011," then the sender computer 902 can determine select one or more chosen message bits $m_{z_j,j}$ using the following process. The sender computer 902 can evaluate the first indicator bit $z_1$. Because the value of the first indicator bit $z_1=0$, the sender computer 902 can select a first chosen message bit $m_{z_j,1}$ from the first message $m_0$, e.g., $m_{z_j,1}=m_{0,1}=0$. The sender computer 902 can then evaluate the second indicator bit $z_2$. Because the value of the second indicator bit $z_2=1$, the sender computer 902 can select a second chosen message bit $m_{z_j,2}$ from the second message $m_1$, e.g., $m_{z_j,2}=m_{1,1}=0$. The sender computer 902 can then evaluate the third indicator bit $z_3$. Because the value of the third indicator bit $z_3=1$, the sender computer 902 can select a third chosen message bit $m_{z_j,3}$ from the second message $m_1$, e.g., $m_{z_j,3}=m_{1,3}=1$. The one or more chosen message bits $m_{z_j,j}$ can collectively comprise the bit string "001." As described above with reference to FIG. 8, by selecting the one or more chosen message bits $m_{z_j,j}$ using the one or more indicator bits $z_j$, the sender computer 902 and receiver computer 904 can insure that the receiver computer 904 receives a message that is consistent with the receiver choice bit b.

At step S948, the sender computer 902 can determine the one or more obfuscated messages $\sigma_1$ by calculating one or more exclusive ors (XORs) of the one or more chosen message bits $m_{z_j,j}$ and the one or more obfuscation bits $a_1$ (i.e., $\sigma_j = M_{z_j,j} \oplus a_j$). In the third oblivious transfer method, the one or more obfuscated messages $\sigma_j$ can comprise a number of obfuscated messages $\sigma_j$ equal to a message length n of the first message $m_0$ and the second message $m_1$. In effect, each obfuscated message $\sigma_1$ can communicate one message bit from either the first message $m_0$ or the second message $m_1$. The sender computer can generate a third oblivious transfer message $ot_3$ comprising the one or more obfuscated messages $\sigma_j$. Later, the receiver computer 904 can de-obfuscate the one or more obfuscated messages $\sigma_j$ to produce the output message $$m_{b'_j}$$

(e.g., at step S952).

At step S950, the receiver computer 904 can receive a third oblivious transfer message $ot_3$ comprising the one or more obfuscated messages $\sigma_1$ from the sender computer 902 (i.e., $ot_3 = \{\sigma_j\}_{i \in n}$).

At step S952, the receiver computer 904 can de-obfuscate the one or more obfuscated messages $\sigma_1$ using the one or more first message computation values $t_{0,j}$, thereby determining an output message $m_b$. The receiver computer 704 can de-obfuscate the one or more obfuscated messages $\sigma_j$ by computing one or more exclusive ors (XORs) of the one or more first message computation values $t_{0,j}$ and the one or more obfuscated messages $\sigma_j$ (i.e., $m_b = \sigma_j \oplus t_{0,j}$), producing one or more output message bits $m_{b,j}$ the output message $m_b$ can collectively comprise the one or more output message bits $m_{b,j}$ (i.e., $m_b = \{m_{b,j}\}_{j \in n}$). In the third oblivious transfer method, the one or more output message bits $m_{b,j}$ can comprise a number of output message bits $m_{b,j}$ equal to a message length n of the first message $m_0$ and the second message $m_1$. The output message $m_b$ can comprise either the first message $m_0$ or the second message $m_1$. At this point, the receiver computer 904 has determined the output message $$m_{b'_j},$$

completing a one-out-of-two string oblivious transfer. However, some additional optional steps (e.g., steps S954-S962) can be performed in order to verify that the third oblivious transfer method was executed correctly.

At step S954, the sender computer 902 can determine a first message hash $M_0$ using the first message $m_0$ and a hash function h (i.e., $M_0 = h(m_0)$). This first message hash $M_0$ can later be analyzed by the receiver computer 904 to verify that the receiver computer 904 received one of the first message $m_0$ and the second message $m_1$ during the third oblivious transfer method.

At step S956, the sender computer 902 can determine a second message hash $M_1$ using the second message $m_1$ and a hash function h (i.e., $M_1 = h(m_1)$). This second message hash $M_1$ can later be analyzed by the receiver computer 904 to verify that the receiver computer 904 received one of the first message $m_0$ and the second message $m_1$ during the third oblivious transfer method.

At step S958, the sender computer 902 can transmit the first message hash $M_0$ and the second message hash $M_1$ to the receiver computer 904. The sender computer 902 may also transmit a hash function indicator to the receiver computer 904, which the receiver computer 904 can use to identify the hash function h. Alternatively, the sender computer 902 can transmit a digital representation of the hash function h itself to the receiver computer 904.

At step S960, the receiver computer 904 can determine an output message hash $M_b$ using the output message $m_b$ and the hash function h (i.e., $M_b$-$h(m_b)$)). Ideally, if the third oblivious transfer method was completed correctly, the output message hash $M_b$ can be equivalent to one of the first message hash $M_0$ and the second message hash $M_1$.

At step S962, the receiver computer 904 can compare the output message hash $M_b$ to the first message hash $M_0$ and the second message hash $M_1$, e.g., by testing the equality of the first message hash $M_0$ to the output message hash $M_b$ and the equality of the second message hash $M_1$ to the output message hash $M_b$. If the output message hash $M_b$ is equal to one of the first message hash $M_0$ and the second message hash $M_1$, then the third oblivious transfer method has been completed correctly. In some embodiments, the receiver computer 904 can transmit the output message hash $M_b$ to the sender computer 902, enabling the sender computer 902 to also verify that the third oblivious transfer method has been completed correctly.

For the sake of completeness, additional embodiments of the present disclosure are described below. One embodiment comprises a method. This method can be analogous to the first oblivious transfer method described above. A receiver computer can determine a first initial value q, a second initial value $r_0$, and a third initial value $r_1$. The second initial value $r_0$ may be analogous to the one or more first random numbers $r_0$ described above. The third initial value $r_1$ may be analogous to the one or more second random numbers $r_{1,j}$ described above.

The receiver computer can determine a first computed value Q from the first initial value q. The first computed value Q can be analogous to the one or more group elements $Q_j$ described above. The receiver computer can determine a second computed value $R_0$ from the second initial value $r_0$. The second computed value $R_0$ can be analogous to the one or more first random group elements $R_{0,j}$ described above. The receiver computer can determine a third computed value $R_1$. The third computed value $R_1$ can be analogous to the one or more second random group elements $R_{1,1}$ described above.

The receiver computer can transmit a first oblivious transfer message $ot_1$ comprising the first computed value Q, the second computed value $R_0$ and the third computed value $R_1$ to a sender computer. The sender computer can determine an input choice bit $\gamma$ (which can be analogous to the one or more sender choice bits $\gamma_j$ described above) from at least two input messages (which can be analogous to the first message $m_0$ and the second message $m_1$ described above). The sender computer can determine a set of secret keys $sk_i$ (which can be analogous to the one or more sets of secret keys $sk_{i,j}$ described above). The sender computer can determine a first set of public keys $pk_{0,i}$ (which can be analogous to the one or more first sets of public keys $pk_{0,i,j}$, described above) using the set of secret keys $sk_i$. The sender computer can determine a second set of public keys $pk_i$, (which can analogous to the one or more second sets of public keys $pk_{1,i,j}$ described above) using the first set of public keys $pk_{0,i}$ and the first computed value Q.

The sender computer can determine one of the second computed value $R_0$ and the third computed value $R_1$ using the input choice bit $\gamma$, which can be analogous to the process of determining the selected random group elements $R_{\gamma,j}$ described above. The sender computer can compute an intermediate value a (which can be analogous to the one or more obfuscation bits $a_1$ described above) using the determined computed value $R_\gamma$, the set of secret keys $sk_i$ and a hardcore predicate function H, in a process which may be analogous to the process used to generate the one or more obfuscation bits $a_1$, as described above. The sender computer can generate a mapping Map (which may be analogous to the one or more obfuscated messages $\sigma_j$) using the intermediate value a and one of the messages $m_0$, in a process that may be analogous to generating the one or more obfuscated messages $\sigma_j$ using the one or more obfuscation bits $a_1$, as described above.

The sender computer can send a second oblivious transfer message $ot_2$ comprising the mapping Map, the first set of public keys $pk_{0,i}$ and the second set of public keys $pk_{1,i}$ to the receiver computer. The receiver computer can receive the second oblivious transfer message $ot_2$ and generate a first subsequent value $t_0$ (which may be analogous to the one or more first message computation values $t_{0,j}$ described above) using the first set of public keys $pk_{0,i}$ and the second initial value $r_0$. The receiver computer can generate a second subsequent value $t_1$ (which may be analogous to the one or more second message computation values $t_{1,j}$ described above) using the second set of public keys $pk_{1,i}$ and the third initial value $r_1$. The receiver computer can compute an output choice bit b' (which may be analogous to the random receiver choice bit b') described above using the first subsequent value $t_0$ and the second subsequent value $t_1$.

The receiver computer can compute an output message $m_{b'}$ using the mapping Map and the first subsequent value $t_0$, then output the output choice bit b' and the output message $m_{b'}$. The output message $m_{b'}$ may comprise one of the input messages.

Another embodiment is directed to a method. This method can correspond to the third oblivious transfer method described above. A sender computer can determine an input choice bit $\gamma$ (which can be analogous to the one or more sender choice bits $\gamma_j$ described above) from at least two input messages (which can be analogous to the first message $m_0$ and the second message $m_1$ described above). The sender computer can determine an initial random value Q (which can be analogous to the one or more group elements $Q_j$ described above) and a set of secret keys $sk_i$ (which can be analogous to the one or more sets of secret keys $sk_{i,j}$ described above). The sender computer can determine a first set of public keys $pk_{0,i}$ (which can analogous to the one or more first sets of public keys $pk_{0,i,j}$, described above) using the set of secret keys $sk_i$. The sender computer can determine a second set of public keys $pk_{1,i}$ (which can be analogous to the one or more second sets of public keys $pk_{1,i,j}$ described above) using the first set of public keys $pk_{0,i}$ and the initial random value Q.

The sender computer can send a first oblivious transfer message $ot_1$ comprising the initial random value Q, the first set of public keys $pk_{0,i}$ and the second set of public keys $pk_{1,i}$ to the receiver computer. The receiver computer can determine a second initial value $r_0$ (which may be analogous to the one or more first random numbers $r_{0,j}$ described above). The receiver computer can determine a third initial value $r_1$ (which may be analogous to the one or more first random numbers $r_{1,j}$ described above). The receiver computer can determine a second computed value $R_0$ from the second initial value $r_0$. The second computed value $R_0$ can be analogous to the one or more first random group elements $R_{0,j}$ described above. The receiver computer can determine a third computed value $R_1$. The third computed value $R_1$ can be analogous to the one or more second random group elements $R_{1,j}$ described above.

The receiver computer can generate a first subsequent value $t_0$ (which may be analogous to the one or more first message computation values $t_{0,j}$ described above) using the first set of public keys $pk_{0,i}$ and the second initial value $r_0$. The receiver computer can generate a second subsequent value $t_1$ (which may be analogous to the one or more second message computation values $t_{1,j}$ described above) using the second set of public keys $pk_{1,i}$ and the third initial value $r_1$. The receiver computer can check if a choice bit b (which can be analogous to the receiver choice bit b described above) is equal to an exclusive or (XOR) of the first subsequent value $t_0$ and the second subsequent value $t_1$ (which can be analogous to the process used to compare the random receiver choice bit b' and the receiver choice bit b, as described above). If they are equal, the receiver computer can set a temporary value z (which can be analogous to the one or more indicator bits $z_j$ described above) equal to 1 or true. If they are unequal, the receiver computer can set the temporary value z equal to 0 or false.

The receiver computer can send a second oblivious transfer message $ot_2$ comprising the temporary value z, the second computed value $R_0$ and the third computed value $R_1$ to the sender computer. The sender computer can determine a determined computed value $R_\gamma$ and compute an intermediate value a (which can be analogous to the one or more obfuscation bits $a_1$ described above) using the determined computed value $R_\gamma$, the set of secret keys $sk_i$ and a hardcore predicate function H, in a process which may be analogous to the process used to generate the one or more obfuscation bits $a_1$, as described above. The sender computer can generate a mapping Map (which may be analogous to the one or more obfuscated messages $\sigma_j$) using the intermediate value a and a selected message $m_z$, in a process that may be analogous to generating the one or more obfuscated messages $\sigma_j$ using the one or more obfuscation bits $a_j$, as described above. The sender computer can send a third oblivious transfer message $ot_3$ comprising the mapping Map to the receiver computer. The receiver computer can determine an output message $m_b$ using the mapping Map and the first subsequent value $t_0$. The receiver computer can output the output message $m_b$.

Another embodiment is directed to a method. This method can be analogous to the second oblivious transfer method described above. The receiver computer can obtain an input choice bit b (which can be analogous to the receiver choice bit b described above). The receiver computer can generate a first oblivious transfer message $ot_1$ and a receiver secret internal state $st_R$, which may comprise one or more first random numbers $r_{0,j}$ and one or more second random numbers $r_{1,j}$. The receiver computer can transmit the first oblivious transfer message $ot_1$ to the sender computer. The sender computer can generate a second oblivious transfer message $ot_2$ and a sender secret internal state $st_S$ using the first oblivious transfer message $ot_1$. The sender secret internal state $st_S$ can comprise e.g., one or more sets of secret keys $sk_{i,j}$ and one or more obfuscation bits $a_j$. The sender computer can transmit the second oblivious transfer message $ot_2$ to the receiver computer.

The receiver computer can receive the second oblivious transfer message $ot_2$ and generate a third oblivious message $ot_3$ and a hashed message M' (which may be analogous to the output message $m_{b'}$, as described above) using the receiver secret internal state $st_R$, the second oblivious transfer message $ot_2$, and the input choice bit b. The receiver computer can transmit the third oblivious transfer message $ot_3$ to the sender computer. The sender computer can determine sender messages (which may be analogous to the updated first message $m'_0$ and the updated second message $m'_1$ described above) using the sender secret internal state $st_S$ and the third oblivious transfer message $ot_3$. The hashed message M' can comprise one of the sender messages (e.g., the updated first message $m'_0$ or the updated second message $m'_1$), and the sender computer may not be aware of the input choice bit b.

For the sake of completeness, some additional methods according to embodiments are described below from the perspective of the sender computer. One method comprises a method for obliviously transferring either a first message $m_0$ or a second message $m_1$ to a receiver computer. In this method, a sender computer can receive a first oblivious transfer message $ot_1$ from a receiver computer. The first oblivious transfer message $ot_1$ can comprise one or more group elements $Q_1$, one or more first random group elements $R_{0,j}$ and one or more second random group elements $R_{1,j}$. The receiver computer may have determined the one or more first random group elements $R_{0,j}$ using one or more first random numbers $r_{0,j}$ and may have determined the one or more second random group elements $R_{1,j}$ using one or more second random numbers $r_{1,j}$.

The sender computer can use the one or more group elements $Q_j$, the one or more first random group elements $R_{0,j}$ and the one or more second random group elements $R_{1,j}$ to generate a second oblivious transfer message $ot_2$ comprising one or more sets of first public keys $pk_{0,i,j}$, and one or more obfuscated message op. Each set of first public keys $pk_{0,i,j}$, can comprise one or more public keys. The sender computer can send the second oblivious transfer message $ot_2$ to the receiver computer.

The receiver computer can use the one or more sets of first public keys $pk_{0,i,j}$, to determine one or more first message computation values $t_{0,j}$. The receiver computer can then de-obfuscate the one or more obfuscated messages $\sigma_j$ using the one or more first message computation values $t_{0,j}$, thereby determining an output message $m_{b'}$, which can comprise either a first message $m_0$ or a second message $m_1$ known to the sender computer.

In another method, a sender computer can generate a first oblivious transfer message $ot_1$ comprising one or more group elements $Q_j$ and one or more sets of first public keys $pk_{0,i,j}$. Each set of first public keys $pk_{0,i,j}$, can comprise one or more first public keys. The sender computer can transmit the first oblivious transfer message $ot_1$ to the receiver computer. The receiver computer can determine one or more first message computation values $t_{0,j}$ using the one or more sets of first public keys $pk_{0,i,j}$, one or more first random numbers $r_{0,j}$ and a hardcore predicate function H. The receiver computer can additionally determine one or more first random group elements $R_{0,j}$ using the one or more first random numbers $r_{0,j}$ and a generator g. The receiver computer can also determine one or more second random group elements $R_{1,j}$ using one or more second random numbers $r_{1,j}$. Further, the receiver computer can determine one or more indicator bits $z_j$. The receiver computer can generate a second oblivious transfer message $ot_2$ comprising the one or more first random group elements $R_{0,j}$ the one or more second random group elements $R_{1,j}$, and the one or more indicator bits $z_j$.

The sender computer can receive the second oblivious transfer message $ot_2$ from the receiver computer. The sender computer can use the one or more first random group elements $R_{0,j}$ the one or more second random group elements $R_{1,j}$ and the one or more indicator bits $z_j$ to determine one or more obfuscated messages $\sigma_j$. The sender computer can select one or more selected random group elements $R_{\gamma,j}$ using the one or more first random group elements $R_{0,j}$, the one or more second random group elements $R_{1,j}$, and a sender choice bit $\gamma$. The sender computer can generate one or more obfuscation bits $a_1$ using the one or more selected random group elements $R_{\gamma,j}$, a hardcore predicate function H, and one or more sets of secret keys $sk_{i,j}$. The sender computer can then determine one or more chosen message bits $m_{z_j,1}$ using the first message $m_0$, the second message $m_1$, and the one or more indicator bits $z_j$. Afterwards, the sender computer can obfuscate the one or more chosen message bits $m_{z_j,j}$ using the one or more obfuscation bits $a_j$, thereby determining the one or more obfuscated messages $\sigma_j$. The sender computer can generate a third oblivious transfer message $ot_3$ comprising the one or more obfuscated messages $\sigma_j$ and transmit them to the receiver computer.

The receiver computer can de-obfuscate the one or more obfuscated messages $\sigma_j$ using the one or more first message computation values $t_{0,j}$, thereby determining an output message $m_b$, which can comprise either the first message $m_0$ or the second message $m_1$.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

REFERENCES

[AIR01] William Aiello, Yuval Ishai, and Omer Reingold. Priced oblivious transfer: How to sell digital goods. In Birgit Pfitzmann, editor, *Advances in Cryptology—EUROCRYPT* 2001, *International Conference on the Theory and Application of Cryptographic Techniques, Innsbruck, Austria, May* 6-10, 2001, *Proceeding*, volume 2045 of *Lecture Notes in Computer Science*, pages 119-135. Springer, 2001.

[BGI+17] Saikrishna Badrinarayanan, Sanjam Garg, Yuval Ishai, Amit Sahai, and Akshay Wadia. Two-message witness indistinguishablility and secure computation in the plain model from new assumptions. In Tsuyoshi Takagi and Thomas Peyrin, editors, *Advances in Cryptology—ASIA CRYPT* 2017-23*rd International Conference on the Theory and Applications of Cryptology and Information Security, Hong Kong, China, Dec.* 3-7, 2017, *Proceedings, Part III*, volume 10626 of *Lecture Notes in Computer Science*, pages 275-303. Springer 2017.

[BL18] Fabrice Benhamouda and Huijia Lin. K-round multiparty computation from k-round oblivious transfer via garbled interactive circuits. In Jesper Buus Nielsen and Vincent Rijmen, editors, *Advances in Cryptology—EUROCRYPTO* 2018—37*th Annual International Conference on the Theory and Applications of Cryptographic Techniques*, Tel Aviv, Israel, Apr. 29-May 3, 2018 *Proceedings, Part II*, volume 10821 of *Lecture Notes in Computer Science*, pages 500-532. Springer, 2018.

[GMW87] Oded Goldreich, Silvio Micali, and Avi Wigderson. How to play any mental game or A completeness theorem for protocols with honest majority. In *Proceedings of the* 19*th Annual ACM Symposium on Theory of Computing,* 1987, New York, New York, USA, pages 218-229. ACM, 1987.

[GS18] Sanjam Garg and Akshayaram Srinivasan. Two-round multiparty secure computation from minimal assumptions. In Jesper Buus Nielsen and Vincent Rijmen, editors, *Advances in Cryptology—EUROCRYPT* 2018—37*th Annual International Conference on the Theory and Applications of Cryptographic Techniques*, Tel Aviv, Israel, Apr. 29-May 3, 2018 *Proceedings, Part II*, volume 10821 of *Lecture Notes in Computer Science*, pages 468-499, Springer, 2018.

[HK12] Shai Halevi and Yael Tauman Kalai. Smooth projective hashing and two-message oblivious transfer. *J. Cryptol.,* 25(1):158-193, 2012.

[IKO+11] Yuval Ishai, Eyal Kushilevitz, Rafail Ostrovsky, Manoj Prabhakaran, and Amit Sahai, Efficient non-interactive secure computation. In *EUROCRYPT,* 2011.

[IPS08] Yuval Ishai, Manoj Prabhakaran, and Amit Sahai. Founding cryptography on oblivious transfer—efficiently. In David A. Wagner, editor, *Advances in Cryptology—CRYPTO* 2008, 28$^{th}$ *Annual International Cryptography Conference*, Santa Barara, CA, USA, Aug. 17-21, 2008. *Proceedings*, volume 5157 of *Lecture Notes in Computer Science*, pages 572-591. Springer, 2008.

[JKKR17] Abhishek Jain, Yael Tauman Kalai, Dakshita Khurana, and Ron Rothblum. Distinguisher-dependent simulation in two rounds and its applications. In Jonathan Katz and Hovav Shacham, editors, *Advances in Cryptology—CRYPTO* 2017—37$^{th}$ *Annual International Cryptology Conference*, Santa Barbara, CA, USA, Aug. 20-24, 2017*, Proceedings, Part II*, volume 10402 of *Lecture Notes in Computer Science*, pages 158-189. Springer, 2017.

[Kal05] Yael Tauman Kalai. Smooth projective hashing and two-message oblivious transfer. In Ronald Cramer, editor, *Advances in Cryptology—EUROCRYPT* 2005, 24$^{th}$ *Annual International Conference on the Theory and Application of Cryptographic Techniques, Aarhus, Denmark*, May 22-26, 2005*, Proceedings*, volume 3494 of *Lecture Notes in Computer Science*, pages 78-95. Springer, 2005.

[KKRT16] Vladimir Kolesnikov, Ranjit Kumaresan, Mike Rosulek, and Ni Trieu. Efficient batched oblivious PRF with applications to private set intersection. In *CCS,* 2016.

[KKS18] Yael Tauman Kalai, Dakshita Khurana, and Amit Sahai. Statistical witness indistinguishability (and more) in two messages. In Jesper Buus Nielsen and Vincent Rijmen, editors, *Advances in Cryptology-EUROCRYPT* 2018—37$^{th}$ *Annual International Conference on the Theory and Applications of Cryptographic Techniques*, Tel Aviv, Israel, Apr. 29-May 3, 2018 *Proceedings, Part III*, volume 10822 of *Lecture Notes in Computer Science*, pages 34-65. Springer, 2018.

[KS17] Dakshita Khruana and Amit Sahai. How to achieve non-malleability in one or two rounds. In Chris Umans, editor, 58$^{th}$ *IEEE Annual Symposium on Foundations of Computer Science, FOCS* 2017, Berkeley, CA, USA, Oct. 15-17, 2017, page 564-575. IEEE Computer Society, 2017.

[NP01] Moni Naor and Benny Pinkas. Efficient oblivious transfer protocols. In S. Rao Kosaraju, editor, *Proceedings of the Twelfth Annual Symposium on Discrete Algorithms*, Jan. 7-9, 2001, Washington, DC, USA, pages 448-457. ACM/SIAM, 2001.

[PRTY19] Benny Pinkas, Mike Rosulek, Ni Trieu, and Avishay Yanai. Spot-light: Lightweight private set intersection from sparse OT extension. In *CRYPTO,* 2019.

[Yao86] Andrew Chi-Chih Yao. How to generate an exchange secrets (extended abstract). In 27$^{th}$ *Annual Symposium on Foundations of Computer Science*, Toronto, Canada, 27-29 Oct. 1986, pages 162-167. IEEE Computer Society, 1986.

What is claimed is:

1. A method for obliviously transferring either a first message comprising one or more first message bits or a second message comprising one or more second message bits to a receiver computer, the method comprising:

determining, by the receiver computer, one or more first random numbers and one or more second random numbers;

determining, by the receiver computer, one or more group elements;

determining, by the receiver computer, based on the one or more first random numbers, one or more first random group elements;

determining, by the receiver computer, based on the one or more second random numbers, one or more second random group elements;

transmitting, by the receiver computer, to a sender computer, a first oblivious transfer message comprising the one or more group elements, the one or more first random group elements, and the one or more second random group elements, wherein the sender computer:

determines one or more sender choice bits by calculating one or more exclusive ors of the one or more first message bits and the one or more second message bits, selects one or more random group elements from the one or more first random group elements or the one or more second random group elements using the one or more sender choice bits, thereby determining one or more selected random group elements, determines one or more obfuscation bits using a hardcore predicate function, the one or more selected random group elements, and one or more sets of secret keys, wherein each set of secret keys comprises one or more secret keys, determines one or more obfuscated messages by calculating one or more exclusive ors of the one or more first message bits and the one or more obfuscation bits, and determines a second oblivious transfer message comprising one or more sets of first public keys and the one or more obfuscated messages, each set of first public keys comprising one or more public keys;

receiving, by the receiver computer from the sender computer, the second oblivious transfer message;

determining, by the receiver computer, one or more first message computation values using the one or more sets of first public keys, the one or more first random numbers, and the hardcore predicate function; and de-obfuscating, by the receiver computer, the one or more obfuscated messages using the one or more first message computation values, thereby determining an output message, wherein the output message comprises either the first message or the second message.

2. The method of claim 1, further comprising:

randomly sampling, by the receiver computer, the one or more first random numbers and the one or more second random numbers from an interval of integers defined by a prime number.

3. The method of claim 2, further comprising:

determining, by the receiver computer, the one or more group elements by randomly sampling one or more elements from a cyclic group;

determining, by the receiver computer, the one or more first random group elements by exponentiating a generator using the one or more first random numbers; and determining, by the receiver computer, the one or more second random group elements by exponentiating the generator using the one or more second random numbers.

4. The method of claim 1, wherein for each sender choice bit of the one or more sender choice bits, the sender computer selects a corresponding first random group element from the one or more first random group elements if the sender choice bit has a value of zero or false, and selects a corresponding second random group element from the one or more second random group elements if the sender choice bit has a value of one or true.

5. A method for obliviously transferring either a first message or a second message to a receiver computer, the method comprising:

determining, by the receiver computer, one or more first random numbers and one or more second random numbers;

determining, by the receiver computer, one or more group elements;

determining, by the receiver computer, based on the one or more first random numbers, one or more first random group elements;

determining, by the receiver computer, based on the one or more second random numbers, one or more second random group elements;

transmitting, by the receiver computer, to a sender computer, a first oblivious transfer message comprising the one or more group elements, the one or more first random group elements, and the one or more second random group elements, wherein the sender computer uses the one or more group elements, the one or more first random group elements, and the one or more second random group elements to determine a second oblivious transfer message comprising one or more sets of first public keys and one or more obfuscated messages, each set of first public keys comprising one or more public keys, wherein:

the sender computer determines the one or more sets of first public keys and one or more sets of second public keys using one or more sets of secret keys, the one or more group elements and a generator, wherein each set of secret keys comprises one or more secret keys and wherein the one or more sets of second public keys each comprise one or more second public keys, and the sender computer determines the one or more sets of secret keys by randomly sampling the one or more sets of secret keys from an interval of integers defined by a prime number;

receiving, by the receiver computer, from the sender computer, the second oblivious transfer message;

determining, by the receiver computer, one or more first message computation values using the one or more sets of first public keys, the one or more first random numbers, and a hardcore predicate function; and de-obfuscating the one or more obfuscated messages using the one or more first message computation values, thereby determining an output message, wherein the output message comprises either the first message or the second message.

6. The method of claim 5, wherein:

each set of the one or more sets of secret keys comprises a number of secret keys equal to a security parameter;

each set of the one or more sets of first public keys comprises a number of first public keys equal to the security parameter; and each set of the one or more sets of second public keys comprises a number of second public keys equal to the security parameter.

7. The method of claim 1, wherein de-obfuscating the one or more obfuscated messages comprises computing one or more exclusive ors of the one or more first message computation values and the one or more obfuscated messages.

8. A method for obliviously transferring either a first message or a second message to a receiver computer, the method comprising:

determining, by the receiver computer, one or more first random numbers and one or more second random numbers;

determining, by the receiver computer, one or more group elements;

determining, by the receiver computer, based on the one or more first random numbers, one or more first random group elements;

determining, by the receiver computer, based on the one or more second random numbers, one or more second random group elements;

transmitting, by the receiver computer, to a sender computer, a first oblivious transfer message comprising the one or more group elements, the one or more first random group elements, and the one or more second random group elements, wherein the sender computer uses the one or more group elements, the one or more first random group elements, and the one or more second random group elements to determine a second oblivious transfer message comprising one or more sets of first public keys and one or more obfuscated messages, each set of first public keys comprising one or more public keys;

receiving, by the receiver computer from the sender computer, the second oblivious transfer message;

determining, by the receiver computer, one or more first message computation values using the one or more sets of first public keys, the one or more first random numbers, and a hardcore predicate function;

de-obfuscating the one or more obfuscated messages using the one or more first message computation values, thereby determining an output message, wherein the output message comprises either the first message or the second message;

retrieving, by the receiver computer, a receiver choice bit;

determining, by the receiver computer, one or more random receiver choice bits;

determining, by the receiver computer, one or more indicator bits based on the receiver choice bit and the one or more random receiver choice bits; and transmitting a third oblivious transfer message comprising the one or more indicator bits to the sender computer, wherein the sender computer updates the first message and the second message based on the one or more indicator bits, thereby determining an updated first message and an updated second message.

9. The method of claim 8, wherein determining, by the receiver computer, one or more random receiver choice bits comprises:

determining, by the receiver computer, one or more second message computation values using the hardcore predicate function, one or more sets of second public keys, and the one or more second random numbers; and determining the one or more random receiver choice bits by calculating one or more exclusive ors of the one or more first message computation values and the one or more second message computation values, wherein the one or more random receiver choice bits are unknown to the sender computer.

10. The method of claim 8, wherein the sender computer samples a hash function, wherein the second oblivious transfer message contains the hash function or a hash function indicator, wherein the sender computer determines a first message hash and a second message hash using the updated first message, the updated second message, and the hash function, wherein the sender computer transmits the first message hash and the second message hash to the receiver computer, and wherein the method further comprises:

determining, by the receiver computer, an output message hash; and comparing, by the receiver computer, the output message hash to the first message hash and the second message hash.

11. A method for obliviously transferring either a first message or a second message to a receiver computer, the method comprising:

receiving, by the receiver computer, from a sender computer, a first oblivious transfer message comprising one or more group elements and one or more sets of first public keys, wherein each set of first public keys comprises one or more first public keys;

determining, by the receiver computer, one or more first message computation values using the one or more sets of first public keys, one or more first random numbers, and a hardcore predicate function;

determining, by the receiver computer, one or more first random group elements using the one or more first random numbers and a generator;

determining, by the receiver computer, one or more second random group elements using one or more second random numbers and the generator;

determining, by the receiver computer, one or more indicator bits;

transmitting, by the receiver computer, a second oblivious transfer message comprising the one or more first random group elements, the one or more second random group elements, and the one or more indicator bits to the sender computer, wherein the sender computer uses the one or more first random group elements, the one or more second random group elements, and the one or more indicator bits to determine one or more obfuscated messages;

receiving, by the receiver computer, from the sender computer, a third oblivious transfer message comprising the one or more obfuscated messages; and de-obfuscating, by the receiver computer, the one or more obfuscated message using the one or more first message computation values, thereby determining an output message, wherein the output message comprises either the first message or the second message.

12. The method of claim 11, wherein de-obfuscating the one or more obfuscated messages using the one or more first message computation values comprises:

computing, by the receiver computer, one or more exclusive ors of the one or more obfuscated messages and the one or more first message computation values, thereby determining one or more output message bits, wherein the output message comprises the one or more output message bits.

13. The method of claim 11, wherein:

the sender computer randomly samples the one or more group elements from a cyclic group;

the sender computer determines the one or more sets of first public keys using one or more sets of secret keys, wherein each set of secret keys comprises one or more secret keys; and the sender computer determines the one or more sets of secret keys by randomly sampling each secret key of the one or more sets of secret keys from an interval of integers defined by a prime number.

14. The method of claim 11, wherein:

the first message comprises one or more first message bits and the second message comprises one or more second message bits;

the sender computer selects one or more chosen message bits from among the one or more first message bits and the one or more second message bits based on the one or more indicator bits, such that a chosen message bit of the one or more chosen message bits is selected from a corresponding first message bit if a corresponding indicator bit is equal to zero or false and is selected from a corresponding second message bit if a corresponding indicator bit is equal to one or true; and the sender computer determines the one or more obfuscated messages by calculating one or more exclusive ors of one or more chosen message bits and one or more obfuscation bits.

15. The method of claim 14, wherein the sender computer determines the one or more obfuscation bits using the hardcore predicate function, one or more selected random group elements and one or more secret keys, wherein the sender computer selects the one or more selected random group elements from among the one or more first random group elements and the one or more second random group elements using one or more sender choice bits, and wherein the sender computer determines the one or more sender choice bits using one or more first message bits corresponding to the first message and one or more second message bits corresponding to the second message.

16. The method of claim 11, wherein determining, by the receiver computer, the one or more indicator bits comprises computing, by the receiver computer, one or more exclusive ors of a receiver choice bit and one or more random receiver choice bits, wherein the receiver choice bit is not known to the sender computer, and wherein the method further comprises:

retrieving, by the receiver computer, the receiver choice bit;

determining, by the receiver computer, one or more second message computation values using one or more sets of second public keys, the one or more second random numbers, and the hardcore predicate function; and determining, by the receiver computer, the one or more random receiver choice bits by calculating one or more exclusive ors of the one or more first message computation values and the one or more second message computation values.

17. The method of claim 16, further comprising:

determining, by the receiver computer, the one or more sets of second public keys using the one or more sets of first public keys and the one or more group elements contained in the first oblivious transfer message.

18. The method of claim 16, wherein:

determining, by the receiver computer, the one or more first message computation values comprises exponentiating, by the receiver computer, each first public key of the one or more sets of first public keys with a corresponding first random number of the one or more first random numbers, thereby determining one or more sets of exponentiated first public keys, then inputting each exponentiated first public key of the one or more sets of exponentiated first public keys into the hardcore predicate function, thereby determining the one or more first message computation values; and determining, by the receiver computer, the one or more second message computation values comprises exponentiating, by the receiver computer, each second public key of the one or more sets of second public keys with a corresponding second random number of the one or more second random numbers, thereby determining one or more sets of exponentiated second public keys, then inputting each exponentiated second public key of the one or more sets of exponentiated second public keys into the hardcore predicate function, thereby determining the one or more second message computation values.

* * * * *